US012298917B2

(12) United States Patent
Shiner et al.

(10) Patent No.: US 12,298,917 B2
(45) Date of Patent: May 13, 2025

(54) ONLINE SECURITY SERVICES BASED ON SECURITY FEATURES IMPLEMENTED IN MEMORY DEVICES

(71) Applicant: Micron Technology, Inc., Boise, ID (US)

(72) Inventors: Jeffrey Charles Shiner, Richardson, TX (US); Lance W. Dover, Fair Oaks, CA (US); Olivier Duval, Pacifica, CA (US)

(73) Assignee: Micron Technology, Inc., Boise, ID (US)

( * ) Notice: Subject to any disclaimer, the term of this patent is extended or adjusted under 35 U.S.C. 154(b) by 771 days.

(21) Appl. No.: 17/485,166

(22) Filed: Sep. 24, 2021

(65) Prior Publication Data

US 2022/0129389 A1    Apr. 28, 2022

Related U.S. Application Data

(60) Provisional application No. 63/156,224, filed on Mar. 3, 2021, provisional application No. 63/105,820, filed on Oct. 26, 2020.

(51) Int. Cl.
*G06F 12/14* (2006.01)
*G06F 21/79* (2013.01)

(52) U.S. Cl.
CPC ...... *G06F 12/1408* (2013.01); *G06F 12/1441* (2013.01); *G06F 12/1466* (2013.01); *G06F 21/79* (2013.01)

(58) Field of Classification Search
CPC ............. G06F 12/1408; G06F 12/1441; G06F 12/1466; G06F 21/79
See application file for complete search history.

(56) References Cited

U.S. PATENT DOCUMENTS

| 8,613,074 B2 * | 12/2013 | Rudelic ............... G06F 12/1466 726/16 |
| 8,856,918 B1 * | 10/2014 | Efstathopoulos ....... G06F 21/44 726/19 |

(Continued)

OTHER PUBLICATIONS

Sebastian Hobarth et al, A framework for on-device privilege escalation exploit execution on Android, IWSSI/SPMU (Year: 2011).*

(Continued)

*Primary Examiner* — Shanto Abedin
(74) *Attorney, Agent, or Firm* — Greenberg Traurig

(57) ABSTRACT

A security server to provide security services over a computer network based on security features of memory devices connected to host systems. For example, the security features of a memory device can include a unique device secret, a cryptographic engine, and an access controller to implement access privileges represented by cryptographic keys. After receiving identity data that is generated by the memory device and represented by a cryptographic key, the security server can determine authenticity of the memory device based on its copy of the unique device secret of the memory device. The security server can generate a verification code for a command and cause the command and the verification code to be communicated to the memory device, where the access controller of the memory device validates the verification code in determining whether to block execution of the command in the memory device.

20 Claims, 26 Drawing Sheets

(56) References Cited

U.S. PATENT DOCUMENTS

| | | | |
|---|---|---|---|
| 9,864,879 B2* | 1/2018 | Coker | G06F 21/72 |
| 9,930,051 B1* | 3/2018 | Potlapally | H04L 63/126 |
| 10,521,617 B2* | 12/2019 | Sela | G06F 21/79 |
| 11,409,872 B2* | 8/2022 | Miller | G06F 21/575 |
| 2009/0222910 A1* | 9/2009 | Le Bihan | H04L 9/3273 |
| | | | 726/19 |
| 2013/0205390 A1 | 8/2013 | Hauck et al. | |
| 2014/0331060 A1 | 11/2014 | Hayton | |
| 2015/0089247 A1* | 3/2015 | Kang | G06F 21/305 |
| | | | 713/193 |
| 2015/0169892 A1 | 6/2015 | Nord et al. | |
| 2015/0347786 A1* | 12/2015 | Yang | H04W 8/183 |
| | | | 726/26 |
| 2017/0026183 A1* | 1/2017 | Strong | H04L 9/3247 |
| 2017/0171174 A1 | 6/2017 | Campagna | |
| 2018/0254898 A1 | 9/2018 | Sprague et al. | |
| 2019/0116038 A1 | 4/2019 | Sprague | |
| 2019/0149334 A1 | 5/2019 | Van Der Velden | |
| 2019/0236293 A1* | 8/2019 | Goodridge | H04L 63/105 |
| 2019/0273607 A1 | 9/2019 | Van Der Velden et al. | |
| 2019/0363889 A1* | 11/2019 | Wang | G06F 21/32 |
| 2020/0042465 A1* | 2/2020 | Duval | G06F 12/1433 |
| 2020/0052905 A1 | 2/2020 | Mathias et al. | |
| 2020/0133887 A1* | 4/2020 | Avanindra | G06F 21/602 |
| 2020/0410097 A1* | 12/2020 | Miller | G06F 21/64 |
| 2021/0051012 A1 | 2/2021 | Law | |

OTHER PUBLICATIONS

Salman, Tara, et al., "Security Services Using Blockchains: A State of the Art Survey." IEEE Communications Surveys & Tutorials, IEEE, Aug. 7, 2018.

Zhang, Wenfang, et al., "Secure and Efficient Authentication and Key Agreement Protocol Using Certificateless Aggregate Signature for Cloud Service Oriented VANET." Electronic Journal, Abstract only, Sep. 15, 2020.

* cited by examiner

ONLINE SECURITY SERVICES BASED ON SECURITY FEATURES IMPLEMENTED IN MEMORY DEVICES

RELATED APPLICATIONS

The present application claims the benefit of the filing date of Prov. U.S. Pat. App. Ser. No. 63/105,820, filed Oct. 26, 2020 and entitled "Virtual Subscriber Identification Module and Virtual Smart Card," where the present application also claims the benefit of the filing date of Prov. U.S. Pat. App. Ser. No. 63/156,224, filed Mar. 3, 2021 and entitled "Online Security Services based on Security Features Implemented in Memory Devices," the entire disclosures of which applications are hereby incorporated herein by reference.

The Present Application relates to U.S. patent application Ser. No. 17/005,565, filed Aug. 28, 2020 and entitled "Secure Memory System Programming for Host Device Verification," which claims the benefit of the filing date of Prov. U.S. Pat. App. Ser. No. 63/059,617, filed Jul. 31, 2020, U.S. patent application Ser. No. 17/080,684, file Oct. 26, 2020 and entitled "Endpoint Authentication based on Boot-Time Binding of Multiple Components," U.S. patent application Ser. No. 16/374,905, filed Apr. 4, 2019, entitled "Onboarding Software on Secure Devices to Generate Device Identities for Authentication with Remote Servers," and published as U.S. Pat. App. Pub. No. 2020/0322134 on Oct. 8, 2020, and U.S. patent application Ser. No. 17/014,203, filed Sep. 8, 2020 and entitled "Customer-Specific Activation of Functionality in a Semiconductor Device," the entire disclosures of which applications are hereby incorporated herein by reference.

TECHNICAL FIELD

At least some embodiments disclosed herein relate to authentication in general, and more particularly, but not limited to authentication of a communication endpoint having a secure memory device in a network.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

Standards for Device Identity Composition Engine (DICE) and Robust Internet-of-Things (RIoT) have been developed for the computing of data for the identification and authentication of identities of computing devices based on cryptographic computations.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
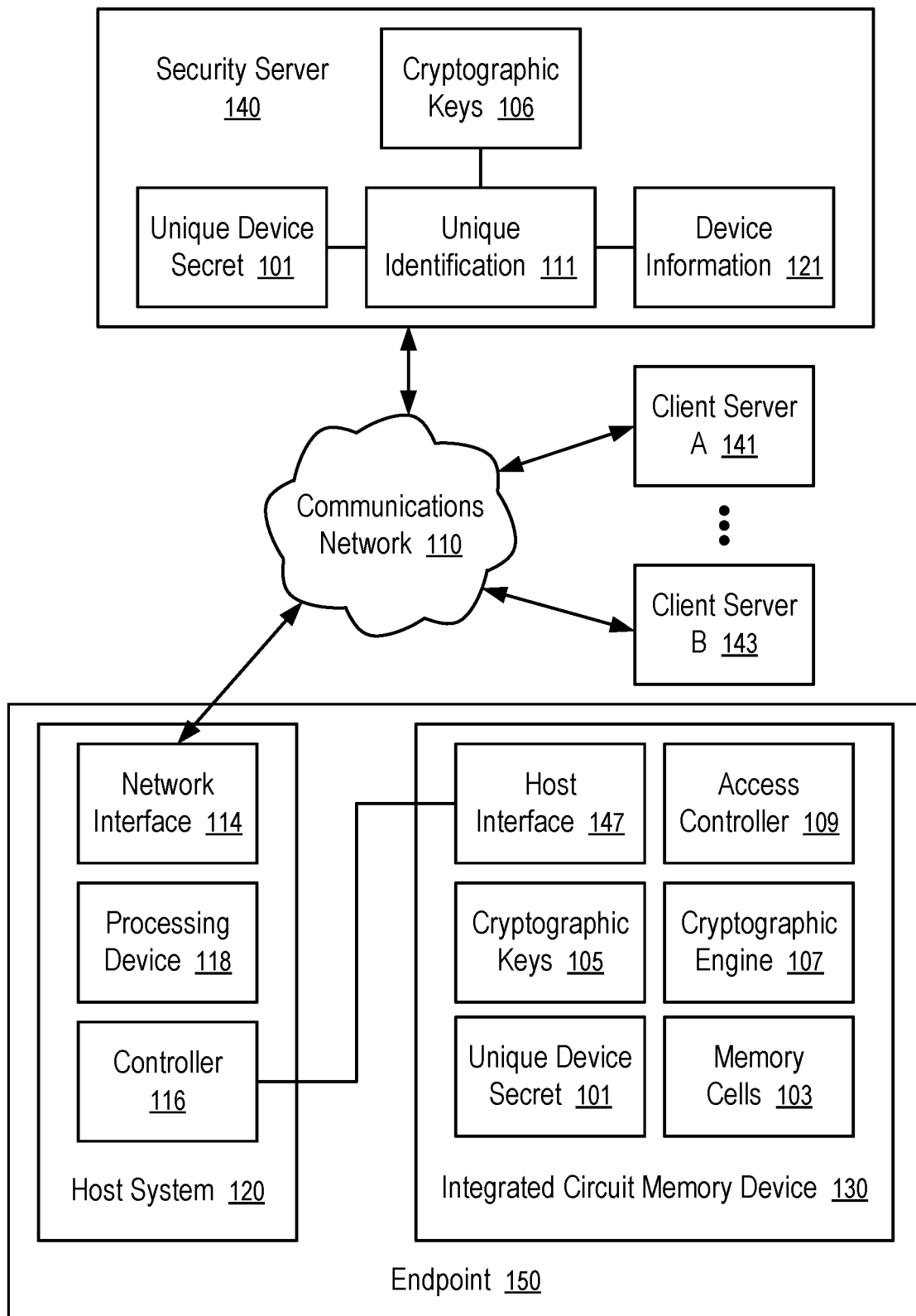
FIG. 1 illustrates an example computing system in accordance with some embodiments of the present disclosure.

At least some aspects of the present disclosure are directed to a security server and memory devices having security features. The security server is configured to provide online security services in a computer network (e.g., Internet) based on the security features of the memory devices. Host systems of the memory devices can use the memory and/or storage functions of the memory devices to store instructions and/or data for processing and to store processing results.

In general, a memory sub-system can include a storage device and/or a memory module. A host system can utilize a memory sub-system that includes one or more components, such as memory devices that store data. The host system can provide data to be stored in the memory sub-system and can request data to be retrieved from the memory sub-system.

For example, a portion of the data stored in a memory device can be instructions, such as instructions programmed for software, firmware, a boot-loader, an operating system, a routine, a device driver, an application package, etc. The instructions can be stored for a computing device that is implemented using a host system to which the memory device is connected.

Another portion of the data stored in the memory device can provide operands or inputs to the instructions when the instructions are executed in one or more processing devices of the host system.

A further portion of the data stored in the memory device can include results generated from the executions of the instructions using the inputs stored in the memory device and/or other inputs.

Examples of such a computing device include a personal computer, a mobile computer, a tablet computer, a personal media player, a smartphone, a smart TV, a smart speaker, a smart appliance, an IoT (Internet of Things) device, etc.

Security features implemented in a memory device can be used to secure communications between the memory device and the security server over a computer network. The communication path between the memory device and the security server may not be secure. Through communications between the security server and the memory device allows the validation of the identity of the memory device and/or the control of access to the memory device to prevent and detect counterfeit, tampering, hacking, and/or insecure operations.

The combination of the security features of the memory device and the security services of the security server allows various parties involved in the use of the memory device and/or the computing device having the memory device to have confidence in the authenticity of the computing device and/or the memory device and have confidence in the integrity of data stored in the memory device, such as instructions to be executed in the computing device and inputs to the instructions.

For example, the security server and the memory device can be combined to implement a replacement of a subscriber identity module (SIM).

A SIM card is conventionally used to represent the identity of a subscriber of a cellular service in a telecommunications network. When a SIM card is inserted into a cellular phone, the cellular phone can access the cellular service provided to an account of the subscriber; and when the SIM card is inserted into an alternative cellular phone, the subscriber can access the cellular service associated with the account using the alternative cellular phone.

When the identity of a memory device installed in a cellular phone can be securely configured to represent the identity of a subscriber, the need for a physical SIM card can be eliminated. The identity of the memory device can be configured and protected via the security features of the memory device and security services of the security server.

In general, the security server can be configured on the Internet to provide security-related services to third party computers and servers based on the security features built into memory devices. The security features are built and packaged into the memory devices. The security features and the security services can be used without trusting the security implementations of computing devices in which the memory devices are installed. Thus, security implementations can be centralized in the design of the security features of the memory devices and the security server. By simply using the memory devices having the security features, the security of the computing devices that use the memory devices can be improved without much effort on the designers and/or manufacturer of the computing devices.

The security server can offer services to verify the identity and/or authenticity of devices, to detect counterfeit devices and/or tampered devices, to track and manage ownership of devices, to facilitate transfer of ownership/control of devices, to facilitate the configuring of computing devices to access services of third party servers and/or service networks, etc.

Security features of a memory device can be implemented within the integrated circuit (IC) package of the memory device during the manufacture of the memory device. The memory device can have a logic circuit (or controller) and memory cells formed on one or more integrated circuit dies. At least some of the memory cells of the memory device can be non-volatile such that data can be held in the non-volatile memory cells even when the memory device is not powered for an extended period of time (e.g., days, months, or even years). The non-volatile memory of the memory device can be used to store instructions and data for the operations of a host system of the memory cell.

The memory device can have a Unique Device Secret (UDS). The unique device secret can be secured within the memory device such that after the completion of the manufacture of the memory device, the unique device secret is not communicated to outside of the memory device and not readable by a host system via any interface of the memory device.

The presence of the unique device secret in the memory device can be verified by the security server through cryptographic computations, such as generation of cryptographic keys, generation of a hash value of a message using a cryptographic function, and generation of a cipher text of a message through encryption of the message using a cryptographic key.

The cryptographic computation of encrypting a message using a cryptographic key involves the computation of a cipher text to represent the message. The message can be recovered efficiently from the cipher text using a corresponding cryptographic key by performing a predefined decryption computation. Without the corresponding cryptographic key for decryption, it is generally impractical to recover the message from the cipher text. The level of difficulty to recover the message without the knowledge of the corresponding cryptographic key for decryption represents the security level of the encryption computation. The security level depends generally on the length of the cryptographic key used in encryption and the algorithm used in the encryption.

When symmetric cryptography is used, the cryptographic key for decryption and the cryptographic key for encryption are the same. When asymmetric cryptography is used, the decryption key and the encryption key are different and are generated as a pair. One of the pair can be used as a private key and thus a secret; and the other of the pair can be used as a public key. It is generally impractical to compute the private key from the public key. The level of difficulty to recovery the private key from the public key represents the security level of the asymmetric cryptography.

The cryptographic computation of hashing a message maps the message to a hash value to represent the message. However, an amount of information is lost in the hashing computation such that the message cannot be recovered from the hash value. Many messages can be mapped to the same hash value. It is generally impractical to generate a modified version of the message that can be hashed to the same hash value, especially when the modified version is similar to the original message.

The cryptographic computation of key generation involves the computing of a cryptographic key for symmetric cryptography, or a pair of cryptographic keys for asymmetric cryptography, based on a set of data. The probability of generating the same key, or the same key pair, without the same set of data is low. The level of the probability represents the strength of the cryptographic computation used in the key generation.

In general, any techniques of cryptographic computations for encryption, hashing, and key generation can be used with the memory device and the security server. Thus, the present disclosure is not limited to a specific technique of encryption, hashing, and/or key generation.

In addition to the unique device secret, the memory device can store additional data to represent the data and/or hardware configuration of the memory device and/or the computing device in which the memory device is installed. A portion of the additional data may or may not be kept as secrets of the memory device. The unique device secret and the additional data can be used to generate a secret cryptographic key to represent the identity of the memory device and/or the computing device.

The logic circuit (or local controller) of the memory device can implement a cryptographic engine, an identity engine, and an access controller. The cryptographic engine of the memory device is configured to perform cryptographic computations (e.g., hashing, encrypting/decrypting, key generation) within the memory device to support the operations of the identity engine and the access controller. The implementation of the cryptographic engine in the memory device avoids the need to rely upon an external processor for security computations of the memory devices and thus improves security by preventing the transmission of secrets to outside of the memory device and by preventing tampering and hacking cryptographic computations. Optionally, at least part of the cryptographic computations involved in the security features of the memory device can be implemented via storing instructions in the memory device for execution by the host system of the memory device, with a level of trade-off between security level and complexity of the logic circuit (or local controller) of the memory device.

The cryptographic engine of the memory device can be used to apply a cryptographic hash function on a message to generate a hash value, to generate a symmetric cryptographic key or a pair of asymmetric cryptographic keys from a set of data, to generate the cipher text of a message using a cryptographic key, and/or to recover a message from the cipher text using a cryptographic key.

The access controller of the memory device is configured to use cryptographic keys to control the executions of commands received in the memory device. For example, privileges can be required to request the memory device to execute commands to read, write, delete, modify, etc., various portions of the non-volatile memory of the memory device. The privileges can be represented by respective cryptographic keys. After a privileged command is received in the memory device for execution, the access controller can use the cryptographic engine to perform computation in determining whether the command is from a sender having a cryptographic key that represent the privilege. The access controller allows the command to be executed within the memory device after the computation indicates that the sender has the cryptographic key and thus, the privilege. Otherwise, the access controller can reject, ignore, or discard the command. Such access control can prevent unauthorized access to data stored in the memory device, prevent unauthorized changes to the memory device, and prevent tampering and/or hacking to create counterfeits of the memory device, and/or insecure devices.

In general, verifying whether a sender of a message has a cryptographic key involves the validation of a verification code of the message. The verification code can be in the form of a hash digest, a digital signature, a Hash-based Message Authentication Code (HMAC), a Cipher-based Message Authentication Code (CMAC), etc. The verification code is generated using the cryptographic key and the message as an input to cryptographic operations such as hashing, encrypting, and/or other computations such that it is generally impractical to generate the verification code without the cryptographic key and to generate the verification code from modified version of the message. Thus, when the recipient confirms that the received verification code is valid for the received message and a cryptographic key, the recipient can conclude that the sender has the corresponding cryptographic key and the received message is the same as the message used to generate the received cryptographic key.

In some implementations, the recipient performs the validation of a verification code of a message using the same cryptographic key as used by the sender to generate the verification code. For example, the recipient uses the same cryptographic key to generate the verification code of the received message and compare the generated verification code with the received verification code. If there is a match, the received verification code is valid for the received message; and the sender can be considered to have the cryptographic key. Otherwise, the received verification code is invalid for the received message; either the received message has been changed since the generation of the verification code, or the received verification code was generated using a different cryptographic key, or both.

In some implementations, the recipient performs the validation of a verification code of a message using a public cryptographic key in a key pair; and the sender generates the verification code using a private cryptographic key in the key pair. For example, the verification code can be generated by applying a hash function to the message to generate a hash value of the message. The cipher text of the hash value obtained through encrypting the hash value performed using an encryption key can be used as the verification code. A recipient of the message and the verification code performs validation using a corresponding decryption key, which is the same as the encryption key when symmetric cryptography is used and is a different key in a key pair when asymmetric cryptography is used. After recovering a hash value from the cipher text using the decryption key, the recovered hash value can be compared to the hash value of the received message; if there is a match, the received verification code is valid for the received message; otherwise, the received verification code is invalid for the received message. Alternatively, the recipient can use the encryption key to perform the validation without performing decryption. The recipient can generate the verification code of the message using the encryption key for comparison with the received verification code.

In some implementations, a message and a cryptographic key is combined to generate a hash value as the verification code, as in a technique of Hash-based Message Authentication Code (HMAC). For example, a cryptographic key can be used to generate two keys. After combining one of the two keys with the message to generate a message modified by the key, a cryptographic hash function can be applied to the key-modified message to generate a hash value, which is further combined with the other key to generate a further message. After applying the cryptographic hash function (or another cryptographic hash function) to the further message, a hash-based message authentication code is generated. A recipient of the message can use the same cryptographic key to generate the hash-based message authentication code of the received message for comparison with the received hash-based message authentication code. If there is a match, the validation is successful; otherwise, the validation fails.

In general, any techniques for generating and validating a verification code for a message from a sender and a cryptographic key used by the sender to generate the verification code can be used to determine whether the sender has the cryptographic key. The recipient is to use an appropriate cryptographic key to perform the validation, which can be the same as the cryptographic key used to generate the verification code, or in the same pair of asymmetric cryptographic key. Thus, the present disclosure is not limited to a particular technique of hash digest, digital signature, and/or hash-based message authentication code.

For convenience, a verification code generated for a message using a cryptographic key to represent both the message and the cryptographic key can be referred to, generally, as a digital signature of the message signed using the cryptographic key, with the understanding that the verification code can be generated using various techniques, such as hash-based message authentication code.

The memory device can be configured to store relevant cryptographic keys for validating the verification codes signed using cryptographic keys configured to represent the privileges to request the memory device to execute the commands.

For example, the access controller can provide a set of privileges to an owner of the memory device such that the owner can activate or deactivate one or more security features of the memory device, change one or more security settings, parameters, configurations, or preferences of the memory device, and/or read data from a section of the memory device that is not readable by other users of the memory device.

For example, the access controller can provide certain privileges to authorized users of the memory device to read, write, erase, or modify specific sections of the memory device.

When the memory device receives a command that requires an access privilege for execution, the access controller can retrieve a corresponding cryptographic key to validate a verification code or digital signature for a message that includes the command. If the validation of the verification code received for the received command is successful, the received command is considered to be from a sender that has the cryptographic key representing the privilege to have the command executed in the memory device. In response, the access controller allows the execution of the command in the memory device. Otherwise, the access controller blocks the execution of the command.

The memory device can be manufactured to be initially owned by the security server. Subsequently, the security server can provide and/or transfer some or all privileges to one or more owners and users, in a processing starting from the memory device being assembled into a computing device to the computing device having the memory device being used by an end user. The access controller can prevent tampering, hacking, and unauthorized access, while providing the flexibility to support different patterns of privilege transfer to different owners and users, such as a manufacturer of a component computing device in which the memory device is installed, a manufacturer of a computing device in which the component computing device is installed, a retailer, an enterprise user, an end user, and an alternative end user, etc.

The identity engine of the memory device is configured to generate data indicative of the identity of the memory device and/or the identity of the computing device in which the memory device is installed. To generate the identity data, the identity engine uses the cryptographic engine to generate a secret cryptographic key from the unique device secret and other data stored in the memory device and/or collected by the memory device (e.g., during the boot up process of the computing device). The presence of the secret cryptographic key in the memory device can be considered the evidence that the memory device is in possession of the unique device secret and the other data used in the generation of the secret cryptographic key. The presence of the secret cryptographic key in the memory device can be validated by the security server via a verification code or digital signature signed using the secret cryptographic key.

During the manufacture of the memory device, a copy of the unique device secret is registered in the security server and/or securely shared without exposure. Subsequently, the security server is configured to derive the same secret cryptographic key (and/or a corresponding public key when asymmetric cryptography is used) independently from the memory device without the memory device communicating its unique device secret outside of the memory device. Thus, the security server can validate that the memory device has the unique device secret by validating that the memory device having the secret cryptographic key; and the secret cryptographic key as the identity of the memory device can change in the processing of the memory device being integrated into a component, a device, a system, and being transferred among manufacturers, retailers, distributors, corporations, and/or end users. Without changing the unique device secret, the entity of the memory device as represented by a secret cryptographic key can be updated to represent the memory device as being assembled into a component, a device, a system, as being customized and/or personalized, and/or as being owned and/or operated by different entities or users.

Cryptographic operations and communications can be performed to allow the security server to verify that the memory device has the secret cryptographic key.

For example, the identity data presented by the memory device for verification can include a message showing a public identification of the memory device. The public identification can be used to tell the memory device apart from other memory devices. The identity data can include a verification code or digital signature of a message in the identity data signed using the secret cryptographic key. The identity data includes a copy of the message and the verification code or digital signature. Once the verification code and the message data is validated by the security server, the security server can conclude that the public identification provided in the identity data is authentic and the identity data is from the memory device having the secret cryptographic key.

The secret cryptographic key of the memory device can be generated using not only the unique device secret of the memory device, but also additional data representative of some aspects of the memory device, and/or the computing device in which the memory device is installed. The additional data can be representative of software, firmware, boot-loader, applications, trace data stored in the memory device, identifiers of components of the computing device that are in the computing device at a most recent boot up time of the computing device. If the additional data has been altered, the identity engine generates an altered secret cryptographic key. As a result, the verification code generated using the altered secret cryptographic key cannot pass the verification performed at the security server. Thus, the validation of the verification code generated by the identity engine also validates the integrity and authenticity of the hardware/software/data composition of the memory device and the computing device in which the memory device is installed.

Validation of the identity of a memory device and/or its host system can detect counterfeit, tampering, and stolen/lost devices. Based on a request from the owner, the security server can configure a stolen/lost device to operate in one of a number of degraded modes, such as non-bootable, non-readable, encryption/erasure of data in the non-volatile memory, self-destruction of memory/storage functionality of the memory device, etc.

The security server is configured with a database of information for the validation of identity data generated by the identity engines of memory devices. The database allows the security server to generate the corresponding secret cryptographic keys of the memory devices (and/or the corresponding public keys when asymmetric cryptography is used). The cryptographic keys can be generated by the security server without the memory devices communicating their unique device secrets outside of the memory devices after the manufacture of the memory devices. The cryptographic keys can be generated based at least in part on the additional data that is available after the manufacture of the memory devices.

The security server can store a cryptographic key representative of the owner privileges of a memory device. Using the cryptographic key, the security server can generate commands to transfer ownership of the memory device and configure and/or transfer selected privileges to have selected commands executed in the memory device. After a computing device is reported to be lost/stolen, the security server can detect the use of its memory device during the validation of the memory device in connection with a request for service with a third party server.

For example, when the third party server receives a request for services from a computing device having the memory device, the third party server forwards the identity data generated by the memory device from the computing device to the security server for validation. If the identity data is validated by the security server, the third party server can provide services to the computing device; otherwise, the service request can be rejected, discarded, or ignored.

When requested by an authorized party, the security server can sign commands or generate verification codes for the commands to grant or revoke access to non-volatile memory of the memory device. The authorized party can forward the signed commands to the memory device for execution. A signed command includes a message having the command and a verification code for the message signed/generated using a cryptographic key representative of the privileges to have the command executed in the memory device.

The memory device can be installed in a computing device as part of the identity of the computing device and to provide the main memory/storage capacity for the computing device. For example, the instructions to be executed in the computing device and the associated data can be stored in the memory device and protected via security features of the memory device against corruption, tampering, and/or hacking. Since the identity data generated by the identity engine of the memory device is based at least in part on the instructions/data stored in the memory device, the integrity and/or authenticity of the instructions and data to be used by the computing device is validated at least during the process of verifying the identity of the memory device and/or the computing device.

The security services provided by the security server relieves the third party servers from securing operations and computing devices. Unauthorized access can be prevented by the use of the memory devices and the services of the security server without much efforts from manufacturers of the computing devices and the operators of the third party servers. Thus, the third party servers can operate on their core competence in providing their respective services without compromising security.

The services provided by the security server can be used by a third party server to provide their services to their subscribers without the subscribers performing manual operations to configure the computing devices used by the subscribers. For example, a subscriber can use a computing device to access the subscribed cellular service in the account of the subscriber without having to insert a physical SIM card into the computing device and/or perform other operations to customize the computing device to access using the account of the subscriber.

Subscribers can be represented by account identifications. When a subscriber purchases a computing device, the ownership of the computing device can be transferred to the subscriber through the security server. The security features of the memory device configured in the computing device can be used to generate a device identity. When the computing device is connected to the third party server for services, the third party server requests the security server to validate the device identity. Based on the ownership of the computing device and the ownership of the account, the computing device can be linked to the account dynamically to allow the computing device to access the services provided by the third party using the account without manual operations to configure the computing device.

For example, during the validation of the identity of the computing device, the owner/subscriber of the computing device is identified through the ownership management service of the security server. Once the owner/subscriber is identified, the subscriber identification can be built into the device identity of the computing device, or associated with the device identity in the database of the security server. Subsequently, when the device identity is validated, the services in the account of the subscriber can be provided by the third party to the computing device without the need for the subscriber to explicitly direct/request the services to the computing device.

Optionally, the computing device can establish separate credential with the third party server such that it is not necessary for the third party server to contact the security server each time the computing device connects to the third party server for services.

FIG. 1 illustrates an example computing system in accordance with some embodiments of the present disclosure.

In FIG. 1, an integrated circuit memory device 130 has security features as discussed above.

The secure memory device 130 can store a unique device secret 101 for its authentication. In one example, the unique device secret 101 is injected into the memory device 130 in a secure facility and stored in a register of the memory device 130. In another example, the unique device secret 101 can be obtained from a physical unclonable function (PUF) of the memory device 130. The unique device secret 101 can be obtained and registered in the security server 140 via the secure facility. For example, the secure facility can be part of a manufacturing facilities of memory devices (e.g., 130). After the memory device 130 is manufactured and/or leaves the secure facility, the unique device secret 101 in the memory device 130 is not accessible via any interface (e.g., host interface 147) to the memory device 130. Thus, after the manufacture of the memory device 130, the unique device secret 101 as in the memory device 130 is sealed in the integrated circuit package of the memory device 130. A copy of the unique device secret 101 is secured within the security server 140 with strong security measures (e.g., use of hardware security module (HSM)) to prevent hacking and unauthorized access.

The memory device 130 includes a logic circuit or local controller that implements a cryptographic engine 107. The cryptographic engine 107 can perform cryptographic computations, such as hashing, key derivation, encrypting, and/or decrypting, without relying upon the processing power outside of the memory device 130, such as a processing device 118 of a host system 120.

For example, according to a method specified by standards for Device Identity Composition Engine (DICE) and Robust Internet-of-Things (RIoT), or another method, cryptographic keys 105 can be generated, at boot time, based on a combination of the unique device secret 101 and device information 121 stored and/or obtained in the memory cells 103 of the memory device 130. The device information 121 can include non-secret data that may be obtained by the entity outside of the security server 140 and the memory device 130. For improved security, the device information 121 can include time related information.

For example, the cryptographic keys 105 can include two pairs of asymmetric cryptographic keys. A first pair of asymmetric keys is referred to as device identification keys; and a second pair of asymmetric keys is referred to as alias keys. The private device identification key is used to certify the authenticity of the alias keys and thus reduces its uses and exposure to risks. The alias keys can be used in more transactions/communications; and the alias keys can be replaced more frequently than the device identification keys to improve security in view of their more frequent uses and thus exposure to risks. For example, the private device identification key can be generated at a boot time and used to sign certificates, such as a certificate of the alias public key; and then the private device identification key is immediately deleted from the memory device 130 to safeguard its secrecy.

In general, one of the cryptographic keys 105 generated using the unique device secret 101 and the device information 121 can be used as a secret and an identity of the memory device 130 to be validated by the security server 140.

For example, authentication of the memory device 130 can be performed through the verification that the memory device 130 has the secret cryptographic key 105. Having the secret cryptographic key 105 in the memory device 130 can be considered as evidence that the memory device 130 has the unique device secret 101 and stores an untampered version of non-secret data.

Using the cryptographic engine 107, the memory device 130 can demonstrate that the memory device 130 has the secret cryptographic key 105 without communicating the secret cryptographic key 105 and/or the unique device secret 101 to outside of the memory device 130. For example, the memory device 130 can digitally sign a certificate or message using the secret cryptographic key 105 to provide a verification code of the message and the secret cryptographic key 105. When the security server 140 is successful in validating the verification code, the security server 140 can conclude that the memory device 130 has the secret cryptographic key 105 and thus the identity represented by the unique device secret 101.

The memory device 130 includes a host interface 147 that can be used to receive commands from a host system 120. A controller 116 of the host system can send commands to the memory device 130 to request reading data from the memory cells 103, to write data into the memory cells 103, to erase data from a portion of the memory cells 103, to modify data in a portion of the memory cells 103, to activate a security feature of the memory device 130, to configure parameters relevant to a security feature in the memory device 130, etc. At least some of the commands requires privileges represented by a cryptographic key 106 stored in the security server 140. Having the cryptographic key 106 available to sign the command is considered an indication of having the privilege to request the memory device 130 to execute the command.

The memory device 130 includes an access controller 109 configured to use the cryptographic engine 107 to validate a verification code generated using a cryptographic key 106 representing the privilege associated with the command. If a command is received with a valid verification code, the access controller 109 allows the memory device 130 to execute the command; otherwise, the command can be rejected, ignored, or discarded.

When the memory device 130 is manufactured, one or more relevant cryptographic keys 105 are stored in the memory device 130 to provide the owner privileges to the security server 140. Using the owner privileges, the security server 140 can sign commands for execution in the memory device 130 to activate or deactivate security features, to trigger the replacement of a secret cryptographic key as the identity of the memory device 130, to replace a cryptographic key used by the access controller 109 in verify privileges to have one or more commands executed in the memory device 130 for one or more regions of the memory cells 103, etc.

Optionally, after authenticating the identity of an authorized requester, the security server 140 can sign a command using a cryptographic key to generate a verification code or digital signature for the command such that the requester can send the command with the verification code to the host interface 147 of the memory device 130 to cause the command to be executed within the memory device 130.

Optionally, the security server 140 can provide certain privileges to an entity by replacing a cryptographic key 105 in the memory device 130, or to provide a corresponding cryptographic key 106 representative of the privileges to the entity.

Typically, the memory device 130 is connected to a host system 120 to form an endpoint 150 in a communications network 110, such as the Internet. In general, the endpoint 150 is a computing device. Examples of the endpoint 150 include a personal computer, a mobile computer, a personal media player, a tablet computer, a smartphone, a smart TV, a smart speaker, a smart appliance, an IoT (Internet of Things) device, etc.

The memory cells 103 of the memory device 130 can provide the storage/memory capacity for the host system 120 to store instructions and data for the implementation of the functionality of the endpoint 150. For example, the processing device 118 of the host system 120 is configured to execute instructions loaded from the memory device 130 to boot up and perform operations.

The host system 120 can include a network interface 114, or another communication device, to communicate with one or more of client servers 141, . . . , 143 to receive services from the client servers 141, . . . , 143.

A request for services sent from the endpoint 150 to a client server 141 can include identity data generated by the cryptographic engine 107 of the memory device 130. The client server 141 can request the security server 140 to validate the verification code included in the identity data.

In addition to the services of authenticating the identity of the memory device 130, the security server 140 can offer security services to manage privileges to operate the memory device 130, to configure or change the security features or settings of the memory device 130, to detect lost/stolen devices, to deactivate lost/stolen devices, etc.

The memory device 130 and/or the endpoint 150 can have a unique identification 111 that is not a secret. The unique identification 111 can be used to uniquely identify the memory device 130 and/or the endpoint 150 from a population of memory devices and/or endpoints.

For example, the unique identification 111 of the memory device 130 can include a manufacturer part number (MPN) of the memory device 130 and/or a serial number of the memory device 130. For example, the unique identification 111 of the memory device 130 can include a public key in a pair of asymmetric cryptographic keys generated based at least in part on the unique device secret.

To authenticate that the memory device 130 and/or the endpoint 150 has the identity represented by the unique identification 111, the security server 140 validates a message containing the unique identification 111 (and other data 127) via a verification code of the message signed using a secret cryptographic key 105 of the memory device. The secret cryptographic key 105 in the memory device 130 is generated using the unique device secret 101 in the memory device; and the corresponding cryptographic key 106 used to validate a verification code signed using the secret cryptographic key 105 of the memory device 130 is generated in the security server 140 from the corresponding unique device secret 101.

The secret cryptographic key 105 of the memory device 130 used to demonstrate the identity of the memory device 130 can be generated based on not only the unique device secret 101, but also device information 121 accessible to the memory device 130.

For example, the device information 121 can include a hash value of instructions and/or data stored in the memory cells 103. Further, the device information 121 can include trace data stored into the memory cells 103 to personalize/individualize the memory device 130 and/or the endpoint 150 during the assembling of components to build the endpoint 150. Further, the device information 121 can include identification information of other components in the endpoint 150, such as an identification of the controller 116, an identification of the processing device 118, an identification of the network interface 114, an identification of additional software or data package of the endpoint 150 that is not stored in the memory device 130, and/or an identification and/or a hash value of the firmware configured to control/operate the memory device 130. During the boot time, the identification data can be collected as the device information 121 that is used to generate the secret cryptographic key 105 of the memory device 130.

In a registration process when the memory device 130 is configured to have the device information 121, a copy of the device information 121 is uploaded to the security server 140 for association with the unique identification 111 of the memory device 130 and/or the endpoint 150. The registration of the device information 121 allows the identity of the memory device 130 to be linked to the data, software and/or hardware configuration represented by the combination of the unique device secret 101 with the device information 121.

Figure 2:
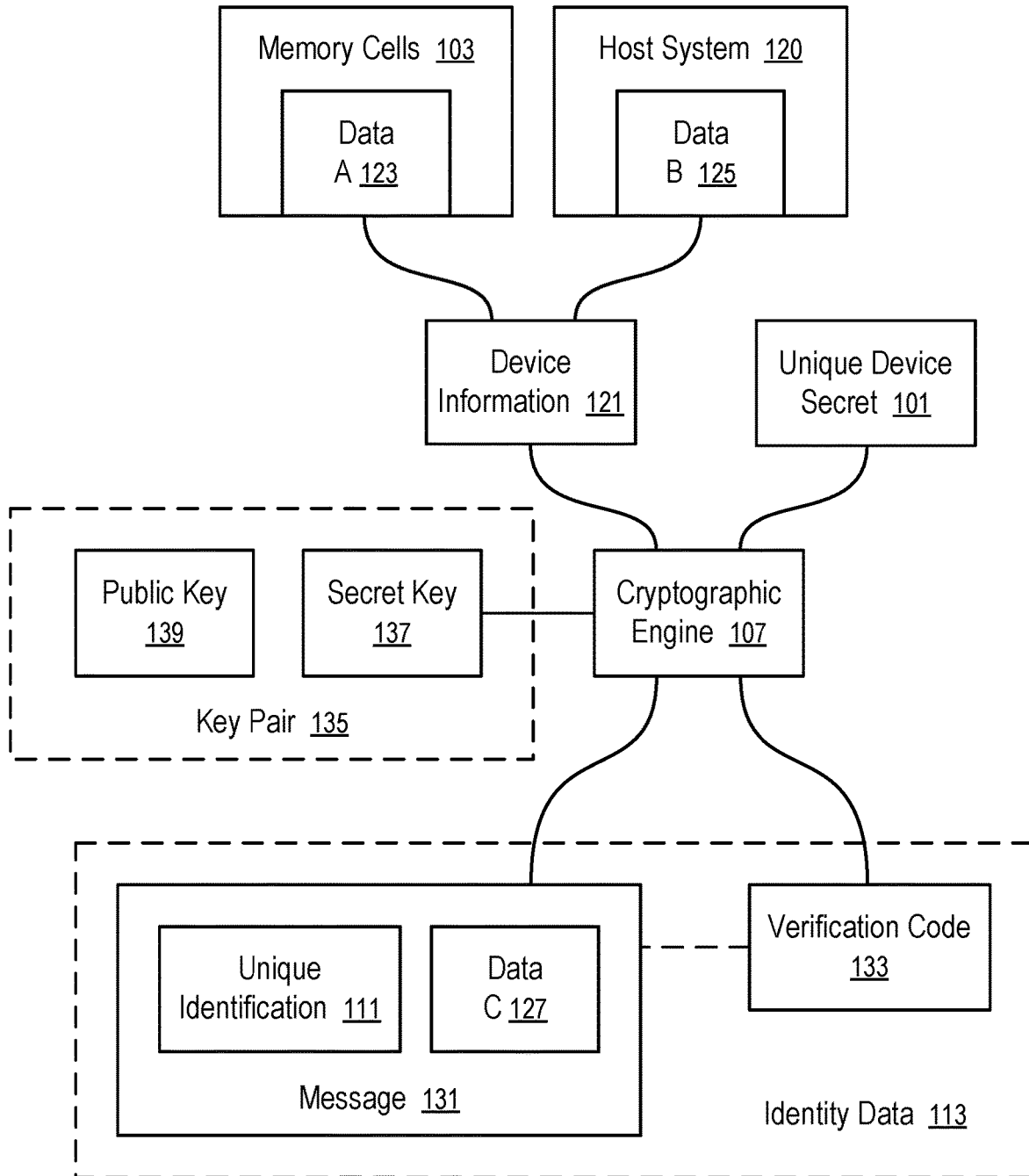
FIG. 2 illustrates the generation of identity data in an integrated circuit memory device according to one embodiment.

FIG. 2 illustrates the generation of identity data in an integrated circuit memory device according to one embodiment. For example, the technique of FIG. 2 can be implemented in the computing system of FIG. 1.

In FIG. 2, the cryptographic engine 107 of a memory device 130 (e.g., as in FIG. 1) is used to generate at least a secret key 137 using its unique device secret 101 and device information 121.

For example, when asymmetric cryptography is used, the secret key 137 is a private key of a cryptographic key pair 135. An associated public key 139 is generated together with the private key using the cryptographic engine 107.

Alternatively, when symmetric cryptography is used, the secret key 137 can be generated and used without a public key 139 and without the key pair 135.

In some implementations, multiple key pairs 135 are generated and used. For example, when a method of Device Identity Composition Engine (DICE) and Robust Internet-of-Things (RIoT) is used, a first pair of asymmetric keys is referred to as device identification keys; and a second pair of asymmetric keys is referred to as alias keys. The private device identification key can be used to certify the authenticity of the alias keys and then immediately deleted and purged from the memory device 130 and/or the endpoint 150 to safeguard its secrecy, especially when the generation or use of the private device identification key occurs at least in part in the host system 120. The alias keys can be used in authentication in further transactions and/or communications. For example, the private device identification key can be generated at a boot time and used to sign certificates, such as a certificate of the alias public key, and then deleted. After the identity of the memory device 130 and the authenticity of the public alias key are validated or confirmed using the certificates signed using the private device identification key as the secret key 137, the private alias key can then be used as the secret key 137 of the memory device 130 in subsequent operations, until the endpoint 150 reboots.

For example, the data 123 stored in the memory cells 103 for the device information 121 can include a set of instructions (e.g., software, firmware, operating system, application) to be executed by the processing device 118 of the host system 120 to which the host interface 147 of the memory device 130 is connected.

For example, the data 123 can include a cryptographic hash value of the set of instructions. For example, a known hash value of the set of instructions can be stored in the memory cells 103; and the current hash value of the set of instructions can be computed for comparison with the known hash value. If the two hash values agree with each other, the integrity of the set of instructions is verified; and the hash value of the integrity of the set of instructions can be used as part of the device information 121 to compute the secret key 137.

Alternatively, the current hash value of the set of instructions stored in the memory cells 103 can be used directly in the calculation of the secret key 137. If the instructions have changed (e.g., due to data corruption and/or tampering or hacking), the validation of the secret key 137 by the security server 140 will fail.

Optionally, the data 123 can include an identification of the set of instructions, such as a hash value of the source code of the instructions, a name of the software/firmware package represented by the instructions, a version number and/or a release date of the package, etc.

Optionally, the data 123 can include trace data stored into the memory cells 103 during the process of building and/or customizing the endpoint 150 that includes the memory device 130. For example, when the memory device 130 is assembled into a component device (e.g., a memory subsystem), a piece of trace data representative of the manufacturer of the component device, the model of the component device, and/or the serial number of the component device is stored into the memory cells 103 as part of the device information 121. Subsequently, when the component device is assembled into the endpoint 150, a piece of trace data is added into the memory cells as part of the device information 121. Further trace data can be added to the memory cells 103 as part of the device information 121 to reflect the history of the memory device 130 for the individualization of the identity of the memory device 130.

Optionally, the device information 121 can further include data 125 received from the host system 120 to which the host interface 147 of the memory device 130 is connected.

For example, the endpoint 150 can have the host system 120 and the memory device 130. Some of the components in the host system 120 may be removed or replaced. At the time of booting up the endpoint 150, a portion of the instructions stored the memory cell 103 is executed to collect data 125 about the components that are present in the host system 120 at the boot time. Thus, the device information 121 can represent a particular configuration of software/data and hardware combination of the memory device 130 and/or the endpoint 150. The secret key 137 generated based on the device information 121 and the unique device secret 101 represent the identity of the memory device 130 with the particular configuration.

To demonstrate the identity of the memory device 130 and/or the endpoint 150, the cryptographic engine 107 generates a verification code 133 from a message 131 and the secret key 137.

As discussed above, the verification code 133 of the secret key 137 and the message 131 can be constructed and/or validated using various techniques, such as hash digest, a digital signature, or a hash-based message authentication code, symmetric cryptography, and/or asymmetric cryptography. Thus, the verification code 133 is not limited to a particular implementation.

Optionally, the message 131 can include a user identification, such as a name, an email address, a registered user name, or another identifier of an owner or authorized user of the endpoint 150 in which the identity data 113 is generated.

Optionally, part of the message 131 can provide information in an encrypted form. For example, the information can be encrypted using a public key of the security server 140 such that the information is not accessible to a third party.

The message 131 can be a certificate presenting the unique identification 111 of the memory device 130 and/or the endpoint 150. The message 131 can further present other data 127, such as a counter value maintained in the memory device 130, a cryptographic nonce, and/or other information related to the validation of the identity data 113. The memory device 130 can monotonically increase the counter value to invalidate identity data that have lower counter values to prevent replay attacks.

In some implementations, the data 127 can include part of the device information 121 used to generate the secret key 137.

In some implementations, the secret key 137 is a private alias key in a pair of asymmetric keys. The data 127 includes a certificate presenting the corresponding public alias key in the pair of asymmetric keys. The certificate presenting the public alias key is signed using a device identification key of the memory device 130. The public alias key can be used to validate the verification code 133 for the message 131 and the private alias key that is used as the secret key 137. Once the security server 140 validates the certificate presenting the public alias key, signed using the device identification key of the memory device 130 and provided as part of the data 127, the security server 140 can use the public alias key to validate the verification code 133 signed using the private alias key as the secret key 137. In such an implementation, the security server 140 can use the public alias key provided in the message 131 to validate the verification code 133 without having to regenerate the pair of alias keys; and the memory device 130 can generate the alias key pair 135 using data not known to the security server 140.

The certificate presenting the public alias key can be generated and validated in a way as in FIG. 2, where the secret key 137 is the device identification key generated using the device information 121 and the unique device secret 101. Optionally, the memory device 130 initially provides the security server 140 with the certificate having the public alias key. Subsequently, the memory device 130 can use the private alias key as the secret key 137 without including the public alias key in the message 131, or without including the certificate of the public alias key in the message 131.

The data 127 in the message 131 signed to generate the verification code 133 can include a challenge. For example, to challenge the memory device 130 to demonstrate that it is in possession of a secret key 137, a random data item can be presented as part of the data 127 to be signed using the secret key 137. In some implementations, a monotonically increasing counter value can be used as the challenge.

Further, the verification of the identity of the memory device 130 can include the use of multiple secret keys and verification codes signed using the secret keys. For example, a device identification secret key can be used to initially establish the authenticity of an alias secret key and the identity of the memory device 130; and subsequently, the alias secret key can be used to validate the authenticity of the identity of the memory device 130. In general, the device identification secret key and the alias secret key can be based on asymmetric cryptography or symmetric cryptography, since the security server 140 can generate the corresponding cryptographic keys generated by the memory device 130.

For improved security, the memory device 130 does not use the processing power outside of the memory device 130 to generate its copy of the secret key 137 and does not communicate the secret key 137 outside of the memory device 130. The generation and use of the secret key 137 are performed using the logic circuit of the cryptographic engine 107 sealed within the memory device 130.

Alternatively, part of operations to generate and use the secret key 137 can be implemented via a set of instructions stored in the memory cells 103 and loaded into the processing device 118 of the host system 120 for execution. For improved security, the secret key 137 is not communicated across the host interface 147 in clear text; and the instructions can be configured to purge the secret key 137 from the host system 120 after the generation and/or after the use.

The identity data 113 can be generated in response to the memory device 130 being powered up, in response to a request received in the host interface 147, and/or in response to the endpoint 150 boots up (e.g., by executing a bootloader stored in the memory cells 103). The data 127 can include a count value maintained in the memory device 130. The count value increases when the operation to generate the identity data 113 is performed. Thus, a version of the identity data 113 having a count value invalidates prior versions of the identity data 113 having count values lower than the count value.

Figure 3:
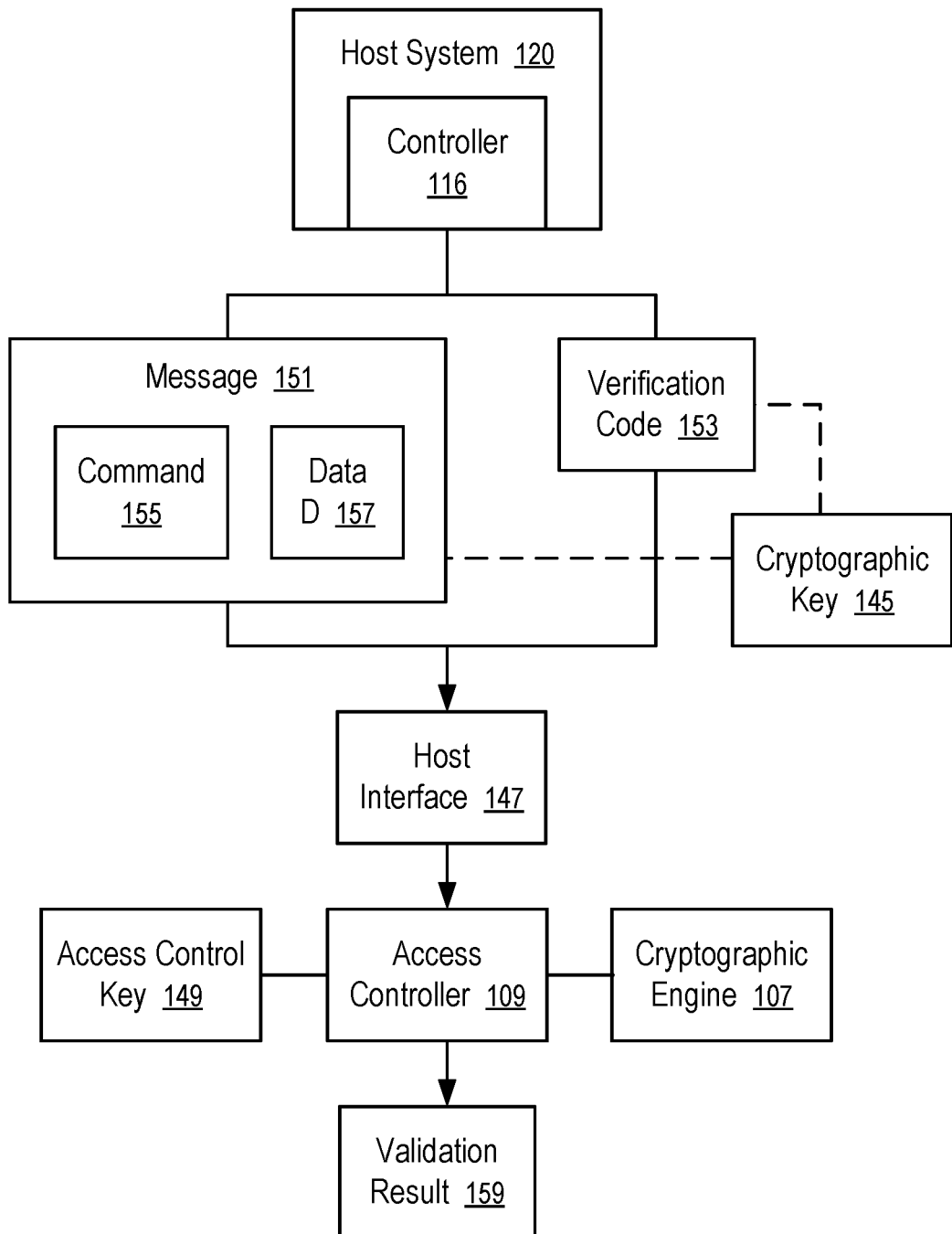
FIG. 3 illustrates a technique to control execution of a command in a memory device according to one embodiment.

FIG. 3 illustrates a technique to control execution of a command in a memory device according to one embodiment. For example, the technique of FIG. 3 can be implemented in the computing system of FIG. 1 and used with the technique of FIG. 2.

In FIG. 3, when the controller 116 of the host system 120 sends a command 155 to the host interface 147 of the memory device 130, the access controller 109 determines whether the sender of the command 155 has the privilege to request the memory device 130 to execute the command 155.

A cryptographic key 145 is configured to represent the privilege. A sender of the command 155 can generate a verification code 153 from the cryptographic key 145 and a message 151 containing the command 155.

As discussed above, the verification code 153 of the cryptographic key 145 and the message 151 can be constructed and/or validated using various techniques, such as hash digest, a digital signature, or a hash-based message authentication code, symmetric cryptography, and/or asymmetric cryptography. Thus, the verification code 153 is not limited to a particular implementation.

The access controller 109 uses a corresponding access control key 149 to validate the verification code 153 submitted to the host interface 147 for the command 155. The access controller 109 uses the cryptographic engine 107 to generate a validation result 159 of the received message 151 and the received verification code 153. Based on the validation result 159, the access controller 109 can selectively allow the command 155 to be executed within the memory device 130 or block the execution of the command 155.

For example, the access control key 149 can be one of the cryptographic keys 105 stored in the memory device 130. Different access control keys can be used to control different privileges for executing different commands and/or for executing a command operating on different sections of memory cells 103.

For example, the cryptographic key 145 can be stored in the security server 140 to provide the associated privilege to the security server 140.

In one embodiment, the security server 140 is configured to generate verification code 153 on behalf of an entity, in response to the entity requesting for the verification code 153 to execute the command 155 in the memory device 130.

Optionally, the cryptographic key 145 is generated in the process of validating the identity data 113 created using the secret key 137; and a secret (e.g., the secret key 137) known between the memory device 130 and the security server 140 allows the generation of a session key as the cryptographic key 145 to represent the privileges to have selected commands executed in the memory device 130 during a communication session that has a time limit. Optionally, the period in which the device is powered on can be used as a session delimiter, such that a new count value is generated during a next power cycle to cause the generation of a new session key.

The cryptographic key 145 can be configured to be valid for a short period following the validation of the identity data 113 and the establishment of the session key. After the security server 140 verifies that the entity is entitled to run the command 155 in the memory device 130, the security server 140 can generate the verification code 153 and provide the verification code 153 to the entity. The entity can then send the message 151 and the verification code 153 to the host interface 147. Once the access controller 109 of the memory device 130 determines, using the cryptographic engine 107 and the access control key 149, that the verification code 153 is valid, the validation result 159 permits the memory device 130 to execute the received command 155; otherwise, the access controller 109 can reject or ignore the received command 155.

In another embodiment, after the security server 140 configures the access control key 149 in the memory device 130, the security server 140 can provide the entity with the cryptographic key 145 representative of the privilege to have the command 155 executed in the memory device 130.

The message 151 can include data 157 that represents restrictions on the request to execute the command 155.

For example, the data 157 can include an execution count value maintained within the memory device 130 such that verification codes generated for lower counts are invalidated.

For example, the data 157 can include a cryptographic nonce established for a specific instance of a request to execute the command 155 such that the verification code 153 cannot be reused for another instance.

For example, the data 157 can include a time window in which the verification code 153 is valid.

For example, the data 157 can include the identification of a memory region in which the command 155 is allowed to be executed.

For example, the data 157 can include a type of operations that is allowed for the execution of the command 155 in the memory device 130.

Figure 4:
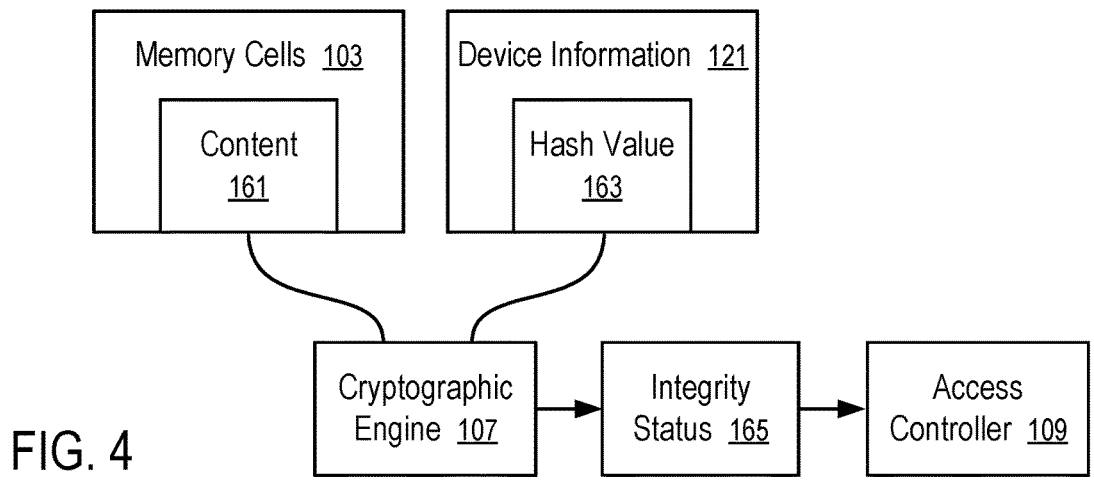
FIG. 4 illustrates a technique to validate integrity of data stored in a memory device according to one embodiment.

FIG. 4 illustrates a technique to validate integrity of data stored in a memory device according to one embodiment. For example, the technique of FIG. 4 can be used in the memory device 130 of FIG. 1 and used in connection with the techniques of FIG. 2 and/or FIG. 3.

In FIG. 4, the memory device 130 stores not only content 161 in the memory cells 103, but also a hash value 163 of the content 161. To determine the integrity status 165 of the content 161, the cryptographic engine 107 applies a cryptographic hash function to the content 161 to generate the current hash value of the content 161; and the cryptographic engine 107 compares the current hash value and the stored hash value 163 to determine if they are the same. If so, the integrity of the content 161 as required by the stored hash value 163 is confirmed.

The hash value 163 can be stored as part of the device information 121 used to generate the secret key 137 for the validation of the identity of the memory device 130.

The content 161 and the hash value 163 are stored in different sections of the memory device 130. The access controller 109 provides and/or enforces different levels of privileges to access the content 161 and the hash value 163.

For example, a manufacturer of the endpoint 150 can store the content 161 into the memory cells 103 such that the processing device 118 of the host system 120 in the endpoint 150 can run a program or routine in the content 161 to provide a designed function of the endpoint 150. Further, the manufacturer and/or the security server 140 can store the hash value 163 into a separate section for the integrity check. An end user of the endpoint 150 may access and use the content 161 in the memory cells but cannot access the hash value 163. If the content 161 is corrupted or tampered with, the cryptographic engine 107 can detect the change and generate an integrity status 165 to cause the access controller 109 to prevent the use of the content 161. When the manufacturer has an updated version of the content 161 (or a replacement), the manufacturer can perform the update in the memory cells 103 and issue a command 155 with a verification code 153 for the update of the hash value 163. Optionally, the security server 140 can generate the verification code 153 in response to a request from the manufacturer.

The device information 121 and the cryptographic keys 105 in the memory device 130 can be stored in a secure section in the memory device 130 and protected via the access controller 109 via owner privileges represented by a cryptographic key 106 stored in the security server 140.

Different secrets (e.g., unique device secret 101, secret key 137) and contents (e.g., device information 121, content 161) can be protected at different security levels and/or using different security strategies to balance security and utility.

The unique device secret 101 can be protected in the memory device 130 at a highest security level. For example, once the memory device 130 leaves a secure facility of the manufacture of memory devices and/or after the completion of the manufacturing operations for the memory device 130, the unique device secret 101 is not changeable via a command to the host interface 147 (and/or any interface of the memory device 130). Preferably, the unique device secret 101 is accessible only to the cryptographic engine 107 during the generation of the secret keys (e.g., 137) used to represent the identity of the memory device 130 and/or the endpoint 150. For example, the unique device secret 101 can be configured to be only available for a limited time at boot up of the endpoint 150.

For example, a device identification key can be secured via minimizing its use. An alias identification key can be better secured with more frequent replacement than the device identification key. Different operations and/or privileges can be used for the replacement of the device identification key and the alias identification key.

Figure 5:
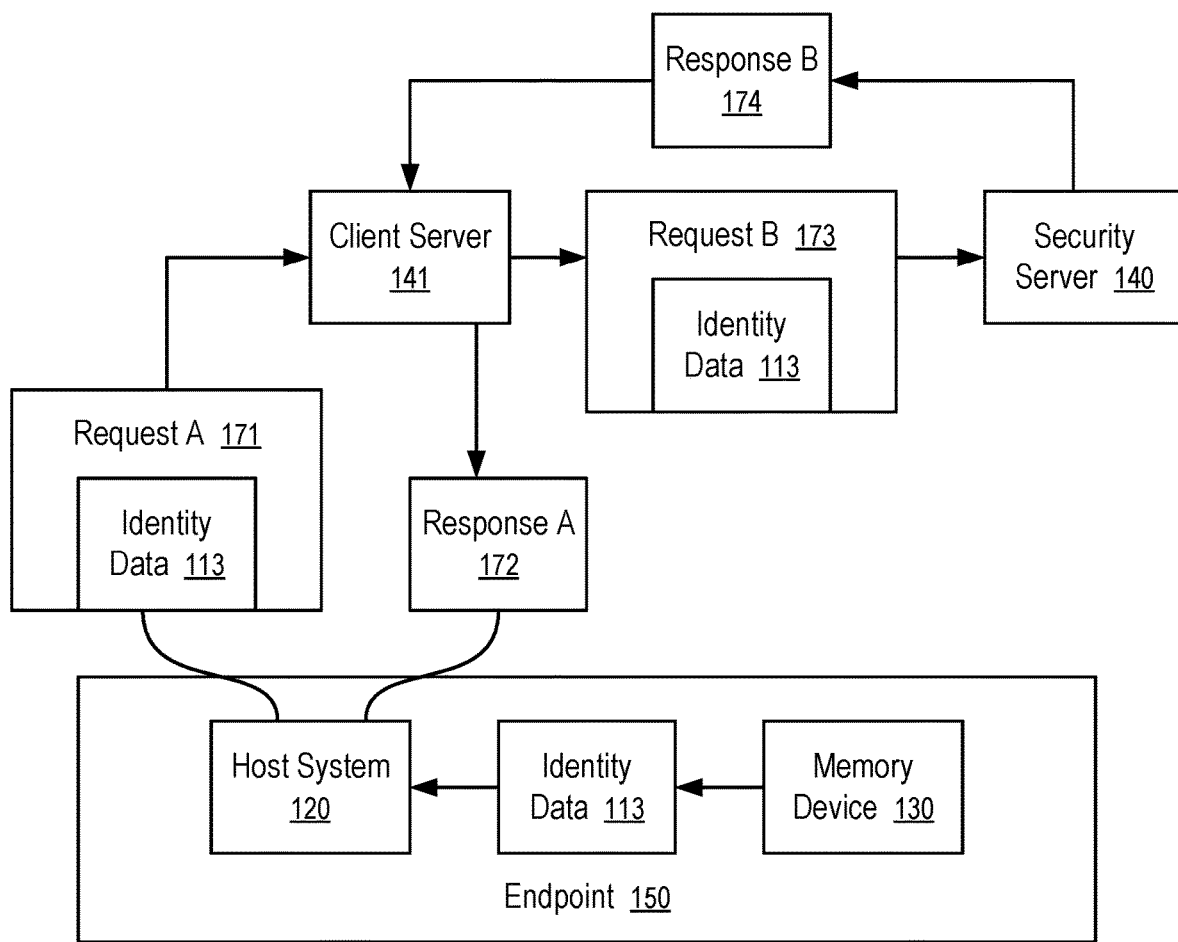
FIG. 5 illustrates security services of a security server provided to a client server based on security features implemented in a memory device according to one embodiment.

FIG. 5 illustrates security services of a security server provided to a client server based on security features implemented in a memory device according to one embodiment.

For example, the security services illustrated in FIG. 5 can be implemented in the computing system of FIG. 1 based on security features illustrated in FIGS. 2, 3, and/or 4.

In FIG. 5, a client server 141 is configured to provide services to computing devices, such as an endpoint 150 that has a memory device 130 connected to a host system 120 as in FIG. 1.

To request a service from the client server 141, the host system 120 (e.g., running instructions retrieved from the memory device 130) requests identity data 113 from the memory device 130. For example, the identity data 113 can be generated in a way illustrated in FIG. 2.

The host system 120 embeds the identity data 113 in the request 171 transmitted to the client server 141.

To determine whether the endpoint 150 is entitled to services, the client server 141 extracts the identity data 113 from the request 171 and generates a request 173 for the security server 140 to provide security services based on the identity data 113.

The security server 140 can perform validation of the identity data 113, determine whether the authenticity of the memory device 130 and/or the endpoint 150, and provide a result in the response 174 to the client server 141. Based on the result, the client server 141 can provide a response 172 to the host system 120.

For example, the response 174 can indicate whether the identity data 113 is from a counterfeit device, or from a device where the data 123 or content 161 relevant to the identity of the endpoint 150 and/or the memory device 130 has been altered, corrupted, changed, or tampered with, or from a lost or stolen device, In some implementations, the request 173 can identify a command 155 to be executed in the memory device 130. After validating the identity data 113 and validating the privilege of the client server 141 and/or the endpoint 150 to request the command 155 to be executed within the memory device 130, the security server 140 can generate a verification code 153 for the command 155 using the cryptographic key 145 and provide the verification code 153 in the response 174 to the client server 141. Using the security service, the client server 141 can be relieved from the security burdens associated with the management of the privileges and cryptographic key 145 representative of the privileges.

Optionally, the response 174 can include the cryptographic key 145 representative of the privileges to have the command 155 executed in the memory device 130. For reduced security burdens for the client server 141, the cryptographic key 145 can be configured to expire in a short period of time.

Optionally, when the identity data 113 is determined to be associated with a lost or stolen device, the response 174 can include a command 155 and/or its verification code 153 such that when the command 155 is executed in the memory device 130, the access controller 109 can disable at least some features accessible to the host system 120 via the host interface 147.

For example, after execution of the command 155 in the memory device 130, the access controller 109 can be configured to disable the boot-loader stored in the memory cells 103 of the memory device 130.

For example, the command 155 can cause the access controller 109 to block access to one or more sections of the memory cells 103.

For example, the command 155 can cause the access controller 109 to require privileges, represented by a new cryptographic key 106 stored in the security server 140, to access one or more sections of the memory cells 103.

For example, the command 155 can cause the access controller 109 to destroy data in one or more sections of the memory cells by purging a decryption key used for the decryption of data stored in the one or more sections.

For example, the command 155 can cause the memory device 130 to perform self-destruction and become irreversibly damaged.

The instructions retrieved from the memory cells 103 for execution in the host system 120 can include a routine that can accept the command 155 as a response to the memory device 130 providing the identity data 113. In some implementations, the client server 141 can provide a connection that allows the security server 140 to send the command 155 to the memory device 130 for execution.

The techniques discussed above can be used to implement new ways to authenticate subscribers of services.

For example, a memory device 130 can be configured to generate a multi-factor device platform identity of the endpoint 150 with improved security. The identity can be generated by combining a unique device secret 101 of the memory device 130, a platform source code identifying one or more applications running on the endpoint 150 to establish a secure connection to a service or network (e.g., a client server 141 or 143), and a unique identifier of a network interface 114 or communication device. For example, a unique identifier can be the identifier of a modem installed on the endpoint 150 for communication on the communications network 110. For example, the multi-factor device platform identity can be based at least in part on an International Mobile Equipment Identity (IMEI) number for an endpoint 150 configured to access cellular services. For example, the multi-factor device platform identity can be based at least in part on a vehicle identification number (VIN) when the endpoint 150 involves a vehicle. Such a strong identity can be used in conjunction with a cloud-based subscriber identity module (SIM) function in onboarding, network access and registration of a cloud service, such as a cellular subscription service.

The security server 140 and the security features of the memory devices (e.g., 130) can provide a secure memory device technology platform. The platform can be configured to support the authentication of endpoints 150 through measurements of data stored in memory cells 103 of secure memory devices (e.g., 130). Additional cybersecurity protection of endpoints can be reached by controlling access to content 161 stored in the memory devices (e.g., 130). The access control can be implemented through secure hardware manufacturing operations and cryptography-based permission control, as discussed above in connection with FIGS. 1 to 5. A platform equipped with such memory devices (e.g., 130) can reach sufficient cybersecurity protection levels to support a cloud-based virtual SIM solutions and to remove the need for a physical SIM card on an endpoint 150 to access cellular connectivity.

The secure memory device technology platform can include a combination of secure memory devices (e.g., 130) and software satisfying DICE RIoT requirements to generate identity data 113 for endpoints (e.g., 150) that use the secure memory devices to boot up. Such identity data 113 of an endpoint 150 is generated based on the identity of a secure memory device 130 used to boot up the endpoint 150, and other factors. Such identity data 113 can be passed onto a client server 141 during onboarding (e.g., to register for a service). The client server 141 can communicate with the security server 140 to confirm the identity of the endpoint 150. When the identity data 113 is validated, the client server 141 can trust the endpoint 150 to be authentic and thus register a service to the endpoint 150.

For example, such a service can be cellular connectivity conventionally registered to physical SIM cards. The identity data 113 validated by the secure memory device technology platform and secured via secure onboarding can provide the identification of endpoints (e.g., 150) in a way that is as secure, or more secure than, the use of physical SIM cards to identify endpoints. Cloud-based virtual SIM can be bound to identity data 113 validated by the secure memory device technology platform for the life of the service subscription.

Typically, a subscriber can be recognized by a service network (e.g., a payment card network, a cellular communications network) via a smart card. A conventional smart card is configured as an integrated circuit chip embedded in a plastic card. The integrated circuit chip in the smart card stores data identifying an account of a customer and can optionally store data related to services provided to the account by the service network. The integrated circuit chip can be read via metal contacts configured on in a surface area of the plastic card and/or a wireless transceiver.

For example, a subscriber identification module (SIM) (also known as SIM card) is a type of smart cards. A SIM card is typically used in a mobile phone to identify an account for accessing the services of a cellular communications network. When the SIM card is attached to a mobile phone, the cellular communications network provides services to the mobile phone according to an account identified by the SIM card. When the SIM card is attached to a replacement mobile phone, the replacement mobile phone can access the services configured for the account.

For example, a SIM card can store a mobile subscriber identity, such as International Mobile Subscriber Identity (IMSI) number. A mobile/cellular network operator can assign an authentication key to the IMSI number and the SIM card. The SIM card stores the authentication key. The SIM card can be authenticated based on digital signatures signed using the authentication key. After the authentication of the SIM card, the mobile phone having the SIM card can receive mobile/cellular services in the account associated with the mobile subscriber identity.

Europay MasterCard Visa (EMV) cards are another example of smart cards. EMV cards can be used to receive financial services in a payment card processing network to access bank accounts, such as debit accounts and credit accounts.

The integrated circuit memory device 130 can be configured to prevent unauthorized access to its memory cells 103 and to secure an unique identity for the memory device 130 itself and/or an endpoint 150 in which the memory device 130 is installed. A secure memory device 130 having security features can be used to implement the functionality of smart cards, such as SIM cards and EMV cards, using data provisioned to the secure memory devices remotely and/or using data stored in secure servers, as in FIG. 6.

Figure 6:
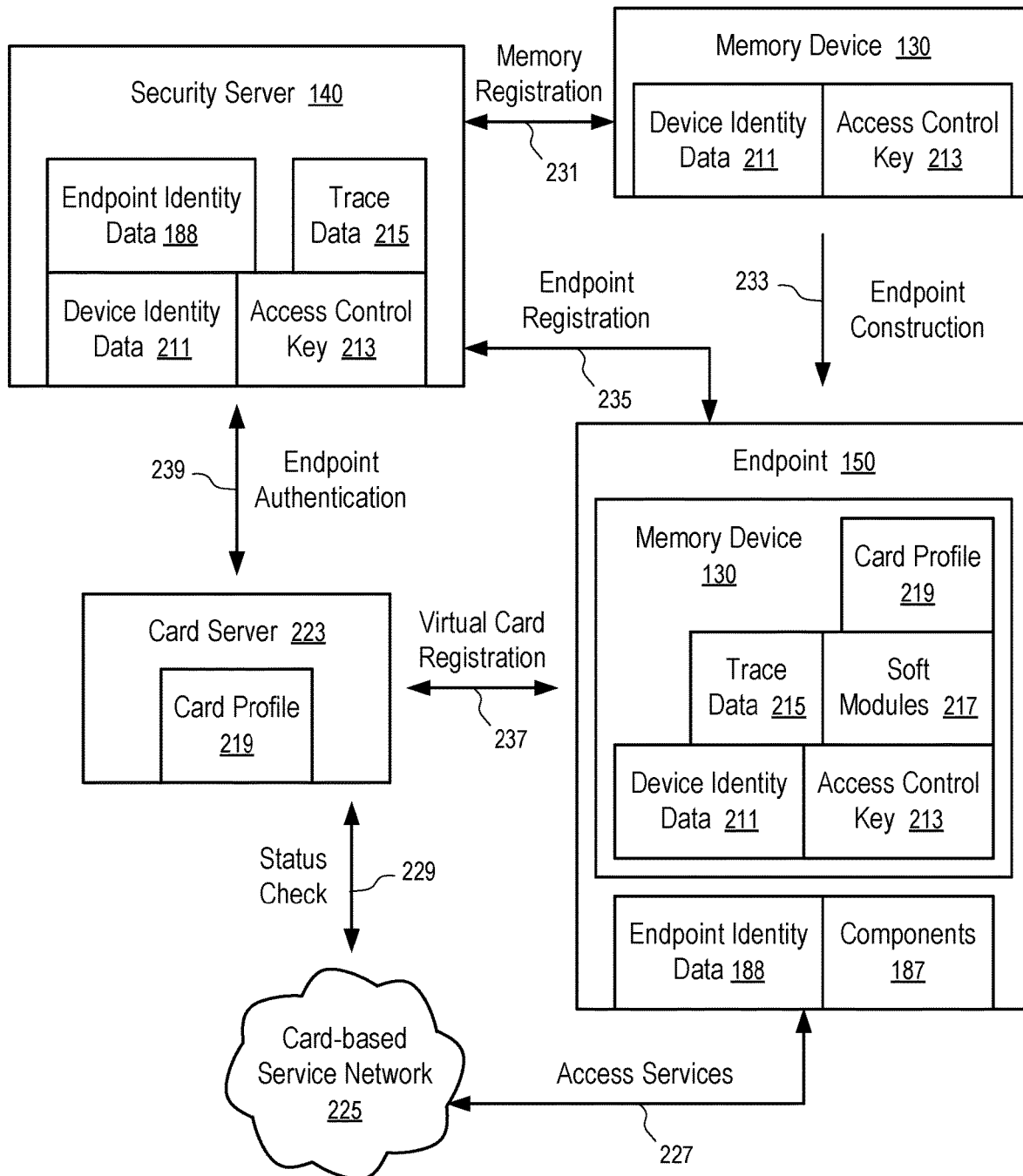
FIG. 6 shows a system and method to configure and authenticate an endpoint for a card-based service according to one embodiment.

FIG. 6 shows a system and method to configure and authenticate an endpoint for a card-based service according to one embodiment.

For example, the system and method of FIG. 6 can be implemented in the computing system of FIG. 1 using the techniques of FIGS. 2 to 5.

In FIG. 6, the memory device 130 can be implemented using the integrated circuit memory device 130 having the security features of FIGS. 1 to 5. An access controller 109 of the memory device 130 can use one or more access control keys 213 to control read and write operations to access at least some memory regions in the memory device 130.

For example, the memory device 130 is initially manufactured with an access control key 213 to allow the security server 140 to have full access to the memory regions in the memory device 130. The memory device 130 is further manufactured to include at least a portion of the device identity data 211 that uniquely identifies the memory device 130 in a population of memory devices.

For example, the device identity data 211 can be generated using a technique illustrated in FIG. 2.

For example, during the manufacture of the memory device 130, a root secret (e.g., unique device secret 101) of the memory device 130 is loaded into a security server 140 in the operation of memory registration 231. The root secret can be a number generated by a physical unclonable function (PUF) of the memory device 130, or a random number selected and stored into the memory device 130 during the manufacture of the memory device 130. The security server 140 can include a key management server configured to manage the cryptographic keys of secure memory devices (e.g., 130). The root secret can be considered and/or used as a secret cryptographic key. While the memory device 130 is being manufactured, the root secret can be obtained from the memory device 130 or injected into the memory device 130 for the memory registration 231. Preferably, the memory device 130 is manufactured such that after its manufacture, the memory device 130 does not provide the root secret outside of the memory device 130.

The device identity data 211 can be a root secret that is not revealed, not changed, and not provided outside of the memory device 130.

After the memory device 130 leaves the manufacture facility, the root secret and other secrets in the device identity data 211 are not retrievable via the communication interface (e.g., host interface 147) of the memory device 130. Since the memory device 130 enforces a set of data access policy to prevent the leak of secrets and the tampering of data stored in access protected regions of the memory device 130, the memory device 130 can be considered a secure memory device. The security server 140 stores information that can replicate the computation performed by the memory device 130 to generate the derived secrets independently from the memory device 130. Thus, the security server 140 can regenerate the derived secrets of the memory device 130 without the memory device 130 communicating the derived secrets over its communication interface (e.g., host interface 147).

For example, the root secret of the memory device 130 can be implemented via a physical unclonable function (PUF). The root secret of the memory device 130 can be retrieved from the memory device 130 and stored into the security server 140 for the memory registration 231 during the manufacture of the memory device 130. The root secret can be used to generate derived secret from the device identity data 211. For example, the PUF can be used to derive a Diffie Hellman key pair; and the Diffie Hellman key pair can be used to create the Unique Device Secret (UDS) 101 that can be shared securely between the device and security server.

For example, the device identity data 211 can be generated using a technique of FIG. 2.

The derived secret is generated in a way (e.g., based on a cryptographic hash function, a random number, and/or a monotonic count value) such that the root secret cannot be computed from the derived secret and/or other information used in the generation of the derived secret. For example, the derived secret can include a private key of a pair of asymmetric cryptographic keys. For example, the derived secret can include a symmetric cryptographic key.

The device identity data 211 can include a non-secret, public identification number of the memory device 130, such as a serial number of the memory device 130, a unique identification number of the memory device 130, and/or a public key of a pair of asymmetric cryptographic keys, etc. The publication identification number can be used to uniquely identify the memory device 130 in a population of memory devices without revealing the secrets of the memory device 130; and the secrets of the memory device 130 can be used in the authentication/confirmation that the memory device 130 is as identified by the public identification number.

Derived secrets in the device identity data 211 can be generated and/or replaced after the memory device 130 leaves the manufacture facility. The access control key 213 can be used to control the execution of the operations to generate and/or replace the derived secrets to prevent tampering. For example, the derived secrets can include cryptographic keys and/or certificates generated according to a standard for device identity composition engine (DICE).

During the memory registration 231, at least the root secret of the memory device 130 is stored into the security server 140 in association with a public identification number of the memory device 130. The root secret of the memory device 130 is known between the memory device 130 and the security server 140 during the memory registration 231 in a secure environment during the manufacture of the memory device 130. Subsequently, additional information used to generate derived secrets can be public without comprise the secrecy of the derived secrets. The derived secrets can be used in the authentication of the memory device 130 and can be optionally replaced.

An access control key 213 is configured to prevent unauthorized access to and/or operation on the secrets in the device identity data 211. For example, once an access control key 213 is configured in the memory device 130, the secrets are limited to be used by the cryptographic engine 107 (e.g., to regenerate derived secrets and/or to generate digital signatures). For example, a command/request received in the host interface 147 of the memory device 130 is required to be digitally signed in a way that is verifiable using the access control key 213, as illustrated in FIG. 3. If the digital signature applied on the command/request is invalid according to the access control key 213, the command/request can be rejected and/or ignored.

For example, the access control key 213 can be used to authenticate the digital signatures applied on commands to perform certain operations related to the device identity data 211, such as replacing a cryptographic key or an asymmetric cryptographic key pair.

Further, one or more additional access control keys 213 can be used to authenticate the digital signatures of the owner and/or authorized users of the memory device 130. Different authorized users can be limited to accessing different regions of the memory device for certain operations (e.g., write, erase, read). An owner and other authorized users can have different scopes and/or privileges in operating the memory device 130.

The security server 140 can be configured as the initial owner of the memory device 130. For example, a public key of the security server 140 can be initially stored in the memory device 130 as the owner access control key 213 to provide owner privileges to commands signed using the private key of the security server 140. After the memory device 130 is delivered to a customer, a public key of the customer can be stored as a replacement of the owner access control key 213 to transfer the owner privileges to the customer.

Optionally, certain security functions of the memory device 130 can be activated for a customer. Some aspects of the memory device 130 related to the activation of security functions can be found in U.S. patent application Ser. No. 17/014,203, filed Sep. 8, 2020 and entitled "Customer-Specific Activation of Functionality in a Semiconductor Device," the entire disclosure of which is hereby incorporated herein by reference.

An endpoint 150 can be constructed to include a memory device 130 and other components 187. During the construction 233 of the endpoint 150, the memory device 130 is installed/assembled into the endpoint 150; and soft modules 217 and trace data 215 can be stored into the memory device 130.

For example, a soft module 217 can include a boot-loader of the endpoint 150, firmware of the memory device 130 and/or a memory sub-system containing the memory device 130, or an operating system or a software application of the endpoint 150. The soft module 217 can include instructions and data configured to implement a function. The instructions can be executed by the logic circuit of the memory device 130, the controller of a memory sub-system in which the memory device 130 is installed, and/or the processing device 118 of the host system 120 of the memory device 130 and/or the memory sub-system.

During the endpoint construction 233, an endpoint registration 235 can be performed to store trace data 215 into the security server 140 and/or the memory device 130. The trace data 215 can be as part of the configuration and/or identity of the endpoint 150.

For example, the trace data 215 can include a hash value of the soft modules 217 that is computed using a cryptographic hash function. For example, the trace data 215 can include secrets assigned to the endpoint 150.

A counterfeit of the endpoint 150 does not have the trace data 215 cannot pass endpoint authentication 239 that is dependent on the trace data 215. Thus, the security of the system is improved. Further details and examples of the techniques related to trace data 215 can be found in U.S. patent application Ser. No. 17/005,565, filed Aug. 28, 2020 and entitled "Secure Memory System Programming for Host Device Verification," the entire disclosure of which application is hereby incorporated herein by reference.

The endpoint identity data 188 can be generated using the techniques of FIG. 2 to represent the configuration of the endpoint 150 at its boot time. For example, the endpoint identity data 188 can include a certificate (e.g., message 131) generated based on a combination of a portion of the device identity data 211, the trace data 215, and the identification data of other components (e.g., network interface 114, processing device 118, controller 116) that are present at the time of booting of the endpoint 150.

The device identity data 211 and/or the endpoint identity data 188 can include one or more certificates generated using a device identity composition engine (DICE) according to a standard developed by the Trusted Computing Group (TCG) that combine hardware secrets and source code to create trustworthy identities. Further details and examples of techniques to generate device identity can be found in U.S. patent application Ser. No. 16/374,905, filed Apr. 4, 2019, entitled "Onboarding Software on Secure Devices to Generate Device Identities for Authentication with Remote Servers," and published as U.S. Pat. App. Pub. No. 2020/0322134 on Oct. 8, 2020, the entire disclosure of which application is hereby incorporated herein by reference.

An operation of virtual card registration 237 can be performed to configure the endpoint 150 for services of a card-based service network 225, such as a mobile/cellular communications network, a bank card processing network, etc.

For example, the endpoint 150 can make a connection to a card server 223 to request a card profile 219 for the endpoint 150 represented by the device identity data 211. To request the card profile 219, the endpoint 150 transmits a public portion of the endpoint identity data 188 to the card server 223. The card server 223 forwards the endpoint identity data 188 to the security server 140 for the authentication 239 of the endpoint 150. For example, the authentication technique discussed in connection with FIG. 2 can be used.

Once the security server 140 verifies that the endpoint identity data 188 is created using a correct combination of the device identity data 211 of the memory device 130, the trace data 215, and other data of the endpoint 150 submitted and/or recorded in the security server 140 during the endpoint registration 235, the card server 223 can assign and/or store the card profile 219 to the memory device 130, or associate the card profile 219 with the endpoint identity data 188.

The virtual card registration 237 can be performed via a soft module 217 secured in the memory device 130 and/or via the security manager such that the card profile 219 stored in the memory device 130 cannot be tampered with. Optionally, the security server 140 can generate a verification code for a command 155 to write the card profile 219 into a secure section of the memory device 130. Writing privileges of the secure section can be controlled via a cryptographic key stored in the security server 140. For example, an access control key 213 corresponding to the card server 223 or the security server 140 can be used by the access controller 109 to control the storing and/or replacement of the card profile 219 in the memory device 130.

Further, the memory device 130 can verify the integrity of the card profile and/or a soft module 217 responsible for the use of the card profile 219 in a way as illustrated in FIG. 4.

With the card profile 219 secured in the memory device 130 in the endpoint 150, the memory device 130 and/or the endpoint 150 can function in a way equivalent to a corresponding smart card installed in the endpoint 150. The card profile 219 securely attached to the device identity data 211 can be viewed as a virtual smart card.

In some implementations, a soft module 217 is configured to use the cryptographic functions and/or processing capability of the logic circuit of the integrated circuit memory device 130 to implement the cryptographic operations involved in the use of the card profile 219. For example, the card profile 219 can include an authentication key; and the soft module 217 can be configured to generate a digital signature for the authentication/verification that the card profile 219 includes the authentication key.

Figure 7:
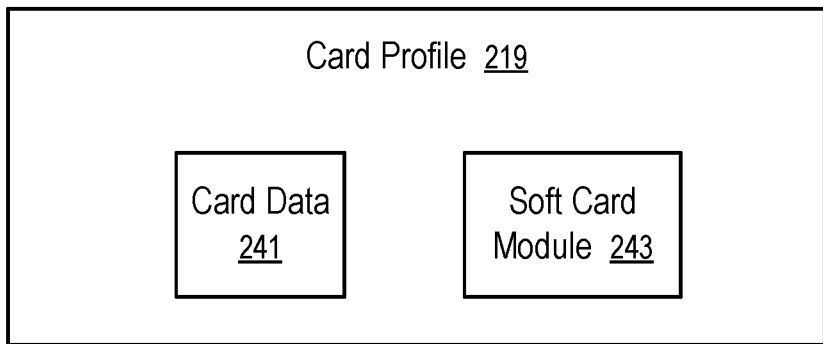
FIG. 7 illustrates a card profile of a virtual smart card according to one embodiment.
Figure 8:
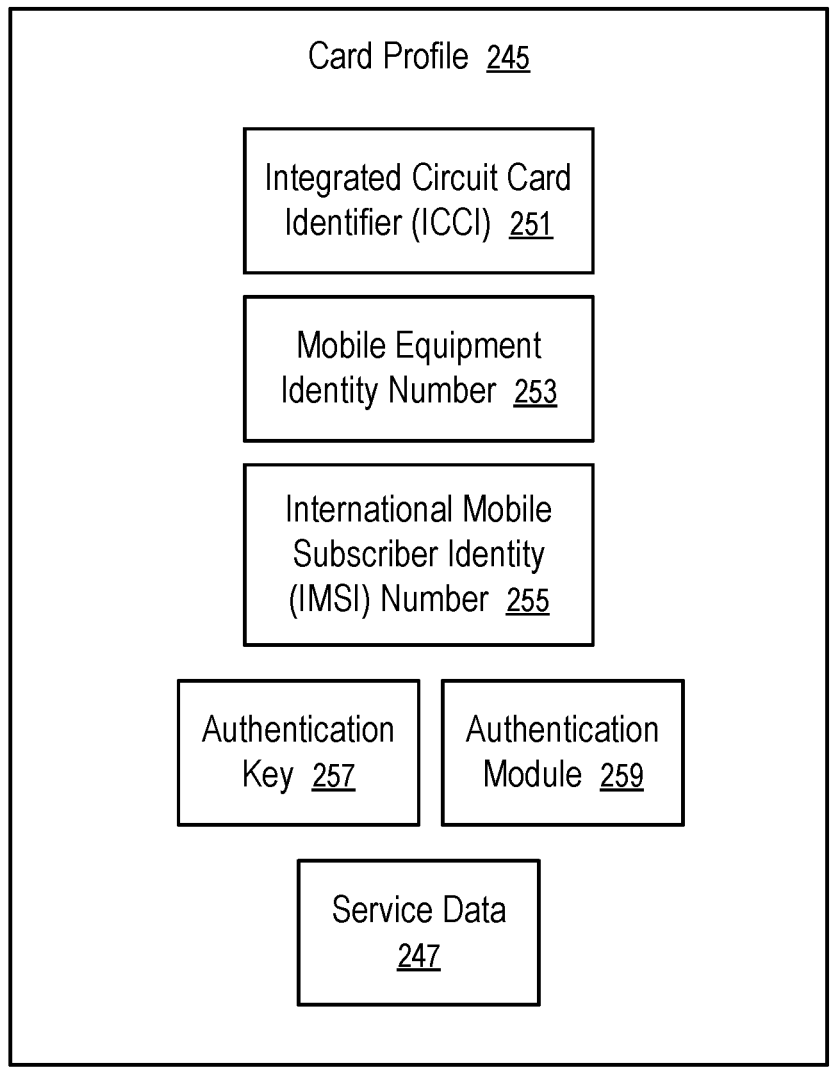
FIG. 8 illustrates a card profile of a virtual Subscriber Identification Module (SIM) according to one embodiment.

For example, the card profile 219 can be as illustrated in FIG. 7 and FIG. 8.

FIG. 7 illustrates a card profile of a virtual smart card according to one embodiment.

In FIG. 7, the card profile 219 can include card data 241 and a soft card module 243. Optionally, the soft card module 243 can be installed as part of the soft modules 217 stored in the memory device 130.

The card data 241 can include an identification of a smart card (e.g., a virtual card), an account, and/or a subscriber. For example, the card data 241 can identify a type of smart cards, a service subscribed to the account/card, and/or customer data related to the services (e.g., a balance amount, a transaction record, a message, etc.). In some implementations, the card data 241 can include the same set of data stored in a physical smart card (e.g., in an integrated circuit chip embedded in a plastic card configured according to a standard for a Universal Integrated Circuit Card (UICC)).

The soft card module 243 can include instructions to operate on the card data 241 by a cryptographic engine 107 of the memory device 130. For example, the computing function of an integrated circuit chip used in a particular type of smart cards can be implemented via executing the soft card module 243 via the secure memory device 130. The soft card module 243 allows an endpoint 150 to emulate the computing operations of a physical smart card.

FIG. 8 illustrates a card profile of a virtual Subscriber Identification Module (SIM) according to one embodiment.

In FIG. 8, the card profile 245 includes card data 241, such as an Integrated Circuit Card Identifier (ICCI) 251, a Mobile Equipment Identity Number 253, an International Mobile Subscriber Identity Number 255, an authentication key 257 assigned to the International Mobile Subscriber Identity number 255, and service data 247 related to mobile/cellular communication service for the International Mobile Subscriber Identity number 255.

In a conventional mobile phone that uses a conventional SIM card, an Integrated Circuit Card Identifier (ICCI) 251 is used to identify the SIM card among a population of SIM cards. A Mobile Equipment Identity Number 253 (e.g., in the form of an International Mobile Equipment Identity (IMEI) number, or an IMEI software version (IMEISV)) is used to identify the mobile phone among a population of mobile phones. An International Mobile Subscriber Identity (IMSI) Number is used to identify a subscriber/customer/account among a population. Such numbers in the card profile 245 can be used for similar functions when the card profile 245 is attached to the endpoint 150. For example, when the endpoint 150 is a mobile phone without a physical SIM card, the card profile 245 can function as the virtual SIM card to identify the card, the subscriber, and the endpoint/mobile phone. For example, the Integrated Circuit Card Identifier (ICCI) 251 corresponds to and/or represents the device identity data 211 of the memory device 130; the Mobile Equipment Identity Number 253 corresponds to and/or represents the endpoint identity data 188 of the endpoint 150; and the International Mobile Subscriber Identity Number 255 represents the subscriber/customer/account in the mobile/cellular communications network.

For example, the authentication key 257 is the secret assigned to the International Mobile Subscriber Identity number 255. When an endpoint 150 uses the International Mobile Subscriber Identity number 255 to request a connection in a mobile/cellular communications network, the mobile/cellular network operator can look up the authentication key 257 from a database and challenge the endpoint 150 to demonstrate that it is in possession of the authentication key 257. The security challenge can include digitally signing, using the authentication key 257, a message that includes a random number (RAND). A reply to the security challenge can include a portion of the digital signature for verification by the mobile/cellular network operator. The operator independently signs the message using the corresponding authentication key 257 that is associated with the International Mobile Subscriber Identity number 255 in the database. If the reply agrees with the answer calculated by the mobile/cellular network operator, the digital signature is verified; and as a result, the endpoint 150 is seen to have the authentication key 257 assigned to the International Mobile Subscriber Identity number 255 and be eligible to receive the services associated with the International Mobile Subscriber Identity number 255. Further, a symmetric cryptographic key can be derived from the digital signature for secure the communication between the endpoint 150 and the mobile/cellular communications network in the subsequent communication session.

For example, when the card profile 245 is installed in the endpoint 150, the endpoint 150 can communicate with the mobile/cellular network operator to request a connection and respond to a security challenge using a same protocol used by a mobile phone having a physical SIM card. Thus, the mobile/cellular network operate does not have to differentiate the endpoint 150 having the card profile 245 as a virtual SIM card and other mobile phones that have physical SIM cards.

Optionally, the card profile 245 can include an authentication module 259 configured to be executed by a cryptographic engine of the secure memory device 130 and/or the processing device 118 of the endpoint 150 to perform cryptographic computations during the use of the card profile 245, such as the generation of the reply to the security challenge and/or the symmetric cryptographic key for the communication session.

In FIG. 6, after the virtual card registration 237, the endpoint 150 can receive services from the card-based service network 225 using the card profile 219 to identify a subscriber/customer/account. For example, the card-based service network 225 initially configured to provide services to traditional smart cards can seamlessly further provide services to endpoints (e.g., 150) having virtual smart cards implemented through storing card profiles (e.g., 219) in secure memory devices (e.g., 130).

Optionally, the endpoint 150 can be configured to perform communications with the card-based service network 225 in a same way as a mobile device that has a physical smart card (e.g., SIM card) or a smart card (e.g., EMV card).

For example, the endpoint 150 can function as a smart card to a card reader. the endpoint 150 can include metal contacts for a connection to a card reader. For example, the endpoint 150 can include a transceiver that is comparable with readers of wireless smart cards. Alternatively, additional card readers can be configured in the card-based service network 225 to use alternative communication connections to read the virtual cards from the endpoint 150. Examples of the alternative connections can include a Near-Field Communication (NFC) connection, a Bluetooth connection, a Wi-Fi connection, a Universal Serial Bus (USB) connection, etc.

In another example, the endpoint 150 can function as a mobile station that has a built-in card reader to read a smart card inserted in the mobile station, such as a mobile phone having a SIM card. The endpoint 150 can communicate the card-based service network 225 to access service 227 using a same communication protocol of a mobile station that has a physical SIM card.

Optionally, the card profile 219 can be stored in the card server 223 in association with the endpoint identity data 188. The endpoint 150 can access services 227 in the card-based service network 225 using the endpoint identity data 188. In response, the card-based service network 225 can communicate with the card server 223 to identify a card profile 219 based on the endpoint identity data 188. Further, based on the endpoint identity data 188, the card server 223 can communicate with the security server 140 to perform endpoint authentication 239 to verify the endpoint 150 has the secure memory device 130 as at the time of virtual card registration and has the same configuration represented by the combination of the trace data 215, soft modules 217 and the components 187. When the endpoint 150 is tampered with and/or modified, the changes can be detected in the status check 229 and/or the endpoint authentication 239; in response, the card-based service network 225 can reject the request to access services 227.

Optionally, the virtual card registration 237 can be performed just-in-time in connection with the request to access services 227. In response to the request, the endpoint identity data 188 is validated through endpoint authentication 239. After the success of endpoint validation, the card profile 219 can be associate a card profile 219 with the endpoint identity data 188 and/or stored into the memory device 130.

In some implementations, the card server 223 is implemented as part of the security server 140.

In some implementations, the card server 223 is implemented as part of a network operator in the card-based service network 225.

For example, the system of FIG. 6 can be used to simplify, secure and accelerate large-scale global deployment of internet of things (IoT) devices and a rich IoT services ecosystem. For example, virtual subscriber identity module (SIM) cards can be used by IoT devices (e.g., endpoint 150) to be connected to the Internet through mobile/cellular communications networks.

The security server 140 can be used as a memory-based security as-a-service platform for endpoints (e.g., 150), such as IoT edge devices. A card server can be used to provide a cellular connectivity solution for such endpoints. The combination as in FIG. 6 can create a universal, end-to-end solution for zero-touch onboarding of cellular-connected IoT devices onto cloud services.

Complexities of enterprise IoT implementations present challenges to large-scale global deployments of IoT devices. The challenges include implementation difficulties in cellular connectivity and cybersecurity. Cellular connectivity has significant advantages over wireless local area networks (e.g., Wi-Fi) for IoT deployments, such as longer range, better outdoor performance, stronger security and existing global infrastructure. The requirements of physical SIM cards and contracts with mobile/cellular network operators slow the use of cellular connectivity for IoT devices. A solution as illustrated in FIG. 6 addresses such challenges.

Virtual SIM cards implemented via securely associating a card profile 219 with endpoint identity data 188 and/or device identity data 211 can eliminate the need for physical SIM cards. The deployment of virtual SIM cards offers highly scalable IoT security, cloud-based SIM management, secure, zero-touch device registration and onboarding onto IoT services, fluid global connectivity, Just-in-time SIM activation, A solution as illustrated in FIG. 6 is especially beneficial for the industrial, infrastructure, automotive, aviation, and transport and logistics sectors which demand far-reaching, border-less connectivity for portable devices even in the most remote locations, unfettered by borders and close-range Wi-Fi networks.

A system as illustrated in FIG. 6 can dramatically simplify flexible global connectivity and unlock rich possibilities for innovation in the IoT market.

The use of physical smart cards requires the tight pairing of card identity and/or device identity to the services offered by a network (e.g., 225) during manufacturing to prevent insecure devices, insecure operations, fraud, and/or counterfeit.

The security server 140 can be used to implement zero-touch authentication and a late binding of certificates for third-party services, freeing end users to securely access more diverse third-party IoT services.

The security server 140 and/or the card server 223 can be used to securely install soft modules to customize IoT devices. For example, an online soft module store can be provided to allow soft module to be stored into an endpoint 150 to customize its functionality in a way similar to the provisioning of functionality of different types of smart cards and/or SIM cards discussed above. Such customization allows enterprises to access vendor-agnostic IoT services to harness and experiment with smart features and data insights in new ways.

With the threat landscape growing riskier with sophisticated bad actors and hacks on devices from IoT fish tanks to baby monitors, cybersecurity has been a weak link in IoT adoption. The security server 140 can offer security-as-a-service powered by the security features implemented in memory devices (e.g., 130) that control access and device identity data 211. Through its silicon root-of-trust, a secure memory device 130 provides a unique level of protection for the lowest layers of IoT software—starting with the boot process, with strong cryptographic identity and security features baked natively in the memory device 130.

For example, the security-as-a-service implemented via a combination of the security server 140 and the security features embedded in secure memory devices (e.g., 130) can include the verification of the authenticity of a memory device (e.g., 130) claiming to have a public identification number by verifying whether the memory device (e.g., 130) has a root secret as recorded via memory registration 231 performed during the manufacture of the memory device 130.

For example, the security-as-a-service can optionally further include the identification of an owner of the memory device 130 based on a cryptographic key corresponding to the access control key 213 implemented to provide owner privileges.

For example, the security-as-a-service can optionally further include the identification of a service provider of the endpoint 150 having the memory device 130 based on the identity of the owner/manufacturer of the memory device 130 prior to the endpoint 150 being distributed to an end user/customer. Based on the service provider, the security server 140 can download a soft module 217 relevant to the services offered by the service provider to customize the endpoint 150. For example, the customization can be performed during the endpoint registration 235. Optionally, an end user or an enterprise user may select a service provider; and the security server 140 and/or the card server 223 can push the soft module 217 to the memory device 130. Further, the security server 140 can automatically push a software update into the memory device, in response to endpoint authentication 239. Thus, security vulnerability of endpoints (e.g., 150) in the field can be reduced and/or minimized in an automated way without extra efforts from individual OEMs of endpoints (e.g., 150).

For example, the security-as-a-service can optionally further include the tracking of lost/stolen devices. In response to an endpoint authentication 239 of an endpoint 150 that is registered as in the security server 140 as lost stolen, the security server 140 can request the access controller 109 of the memory device 130 to disable access to certain memory regions and/or erase data from certain memory regions. In some instances, the access controller 109 can disable the normal operations of the endpoint 150 by restricting access to resources such as a boot-loader, an operating system, an application, etc. In some instances, the access controller 109 can perform an operation to irreversibly destroy the memory functionality of the memory device 130.

For example, the security-as-service can optionally further include an audit service of the integrity of the endpoint 150. For example, the memory device 130 can build the endpoint identity data 188 based on the cryptographic hash values of soft modules 217 stored in the memory device 130 such that when the soft modules 217 are changed, the security server 140 can verify whether the current soft modules 217 are valid distributions from corresponding vendors of the soft modules 217. When a soft module 217 is found to be corrupted, tampered with, and/or damaged, the security server 140 can initiate an update operation to repair the soft module using a valid distribution from an online software store.

When an updated version of a soft module 217 is available, the security server 140 can recalculate the endpoint identity data 188 for the authentication of the endpoint 150. Thus, when the endpoint 150 has an out-of-date soft module 217, the security server 140 can detect the presence of the out-of-date version and require/initiate an update of the soft module 217 over the air. Optionally, the security server 140 can track the history of configuration changes of the endpoint 150 that impacts the endpoint identity data 188. For example, when requested, the security server 140 can communicate with the memory device 130 to revert back to a prior configuration.

For example, the security-as-service can optionally further include a device tracking service that can provide activity data to an owner of the endpoint 150 as corresponding to the owner access control Key 213 (or another authorized user corresponding to another access control key). For example, the activity data can include location data and the use of the endpoint 150 in various services from the card-based service network 225.

The endpoint identity data 188 can include a public identity of the endpoint 150, such as an International Mobile Equipment Identity (IMEI) number (e.g., Mobile Equipment Identity Number 253). The subscription of the public identity of the endpoint 150 to a service of the card-based service network 225 (e.g., cellular connectivity) can be preregistered with the card server (223) without using the endpoint 150. For example, the IMEI number can be associate with an International Mobile Subscriber Identity number 255 in a database of the card server 223.

When the endpoint 150 attempts to connect to the card-based service network 225, the public identity (e.g., IMEI number) of the endpoint 150 is authenticated in the endpoint authentication 239 using the endpoint identity data 188. In response, the subscription registered to the International Mobile Subscriber Identity number 255 is identified and used to generate the card profile 219 to bind the card profile 219 to the endpoint 150. The binding can be in the form of storing the card profile 219 into the secure memory device 130 in the endpoint 150. Alternatively, the binding can be in the form of association, in a database of the card server 223, of the card profile 219 with the endpoint identity data 188.

In some instances, a set of endpoints (e.g., owned by an enterprise client) can share a reduced number of virtual SIM cards for cellular connectivity. For example, IoT devices of the enterprise client may not require concurrently cellular connectivity. When an endpoint 150 of the enterprise client requires a cellular connection, an available card profile 219 representing a virtual SIM card is dynamically "installed" for the endpoint 150 just-in-time for the cellular services after the endpoint authentication 239 for the duration of a communication session. When the communication session is ended, the virtual SIM card can be used by another endpoint of the enterprise client. A physical SIM card can be moved from one mobile phone to another mobile phone to allow different mobile phones to access the cellular services registered to the same SIM card. However, physically moving the SIM card from one mobile phone to another is inefficient and is not scalable for large deployment. The just-in-time installation of virtual SIM card can overcome the limitation of the physical SIM cards and offer improved security via endpoint authentication 239 prior to virtual SIM card installation.

For example, such just-in-time installation of virtual SIM card can be used to facilitate infrequent or one-time uses of cellular connectivity. For example, the cellular connectivity can be used to perform over the air firmware/software update. For example, the cellular connectivity can be used to periodically report the status of the endpoint 150 (e.g., once a day, week, or month). For example, the endpoint 150 can report its health and/or location in relation to a warranty service that is based on the location of the endpoint 150.

For example, the security-as-service can optionally further include an identity service that allows the public identity of the endpoint 150 to be changed in a secure way. For example, a set of endpoints of an enterprise client may share a reduced number of IMEI numbers. When an endpoint 150 attempts to connect to the card-based service network 225 using an alternative public identity number in the endpoint identity data 188, the card server 223 and/or the security server 140 can perform endpoint authentication 239, assign an unused IMEI number to the endpoint 150, associate the card profile 219 to the IMEI number assigned to the endpoint 150 to enable the endpoint 150 to obtain the services from the network 225 as a device represented by the IMEI number.

When such a secure memory device 130 is used with the security-as-a-service offered by the security server 140, an Original Equipment Manufacturer (OEM) of endpoints (e.g., 150) can provide security by assembling the secure memory device 130 into the endpoints (e.g., 150), without the need to perform their separate security operations, such as secure key injection, designing and implementing secure elements, hardware components or specialized system on a chip (SoC) features. Thus, the security server 140 and the secure memory devices (e.g., 130) can offer plug-and-play security for OEMs of IoT devices (e.g., endpoint 150).

The services of the security server 140 can use to authenticate, activate, and manage secure memory devices (e.g., 130) at edge after deployment. This capability enables platform-hardening and device protection through the entire lifecycle, extending from the manufacturing supply chain to in-field installation and management.

Figure 9:
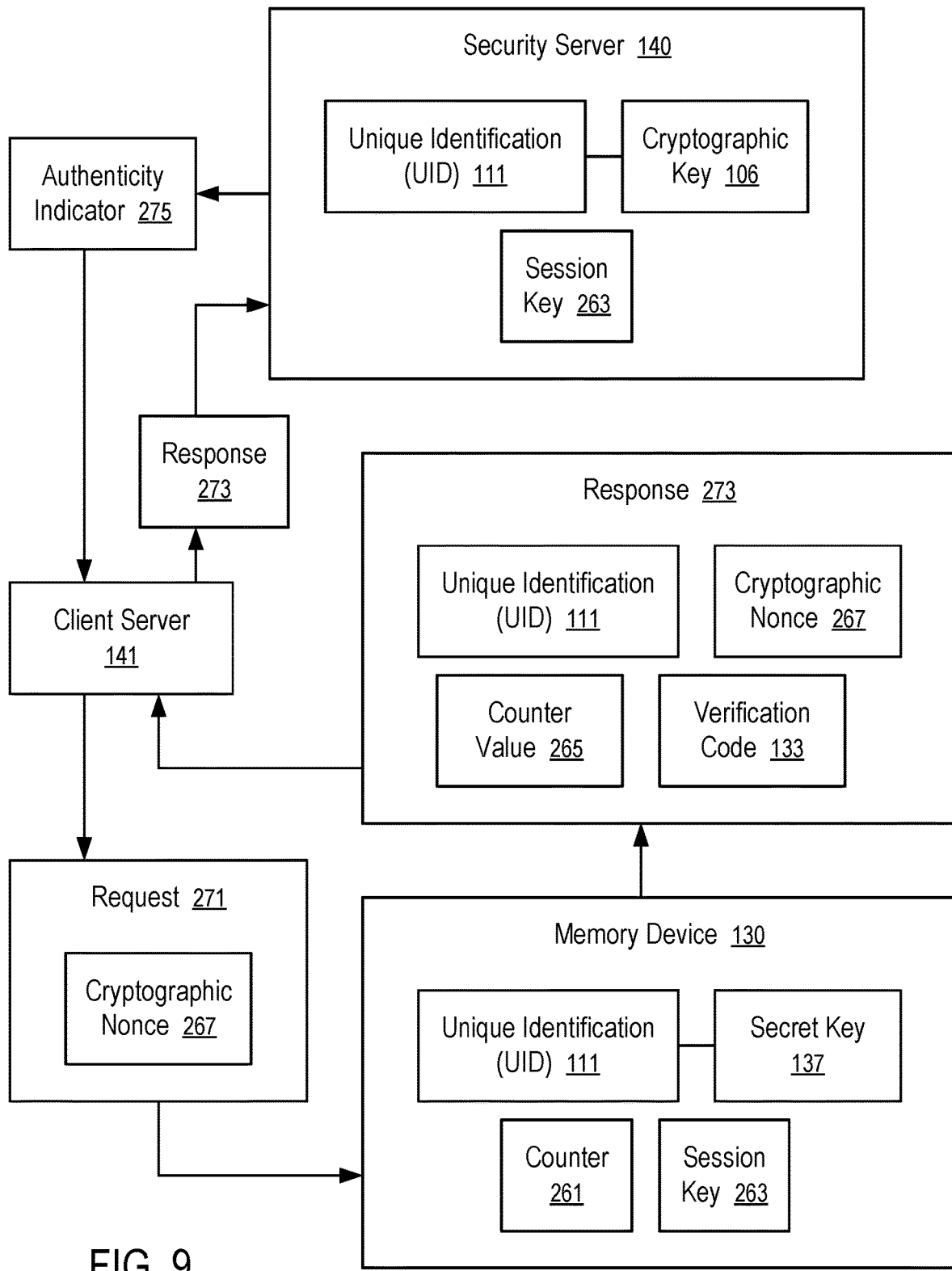
FIG. 9 illustrates a technique to authenticate a memory device according to one embodiment.

FIG. 9 illustrates a technique to authenticate a memory device according to one embodiment. For example, the technique of FIG. 9 can be used to implement a security service of FIG. 5 using the identity data of FIG. 2.

Through the authentication operations of FIG. 9, a session key 263 can be established to secure communications between a security server 140 and a memory device 130 without trusting a client server 141 in handling the security to protect the secret of the memory device 130. Optionally, the session key 263 can be used by the access controller 109 to implement privileges to request selected commands 155 executed in the memory device 130.

In FIG. 9, the client server 141 can send to the memory device 130 a request 271 for identity data 113 of the memory device 130.

The request 271 can include a cryptographic nonce 267. For example, the cryptographic nonce 267 can be generated by the security server 140 in response to a request from the client server 141, or generated by the client server 141 and shared with the security server 140 for the request 271. Alternatively, the memory device 130 may generate the cryptographic nonce 267 in response to the request 271 and provide a corresponding response 273 that includes the cryptographic nonce 267.

In response to the request 271 for identity data 113 of the memory device 130, the memory device 130 provides a response 273 that includes a message identifying the unique identification 111 of the memory device 130.

A verification code 133 is generated for the message provided in the response 273 using the secret key 137 of the memory device 130. As discussed above, the verification code 133 can be implemented using techniques such as hash digest, digital signature, and/or hash-based message authentication code. The validation of the verification code 133 can be performed by the security server 140 using a corresponding cryptographic key 106 stored in association with the unique identification 111.

To protect the response 273 and/or the verification code 133 from security attacks (e.g., reuse of the response 273 and/or attempts to recover the secret key 137), the verification code 133 is generated for a message 131 that includes the unique identification 111, a counter value 265, and the cryptographic nonce 267. The counter value 265 is obtained from a counter 261 in the memory device 130. The value of the counter 261 increases monotonically. For example, the counter 261 can be used to store a value representative of a count of requests received for identity data and/or other data items or operations related to security. Thus, a response containing a counter value 265 that is lower than a previously-seen counter value can be considered invalid. The cryptographic nonce 267 is used in the generation of the response 273 once and discarded by the memory device 130. When the cryptographic nonce 267 has been previously provided to, or generated by, the security server 140, the response 273 does not have to explicitly include the cryptographic nonce 267 in the response 273.

The client server 141 forwards the response 273 to the security server 140 to request the authentication of the memory device 130. Using the unique identification 111 provided in the response 273, the security server 140 can locate a corresponding cryptographic key 106 for the validation of the verification code 133. For example, the corresponding cryptographic key 106 can be the secret key 137, or a corresponding public key when asymmetric cryptography is used.

Based on the validation of the verification code 133, the security server 140 provides an authenticity indicator 275 to the client server 141. The authenticity indicator 275 indicates whether the memory device 130 is authentic. For example, the security server 140 can generate and provide a certificate that is signed by the security server 140 to extend the certificate chain of a memory device 130 back to the verifier (e.g., the security server). Optionally, the security server 140 can allow the download of a certificate signing request (CSR) that allows the requestor to use a Certificate Authority (CA) of their choice (rather than the security server 140).

Through the authentication of the memory device 130, the memory device 130 and the security server 140 can establish a session key 263 for communication with each other in a subsequent communication session. The session can be limited by a time period of a predetermined length following the response 273 or the validation of the verification code 133. After the time period, the session key 263 expires and thus can be destroyed or discarded. Further, a subsequent request for identity data can end the previous session started by the prior request for identity data.

The session key 263 can be generated based at least in part on a secret known between the security server 140 and the memory device 130 but not available to a communication channel between the security server 140 and the memory device 130.

For example, the session key 263 can be derived based at least in part on the secret key 137. Further, the session key 263 can be based at least in part on the counter value 265 and/or the cryptographic nonce 267. Optionally, the session key 263 can be based at least in part on the verification code 133. For example, the verification code 133 and the secret key 137 can be combined to generate the session key 263.

In some implementations, the session key 263 is independent from the verification code 133; and the verification code 133 can be generated using the session key 263 that is derived from the secret key 137 or another secret known between the security server 140 and the memory device 130.

Figure 10:
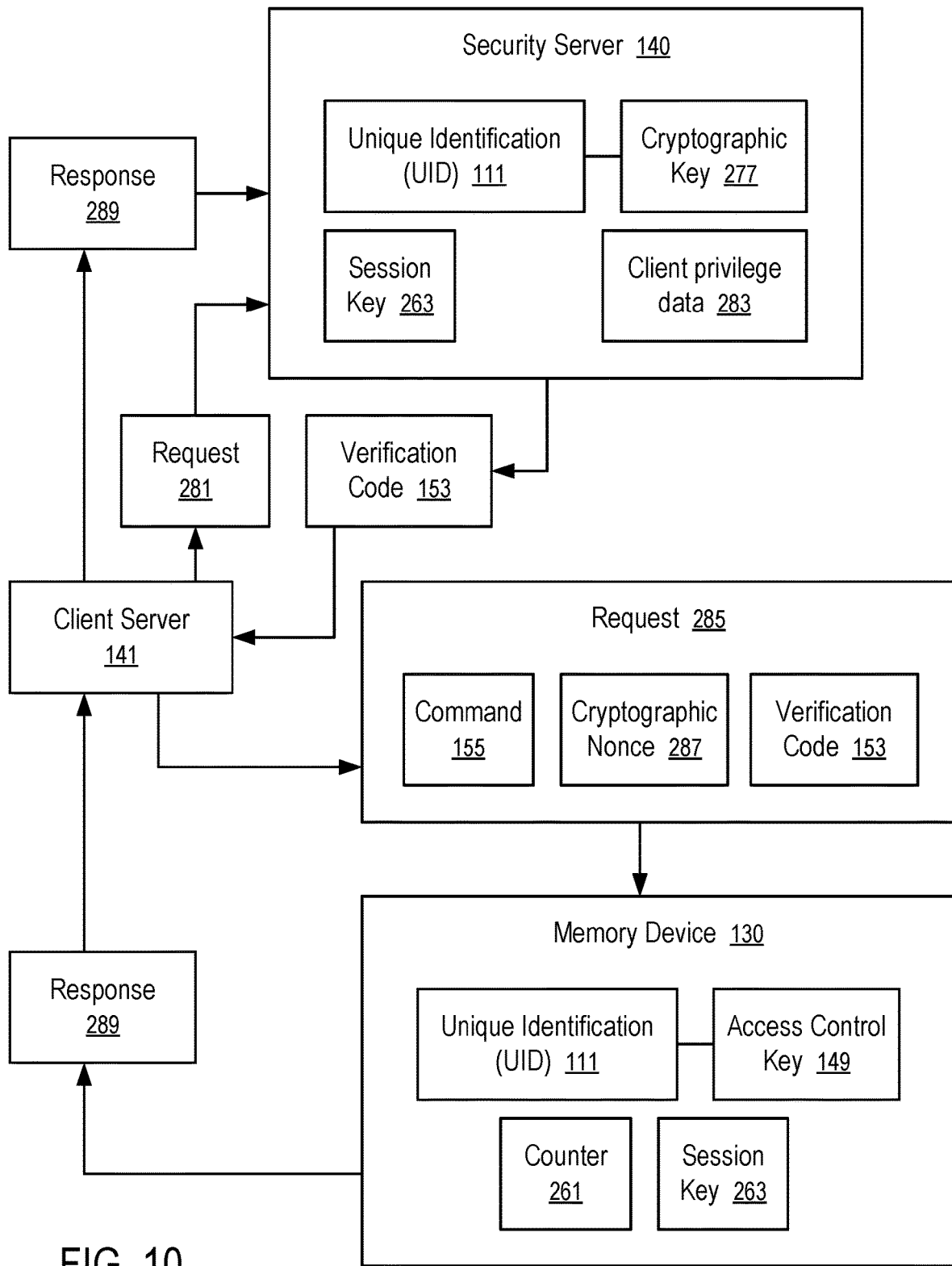
FIG. 10 illustrates a technique to generate a command to control security operations of a memory device according to one embodiment.

FIG. 10 illustrates a technique to generate a command to control security operations of a memory device according to one embodiment. For example, the technique of FIG. 9 can be used to implement a security service of FIG. 5 using the techniques of FIGS. 3 and 10.

For example, after the privilege of the client server 141 to request the execution of a command 155 in the memory device 130 is verified using client privilege data 283, the security server 140 can provide a verification code 153 for the command 155 to the client server 141, in response to a request 281 from the client server 141.

Some of the communications in FIG. 9 and FIG. 10 can be combined. For example, in some instances, the request 281 can include the identity data 113 provided by the memory device 130 as a response 273 to a request 271 to the memory device 130.

After the client server 141 sends the request 281 that identifies the command 155 and the memory device 130, the security server 140 can generate a verification code 153 for the command 155, if the client server 141 is determined to have the privilege to control or operate the memory device 130 using the command 155. The request 281 can include the unique identification 111 of the memory device 130 in which the command 155 is to be executed. For example, the unique identification 111 can be extracted by the client server 141 from the response 273 to the request 271 for identity data of the memory device 130 and/or the authenticity indicator 275 provided by the security server 140.

As discussed above, the verification code 153 can be implemented using techniques such as hash digest, digital signature, and/or hash-based message authentication code. The validation of the verification code 153 can be performed by the access controller 109 using an access control key 149 for the command 155. The verification code 153 can be generated using a cryptographic key 277 that is stored in the security server 140 to represent the privileges to have the command 155 executed in the memory device 130. For example, the cryptographic key 277 can be the access control key 149 when encryption via asymmetric cryptography is not used; alternatively, when asymmetric cryptography is used, the access control key 149 is a public key in a key pair, and the cryptographic key 277 a private key in the key pair.

In one embodiment, the access control key 149 and the cryptographic key 277 are pre-configured for the privileges for the command 155. In another embodiment, the access control key 149 and the cryptographic key 277 are based on the session key 263. For example, the session key 263 can be used as the access control key 149 and the cryptographic key 277 for the access control of the command 155. In some embodiments, the session key 263 is a key in a pair of asymmetric keys that can be used to implement the cryptographic key 277 and the access control key 149 involving encryption performed using asymmetric cryptography.

When the verification code 153 is based on the session key 263, the verification code 153 expires when the session key 263 expires, which prevents the reuse of the verification code 153 beyond the session in which the session key 263 is valid.

A message 151 provided in the request 285 can include the command 155 and a cryptographic nonce 287. The cryptographic nonce 287 is arranged for the command 155/request 285 and thus is different from the cryptographic nonce 267 for the transmission of the identity data of the memory device 130.

For example, in response to the request 281, the security server 140 can generate the cryptographic nonce 287 and used it in the generation of the verification code 153. The cryptographic nonce 287 can be provided with the verification code 153 for the client server 141 to generate the request 285. Alternatively, the client server 141 can generate the cryptographic nonce 287 and provided it to the security server 140 with the request 281. Alternatively, to generate the request 281, the client server 141 can request the cryptographic nonce 287 from the security server 140.

After the client server 141 sends the request 285 having the verification code 153 obtained from the security server 140, the memory device 130 uses the access control key 149 to validate the verification code 153 for the message 151 included in the request 285. If the verification code 153 is valid, the access controller 109 allows the memory device 130 to execute the command 155; otherwise, the access controller 109 can block the execution of the command 155 in the memory device 130.

For example, the command 155 can be configured to activate a security feature of the memory device 130.

For example, the command 155 can be configured to replace the access control key 149 or a secret key 137 in the memory device 130. For example, the new secret key 137 can be generated using additional non-secret data provided during manufacture of a computing device in which the memory device 130 is installed but not available when the memory device 130 is being manufactured. For example, the new access control key 149 can be configured to provide a set of privileges to the client server 141.

After the execution of the command 155, the memory device 130 provides a response 289 that can be forwarded by the client server 141 to the security server 140. The security server 140 can determine whether the response 289 is correct. For example, the memory device 130 can sign the response using the session key 263 for validation by the security server 140.

In some implementations, a replacement secret key used to replace an existing secret key 137 of the memory device 130 is generated independently by the memory device 130 and by the security server 140 from a secret (e.g., a unique device secret 101) and additional data exchanged through the client server 141. Optionally, the additional data can be protected through encryption performed using the session key 263.

In some implementations, a replacement secret key is communicated from the memory device 130 to the security server 140 in an encrypted form of cipher text generated using the session key 263.

Figure 11:
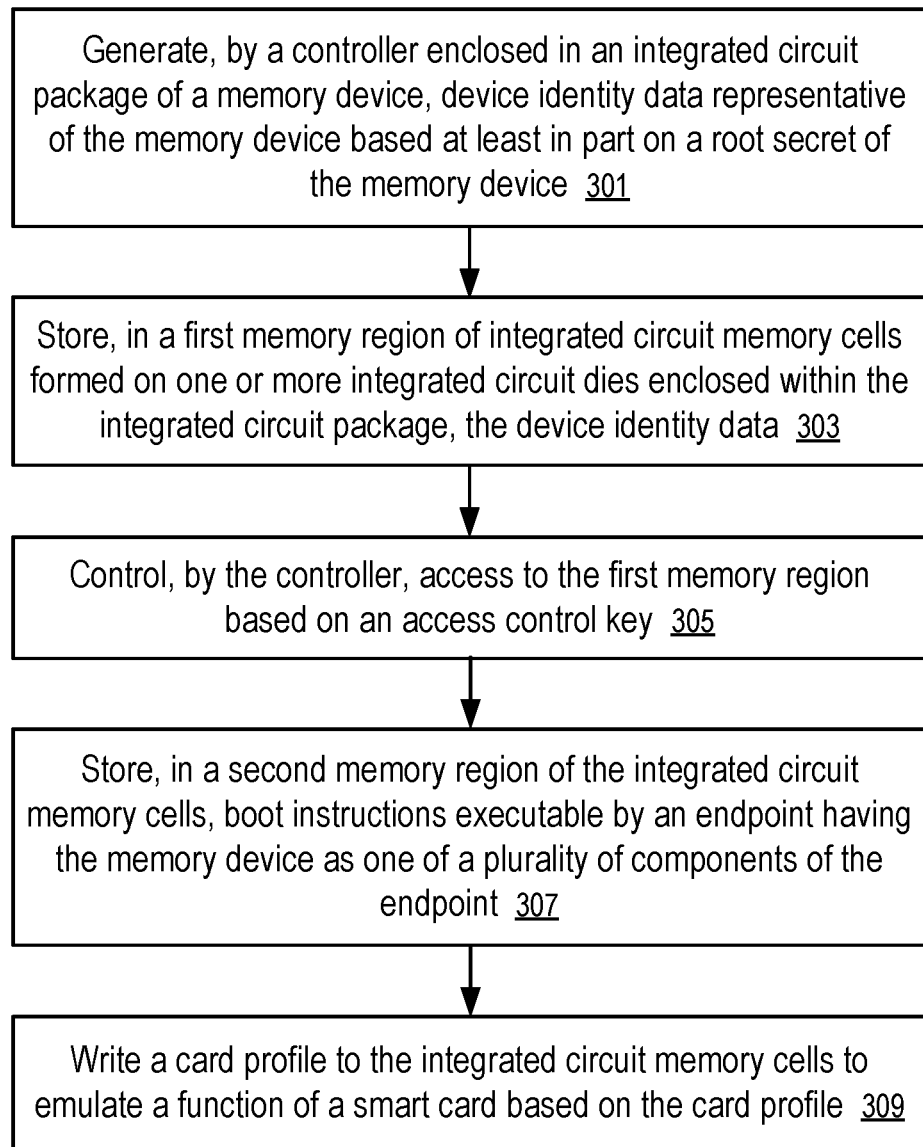
FIG. 11 shows a method of virtual smart card according to one embodiment.

FIG. 11 shows a method of virtual smart card according to one embodiment. For example, the method of FIG. 11 can be implemented in the system illustrated in FIG. 6 with the security server 140 and security features of a memory device 130 discussed above in connection with FIGS. 1-5, using the techniques of FIGS. 9 and 10.

At block 301, a logic circuit or controller enclosed in an integrated circuit package of a memory device 130, device identity data 211 representative of the memory device 130 based at least in part on a root secret of the memory device 130.

For example, the memory device 130 can have a physical unclonable function (PUF) to generate the root secret.

for example, the logic circuit or controller can include a cryptographic engine configured to perform cryptographic computations without using a processor outside of the integrated circuit package.

At block 303, the memory device 130 stores, in a first memory region of integrated circuit memory cells formed on one or more integrated circuit dies enclosed within the integrated circuit package, the device identity data 211.

At block 305, the logic circuit controls access to the first memory region based on an access control key 213.

At block 307, the memory device 130 stores, in a second memory region of the integrated circuit memory cells, boot instructions executable by an endpoint 150 having the memory device 130 as one of a plurality of components of the endpoint 150.

For example, the device identity data 211 can be computed and/or updated based on a hash value of applying a cryptographic hash function to the boot instructions stored in the second memory region in the memory device 130. Thus, the device identity data 211 can be locked to not only the hardware of the memory device 130 but also the boot instructions (and/or other data, such as trace data 215) stored in the memory device.

At block 309, a card profile 219 is written to the integrated circuit memory cells of the memory device 130 to emulate a function of a smart card based on the card profile 219.

For example, the endpoint 150 can be configured via the memory device 130 to generate endpoint identity data 188 representative of a component configuration of the endpoint 150 at its boot time. The endpoint identity data 188 can be computed using the device identity data 211, trace data 215 stored into the memory device 130 during the construction 233 of the endpoint 150, and identification data of components of the endpoint 150 that are located outside of the integrated circuit package of the memory device 130.

For example, the card profile 219 can be identified, generated, and/or assigned to the endpoint 150 based on the authentication of the endpoint identity data 188.

For example, the card profile 219 can include a soft module (e.g., soft card module 243, authentication module 259) that has instructions executable by the logic circuit, or a processor of the endpoint 150, or any combination of thereof, to emulate the function of the smart card.

For example, the card profile 219 can be stored in the memory device 130 to emulate a subscriber identification module (SIM) card that is typically used in the authentication of a mobile phone in accessing a cellular communications network. For example, the card profile 219 can include International Mobile Subscriber Identity number 255 and an authentication key 257 associated with the International Mobile Subscriber Identity number 255.

For example, when the endpoint 150 requests for a cellular connection to the International Mobile Subscriber Identity number 255, a mobile/cellular network operator may raise a security challenge to authenticate the endpoint 150. In response, the card profile 219 can be used to generate a response to a security challenge by signing a message having a random number using the authentication key 257 to demonstrate that the endpoint is in possession of the authentication key 257. For example, the message having the random number can be signed using the authentication key 257. A response to the security challenge can include a portion of the digital signature for authentication; and another portion of the digital signature can be used as a symmetric cryptographic key for encrypting a communication session associated with the cellular connection.

Figure 12:
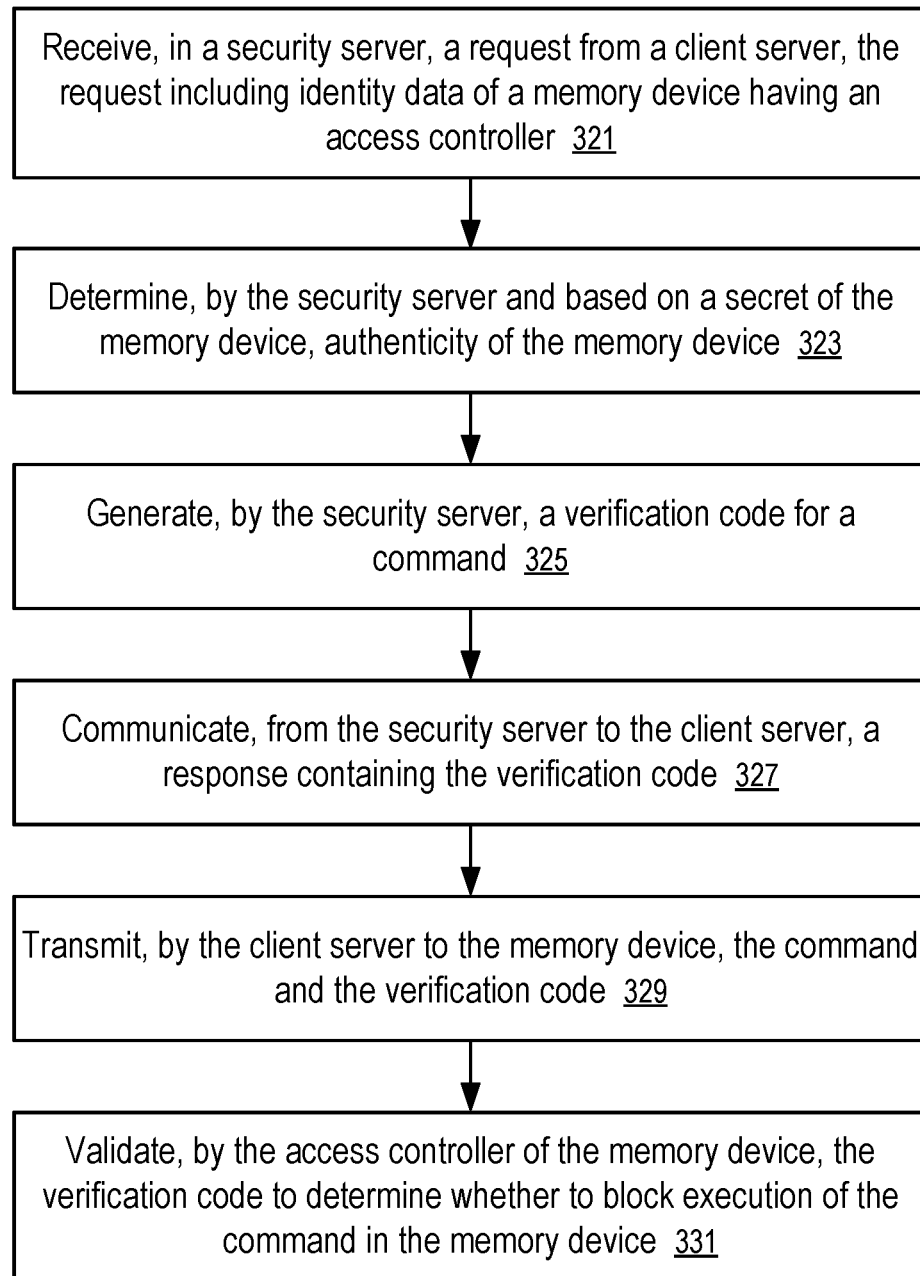
FIG. 12 shows a method of security services provided based on security features of a memory device according to one embodiment.

FIG. 12 shows a method of security services provided based on security features of a memory device according to one embodiment. For example, the method of FIG. 12 can be implemented in the computing system of FIG. 1 based on security features of a memory device 130 discussed above in connection with FIGS. 1-5, using techniques of FIGS. 9 and 10.

At block 321, a security server 140 receives a request (e.g., 173 and/or 281) from a client server 141. The request includes identity data 113 of a memory device 130 having an access controller 109. The request can further include a challenge nonce from the security server 140 to make the request and/or the response to the request non-replayable and thus defeat replay attacks.

At block 323, the security server 140 determines, based on a secret of the memory device 130 and the identity data 113, authenticity of the memory device 130.

For example, the secret can be a unique device secret 101 that is not communicated to outside of the memory device 130 after the completion of the manufacture of the memory device 130 in a secure facility. The identity data 113 is based on a secret key 137 generated based at least in part on the unique device secret 101. During manufacture of the memory device in the secure facility, the secret is registered into the security server 140 to generate, based at least in part on the secret, a cryptographic key 106 to validate in the identity data 113. The cryptographic key 106 used to validate the identity data 113 can be generated further based on data 125 received from a host system 120 of the memory device 130 during a boot time of the host system 120. After the completion of the manufacture of the memory device 130 in the secure facility, the memory device 130 can be assembled into an endpoint 150 having the host system 120 connected to a host interface 147 of the memory device 130. At least a portion of instructions configured for execution in a processing device 118 of the host system 120 is stored in the memory device 130.

At block 325, the security server 140 generates a verification code 153 for a command 155.

For example, after determining, based on client privilege data 283 stored in the security server 140, that the client server 141 has privileges to have the command 155 executed in the memory device 130, the verification code 153 can be generated for the client server 141 and provided in the response 174 based on the privileges.

For example, after determining that the memory device 130 is in an endpoint 150 that has been reported to be lost or stolen, the verification code 153 can be generated for the command 155 to disable the memory device 130.

At block 327, the security server 140 communicates, to the client server 141, a response 174 containing the verification code 153.

For example, the response 174 can be based on a determination that the memory device 130 has the secret when the identity data 113 containing a verification code 133 that is generated using the secret.

At block 329, the client server 141 transmits, to the memory device 130, the command 155 and the verification code 153.

At block 331, the access controller 109 of the memory device 130 validates the verification code 153 to determine whether to block execution of the command 155 in the memory device 130.

For example, when executed in the memory device 130, the command 155 causes a change in an access control key 149 used by the access controller 109 to validate verification codes (e.g., 153) generated using a cryptographic key 145 representative of a privilege to have one or more commands executed in the memory device 130.

For example, when executed in the memory device 130, the command 155 causes a change in a setting of security features of the memory device 130, or a change in content stored in the memory device (e.g., for an over-the-air update). Optionally, the command 155 can cause the memory device 130 to generate a cryptographic measurement of data stored in the memory device 130, and/or a digital signature, signed by the memory device 130, for the data stored in the memory device 130. For example, the change can include activation of a security feature of the memory device 130, or de-activation of the security feature.

For example, when executed in the memory device 130, the command 155 causes the memory device 130 to disable access to a platform boot loader stored in the memory device 130, after the endpoint 150 containing the memory device 130 has been reported lost or stolen.

For example, when executed in the memory device 130, the command 155 causes the access controller 116 to block access to one or more sections of memory cells 103 in the memory device 130.

For example, when executed in the memory device 130, the command 155 causes the memory device 130 to purge a decryption key for data stored in the memory device 130.

For example, when executed in the memory device 130, the command 155 causes the memory device 130 to irreversibly destroy at least one aspect of the memory device 130.

For example, based on validation of the identity data 113, a session key 263 can be established and known between the security server 140 and the memory device 130 without communicating the session key 263 over a connection between the security server 140 and the memory device 130. An access control key 149 used by the access controller 109 to validate a verification code 153 for a command 155 can be based on the session key 263.

Optionally, the security server 140 can cause the command 155 and the verification code 153 to be transmitted to the memory device 130 based on instructions loaded from the memory device 130 and executed in the host system 120.

Figure 13:
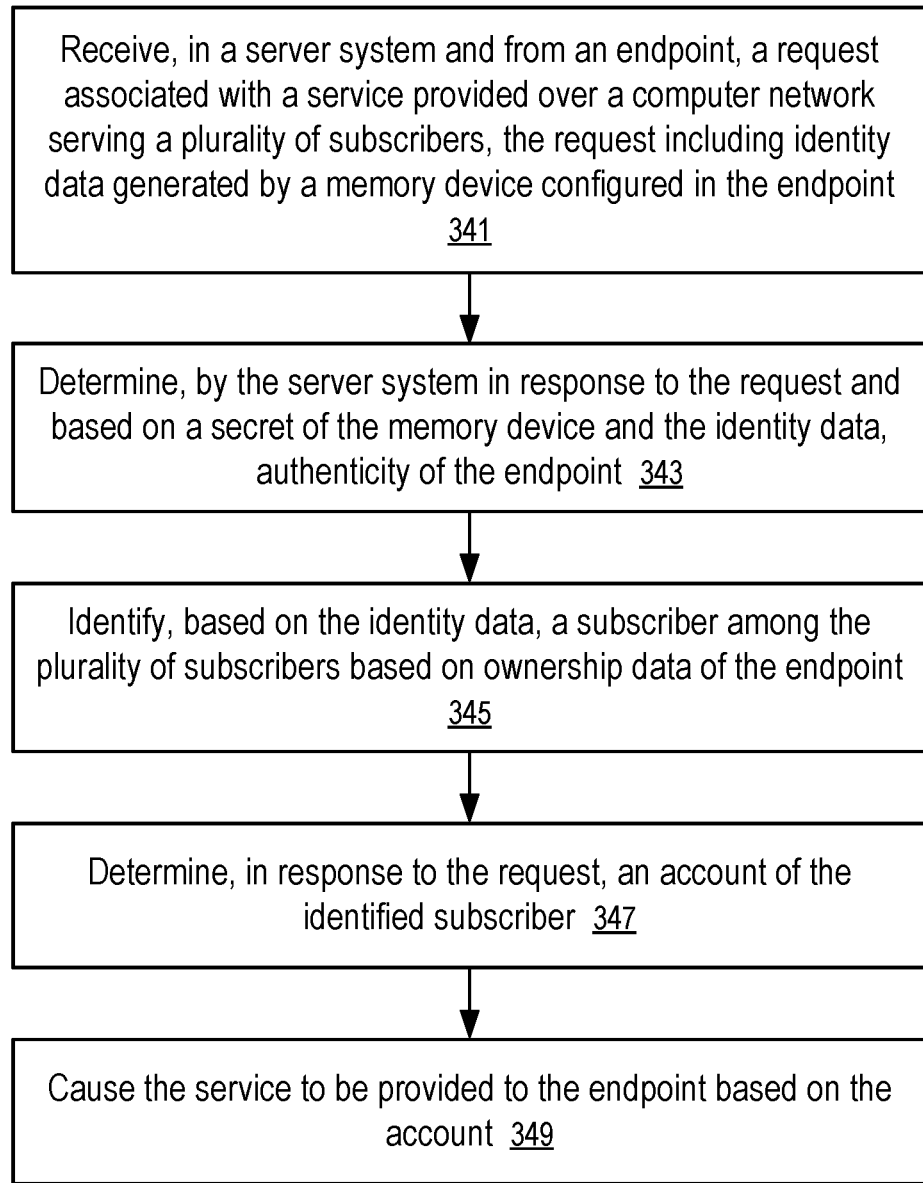
FIG. 13 shows a method of onboarding an endpoint for a service subscribed to an account according to one embodiment.

FIG. 13 shows a method of onboarding an endpoint for a service subscribed to an account according to one embodiment. For example, the method of FIG. 13 can be implemented in the computing system of FIG. 1 based on security features of a memory device 130 discussed above in connection with FIGS. 1-5, using techniques of FIGS. 9 and 10.

At block 341, a server system receives from an endpoint 150, a request (e.g., 171 and/or 173) associated with a service. The service is provided over a computer network (e.g., network 110) serving a plurality of subscribers represented by different accounts. The request includes identity data 113 generated by a memory device 130 configured in the endpoint 150.

For example, the server system can include the security server 140 and/or the card server 223. Optionally, the server system can further include a client server 141 in communication with the security server 140.

For example, the service can be a cellular connectivity service, a payment card service, a video surveillance service, a cloud-based storage or computing service, etc.

At block 343, the server system determines, in response to the request and based on a secret of the memory device 130 and the identity data 113, authenticity of the endpoint 150. For example, the operations in block 343 can be performed in a way similar to the operations performed in block 323.

At block 345, based on the identity data 113, a subscriber is identified among the plurality of subscribers based on ownership data of the endpoint 150.

For example, during manufacture of the endpoint 150 in a facility of a manufacturer of endpoints (e.g., 150), the memory device 130 is connected to the host system 120; and a software package for the operation of the endpoint 150 is installed in the memory device 130. The endpoint 150 is tested. In the endpoint registration 235, the memory device 130 is configured to generate the secret key 137 that is representative not only the memory device 130 having the unique device secret 101, but also the endpoint 150 having the memory device 130 with the data 123 in the memory cells 103 and data 125 from the host system 120 at boot time.

When the endpoint 150 is transferred from the manufacturer to a distributor and to an end user or subscriber, data associating the public identification of the endpoint 150 and the identity of the subscriber is stored in the server system. The ownership data can be stored in the server system without physically operating the endpoint 150 (e.g., without opening the package enclosing the endpoint 150 since the manufacture of the endpoint 150). For example, the public identification of the endpoint 150 can include the unique identification 111 of the endpoint 150 and/or data 127 that identifies the maker, model and serial number of the endpoint 150 as known to the manufacturer of the endpoint 150.

When the subscriber opens an account for the service provided to the endpoint 150, the identity of the subscriber can be associated with the account.

For example, the client privilege data 283 can include the ownership data of the endpoint 150 and/or the subscriber data showing the account of the subscriber.

At block 347, in response to the request received in block 341, an account of the identified subscriber is determined.

For example, the account can be identified by matching the identity of the subscriber associated with the identity data 113 in the ownership data and the associated with the account in the subscriber data.

At block 349, the server system causes the service to be provided to the endpoint 150 based on the account.

In some implementations, the client privilege data 283 stored in the security server 140 indicates the association between the identity data 113 and the account of the subscriber. Thus, during the validation of the authenticity of the endpoint 150 based on the received identity data 113, the account can be identified from the client privilege data 283.

In alternative implementations, the client privilege data 283 stored in the security server 140 indicates the association between the identity data 113 and the identity of the subscriber as an owner. Thus, during the validation of the authenticity of the endpoint 150 based on the received identity data 113, the subscriber can be identified from the client privilege data 283. Another server (e.g., client server 141 or card server 223) stores the subscriber data to identify the account based on the subscriber identified by the security server 140.

Using the method of FIG. 13, the service subscribed to an account can be provided/directed to an endpoint 150 without any customization of the endpoint 150 itself for the subscriber and/or the account of the subscriber. For example, the subscriber can simply open the package in which the endpoint 150 is enclosed during the manufacture of the endpoint 150 and use the endpoint 150 to access the service subscribed to the account of the subscriber, without inserting a card (e.g., a SIM card) to identify the subscriber or account and/or without interacting with an application or utility running in the endpoint 150 to identify the subscriber or account.

For example, after manufacture of the endpoint 150, the endpoint 150 has no customization for the subscriber and no customization for the account prior to the request received in block 341. The endpoint 150 is manufactured to be usable by any of the plurality of subscribers. In response to the request received in block 341, the endpoint 150 is automatically linked to the particular account of the subscriber for the service.

For example, before and/or after receiving the service for the account of the subscriber, the endpoint 150 contains no hardware component that is inserted into the endpoint 150 to represent the subscriber, the account, or any combination thereof.

For example, at least prior to the request received in block 341, the endpoint 150 contains no data that is stored into the endpoint 150 to represent the subscriber, the account, or any combination thereof.

For example, at least prior to the request received in block 341, the endpoint 150 contains no indication of the subscriber, the account, or any combination thereof, without the ownership data of the endpoint 150; and the ownership data is stored in the server system but not in the endpoint 150.

Optionally, responsive to the request received in block 341, the server system and/or the endpoint 150 can store associating the identity data of the endpoint 150 with the account of the subscriber.

For example, the security server 140 can generate, using a cryptographic key 145, a verification code 153 for a command 155. The server system can cause the memory device 130 to receive the command 155 and the verification code 153. Prior to execution of the command 155 in the memory device 130, the access controller 109 of the memory device 130 is configured to validate the verification code 153 based on an access control key 149. Optionally, the access control key 149 and the cryptographic key 145 can be based on a session key established in a way discussed in FIG. 9.

When executed in the memory device 130, the command 155 causes the memory device 130 to store additional data identifying the account. For example, the additional data can be part of the device information 121 used to generate the secret key 137 in generating updated identity data 113. For example, the additional data be included in the data 127 in a message 131 in updated identity data 113 generated by the memory device 130 after the execution of the command. For example, the additional data can include a card profile 219 that identifies the account of the subscriber.

Alternatively, data associating the identity data 113 of the memory device 130 and/or the endpoint 150 can be stored in the server system (e.g., as part of the client privilege data 283 and/or the card profile 219) without changing the secret key 137 used to sign the identity data 113.

Since no operation on the endpoint 150 is necessary to direct the service of an account of a subscriber to the endpoint 150, the endpoint 150 can be configured as an IoT device with cellular connectivity capability without a user interface for its customization to receive cellular connectivity services. For example, the endpoint 150 can be configured without a slot to insert a card to identify the subscriber. For example, the endpoint 150 can be configured without a user interface to receive input from an end user to identify the subscriber.

In some implementations, an endpoint 150 has a generic hardware configuration that can run different firmware to provide different functions. Further, an updated version of firmware can be installed in the endpoint 150 to correct defects or bugs in the endpoint 150 running the prior version of firmware, to improve performance, and/or to provide new functions. Optionally, a firmware application can run on top of a basic version of firmware to add functions, features, and/or services.

For example, different client servers 141, . . . , 143 can provide different services using the same hardware of the endpoint 150 that runs different firmware. For example, the different client servers 141, . . . , 143 can provide similar services using the same hardware of the endpoint 150 but perform different processing implemented using different firmware.

The endpoint 150 can be customized for different client servers 141, . . . , 143 after the endpoint 150 is assembled and shipped to an end user or subscriber by installing different firmware.

For example, an online firmware store can be configured on the communications network 110 to allow the end user to purchase a version of firmware. Installing a selected version of firmware may or may not include the installation of a firmware application running with a baseline version of firmware. After the installation of the selected version of firmware, the endpoint 150 is customized to in at least one aspect that is different from the endpoint 150 running the prior firmware.

In some instances, the updated firmware represents a service of the endpoint 150 requested by the user of the endpoint 150. The service of the endpoint 150 may or may not rely upon the services a client server or service provider.

The functionality of the endpoint 150 can be defined at least in part by its firmware. For example, when the endpoint 150 runs one version of firmware, the endpoint 150 can provide one function to the user of the endpoint 150; and when the endpoint 150 runs another version of firmware, the endpoint 150 can provide a different function to the user of the endpoint 150.

For example, different third party service providers can offer software/firmware solutions of IoT devices based on a common, generic hardware platform. For example, firmware provided in the online store can be programmed to enable a generic IoT device to work with a third party server to provide a particular type of services. Optionally, a firmware application provided in the online store can run on top of a generic version of firmware and use the basic services provided by the generic firmware to provide the particular type services. A combination of a baseline version of firmware and a firmware application can be considered an enhanced version of firmware. When baseline versions of firmware for different endpoint hardware platforms offer standardized services, a firmware application can be device agnostic and support a class of IoT devices from different vendors. Alternatively, a firmware application may be device dependent and use hardware capabilities that can vary among vendors.

A security server 140 can be coupled to the online firmware store to provide firmware updates to endpoints (e.g., 150) in response to validating the authenticity of the endpoints.

For example, when an endpoint 150 is initially connected to a client server 141, the client server 141 communicates with the security server 140 for the validation of the identity and/or authenticity of the endpoint 150. The owner of the endpoint 150 can be determined in the process of validation. After the subscribed services of the endpoint 150 are identified, a relevant firmware application can be downloaded from the online firmware store and installed into the endpoint 150 through an Over the Air (OTA) update.

For example, the security server 140 can generate the verification code 153 for the command 155 to install the firmware application into the memory device 130. After the execution of the command 155, the firmware application becomes part of the data 123 stored in the memory cells 103 of the memory device 130 and used as part of the device information 121 in generating an updated secret key 137 for an updated identity data 113 of the memory device 130 and the endpoint 150.

Subsequently, when there is an update for the firmware application in the online firmware store, the out of date firmware application in the endpoint 150 can be detected during the validate of the identity data 113; and the security server 140 can initiate an Over the Air (OTA) update for the endpoint 150 to reduce security risk.

For example, an online service store can offer cloud based services provided via endpoints (e.g., 150), such as IoT (Internet of Things) devices. A same endpoint 150 can be customized via firmware updates used with the different service providers that may operate different client servers 141, . . . , 143.

For example, the user of the endpoint 150 can visit the online store to subscribe to a service of a service provider, change the subscribed service, and/or move the subscription from one service provider to another service provider. The subscription ordered by the user for the endpoint 150 can be tracked as part of client privilege data 283 associated with the identity of the endpoint 150. When the identity data 113 of the endpoint 150 is validated by the security server 140, the security server 140 can check whether the endpoint 150 is in need for a firmware update for the subscribe service and/or for the replacement of an out of date version of firmware. If so, the security server 140 can cause a firmware update via the online store to customize and/or update the endpoint 150 prior to the endpoint 150 receives the subscribed service from the service provider. Optionally, the security server 140 communicates with the endpoint 150 to direct the endpoint 150 to the current client server 141 of the service provider. Alternatively, the updated firmware causes the endpoint 150 to connect to the current client server 141 of the service provider.

In general, the security server 140 can be connected to, or include, the online service store and/or the online firmware store. A server system can have the security server 140, the online service store, and/or the online firmware store. The server system can track the accounts that are used to subscribe to the services of different service providers and track the firmware customization selected/purchased by the users of endpoints (e.g., 150).

An account of the user of the endpoint 150 with a provider of services subscribed for the endpoint 150 can be tracked using an identity of the user and correlated with the identity of the user as the owner of the endpoint 150 for automated firmware update. Through the correlation, the firmware and/or service selection made by the user in the online service store and/or the online firmware store can be mapped to the endpoint 150 of the user. Alternatively, the user of the endpoint 150 can select firmware and/or services explicitly for the endpoint 150 using a public identification of the endpoint 150 that is part of the identity data 113 of the endpoint 150.

In some implementations, the endpoint 150 initially connects to the security server 140 for services. The security server 140 can identify the current provider of the subscribed service registered in the online service store based on client privilege data 283. After validating the authenticity of the endpoint 150 and determining the service provider, the security server 140 configures the firmware of the endpoint 150 for the service provider (e.g., using the online firmware store), and directs the endpoint 150 to the client server (e.g., 141, . . . , or 143) of the service provider. Thus, the endpoint 150 can seamlessly provide services ordered from the online service store with minimum user effort.

Figure 14:
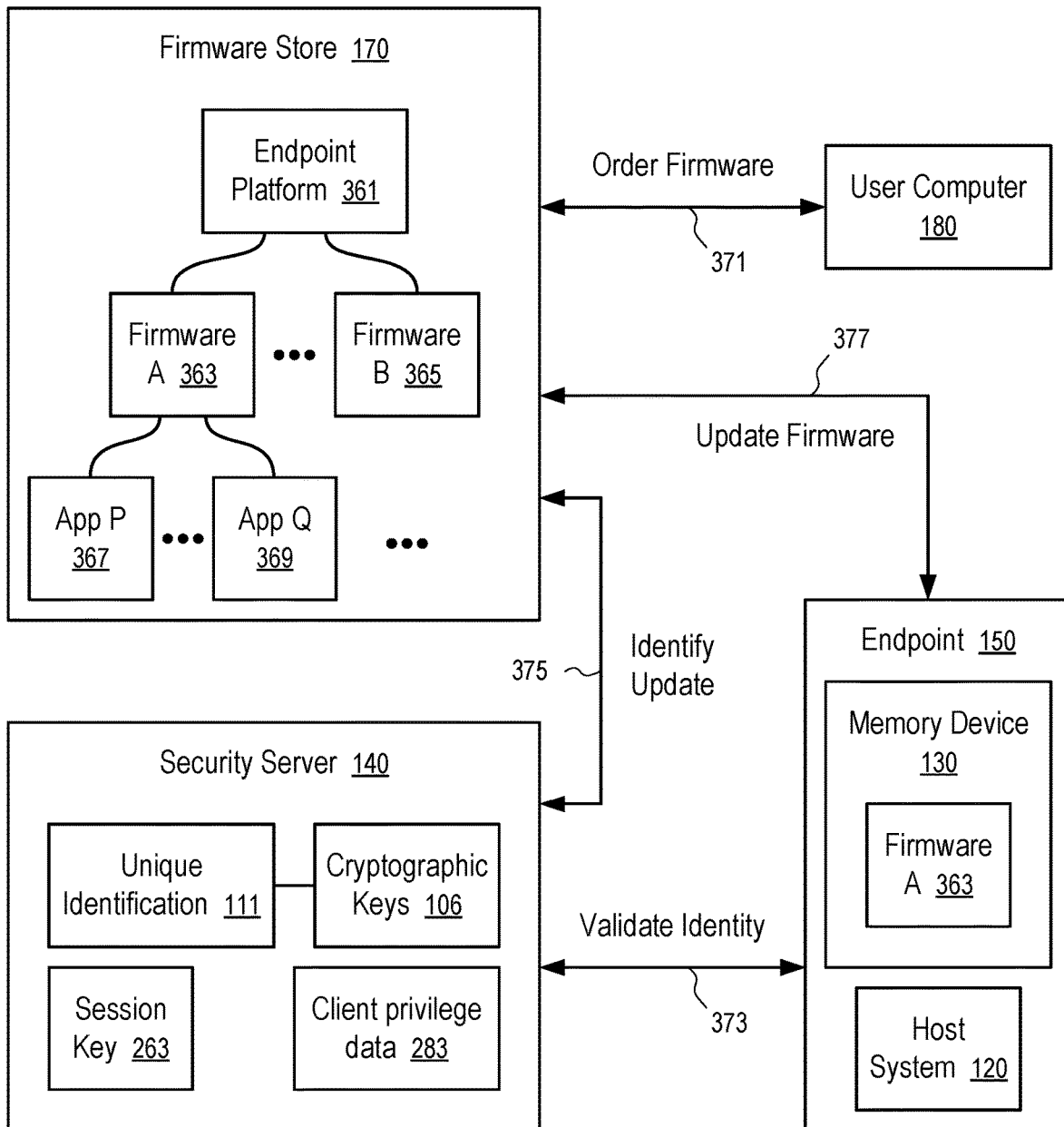
FIG. 14 shows a technique of endpoint customization using an online firmware store according to one embodiment.

FIG. 14 shows a technique of endpoint customization using an online firmware store according to one embodiment. For example, the technique of FIG. 14 can be implemented in a computing system of FIG. 1 and/or FIG. 6 with security services and features discussed with FIGS. 1 to 5. The technique of FIG. 14 can be used in combination with the techniques of FIGS. 9 to 13.

In FIG. 14, an online firmware store 170 is configured to facilitate the selection of firmware and/or firmware applications for the customization and/or update of endpoints (e.g., 150) in connection with the security server 140 validating the identity of the endpoints (e.g., 150).

The endpoint 150 has a set of hardware, including a host system 120 and a memory device 130 having security features. The functionality of the endpoint 150 can be defined, customized, and updated by the firmware 363 stored in the memory device 130 and executed in the host system 120 of the endpoint 150.

A manufacture of the endpoint 150 can install a baseline version of firmware 363 that is programmed to allow the endpoint 150 to generate and submit identity data 113 for validation by the security server 140. The baseline version of the firmware 363 is further configured to facilitate firmware updated via the firmware store 170 in connection with validation of the identity data 113 by the security server 140.

In general, the firmware update for the endpoint 150 can be the replacement of the entire firmware 363 for execution in the host system 120, or the addition and/or replacement of one or more firmware applications (e.g., app 367, . . . , 369).

An endpoint platform 361 can be used to represent a class of endpoint hardware. Each endpoint (e.g., 150) in the class can run different versions of firmware (e.g., 363, . . . , 365) to provide different functions and/or services.

In some implementations, the firmware 363 can be customized via one or more firmware applications (e.g., app 367, . . . , 369). For example, the endpoint 150 running the firmware 363 can further run an optional application (e.g., app 367, . . . , or 369) to provide a new function not found in the firmware 363, to disable an existing function in the firmware 363, to change or customize an existing function in the firmware 363, etc.

For example, when a firmware application (e.g., app 367) is running on top of the firmware 363 in the endpoint 150, the endpoint 150 is customized for communication with a client server 141 of a service provider to implement a service or function and/or to receive a service from the service provider. When another firmware application (e.g., app 369) is running on top of the firmware 363 in the endpoint 150, the endpoint 150 is customized differently for communication with another client server 143 of a different service provider to implement an alternative or similar service or function and/or to receive an alternative or similar service from the different service provider.

For example, the firmware application (e.g., app 367) can be programmed to implement a communication protocol that is specific to the client server 141.

For example, the firmware application (e.g., app 367) can be programmed to perform a new computing function that generates a new type of results.

For example, the firmware application (e.g., app 367) can be programmed to communicate with the client server 141 for a service provided via the client server 141. Examples of the service of the client server 141 include computing resources of the client server 141 to process data for the endpoint 150, a data storage facility of the client server 141 for data generated by the endpoint 150, a messaging facility for notifications and/or alerts to one or more other devices associated with the endpoint 150, connectivity via the client server 141 with one or more other devices associated with the endpoint 150, Internet access by the endpoint 150 via a Wi-Fi access point, a communications satellite, and/or a communications connection or equipment controlled by the client server 141, etc.

In general, different service providers can offer different versions of firmware and/or different firmware applications to customize endpoints (e.g., 150) in the same endpoint platform 361. Endpoints in the platform 361 can be manufactured and/or assembled by a same manufacturer, or different manufacturers.

Optionally, a baseline version of firmware (e.g., 363) can offer a standardized set of functions based on which the firmware applications (e.g., app 367, . . . , 369) can run. Thus, a same firmware application (e.g., app 367) can be installed to customize endpoints (e.g., 150) having different hardware configuration and/or different baseline versions of firmware (e.g., 363, . . . , 365). Alternatively, different firmware applications may be programmed for different baseline versions of firmware (e.g., 363, . . . , 365) running on endpoints having different hardware implementations to provide a same customized function of the respective endpoints and/or for the same service of a client server 141.

The use of firmware applications (e.g., app 367, . . . , 369) can reduce the size of data to be downloaded from the firmware store 170 to the endpoint 150 in performing firmware update. Alternatively, different sets of firmware functions can be implemented using different firmware (e.g., 363, . . . , 365) without additional firmware applications. In general, a firmware update in the endpoint 150 can involve the replacement of the existing firmware 363 in its entirety, or the installation of a firmware application (e.g., app 367).

Optionally, the firmware store 170 is configured to allow a user of the endpoint 150 to use a computer 180 to select and/or order 371 firmware for the customization of the endpoint 150. In some instances, the purchase of a selected version of firmware (e.g., 363) and/or a firmware application (e.g., 367) represents the request for a service from a service provider and/or a client server (e.g., 141). In response, the firmware store 170 and/or the security server 140 can store data indicative of a desired firmware configuration and/or a requested service for the endpoint 150. For example, the client privilege data 283 can be updated to reflect the firmware and/or service selection made using the user computer 180.

In general, the user computer 180 can be different and separate from the endpoint 150. Thus, a hardware and/or software interface accessible to the user of the endpoint 150 to customize the endpoint 150 for its use with an account and/or a service provider is not necessary. Optionally, the endpoint 150 of some implementations and/or categories can include a user interface that allows its use as the user computer 180 to order 371 firmware for the endpoint 150.

For example, the owner or user of the endpoint 150 can use the user computer 180 to visit the online firmware store 170 to order 371 firmware for the endpoint 150 by selecting a firmware application (e.g., app 367), a replacement version of firmware, or a combination a replacement version of firmware and a firmware application. The order can be identified for the user as a service subscriber and/or the endpoint 150 as a device to be customized.

For example, the endpoint 150 can be identified via a public identification of the endpoint 150, such as a model and serial number of the endpoint 150, a mobile equipment identity number 253, an international mobile subscriber identity number 255, the unique identification 111, and/or another identifier included in the data 127 of the identity data 113.

For example, the identity of the user or subscriber can be identified via an account identifier and/or a piece of personally identifiable information, such as an email address, a phone number, a name and address, etc.

The security server 140 can validate 373 identity data 113 submitted from the endpoint 150 and/or its memory device 130, as discussed above in connection with FIGS. 2, 5 and 9.

In general, the identity data 113 can be submitted to the security server 140 via a client server (e.g., 141 or 143), via the firmware store 170, via another server or gateway, or without going through any of the client servers 141, ..., 143 and the firmware store 170.

For example, the endpoint 150 can be configured via the existing firmware 363 to automatically visit the firmware store 170 and/or the security server 140 for identity verification, firmware update, and/or service customization. Thus, the identity data 113 can be submitted to the security server 140 via the firmware store 170 in some instances, and submitted to the security server 140 directly in other instances.

For example, when a server (e.g., a client server 141 or 143, the firmware store 170, or another server) receives the identity data 113 for a request 171 from the endpoint 150, the server (e.g., 141) provides the identity data 113 to the security server 140 in a request 173 for validation. In response to such a request 173, the security server 140 can communicate with the firmware store 170 to identify 375 whether there is a firmware update for the endpoint 150. If so, the security server 140 can cause the firmware store 170 to update 377 the firmware of the endpoint 150. For example, after a firmware download is performed to store a new version of firmware and/or a firmware application (e.g., app 367) in the memory device 130, a command 155 signed using a cryptographic key 145 is then executed in the memory device 130 to cause a new version of firmware and/or the firmware application (e.g., app 367) to be executed in the memory device 130 and to become part of the identity of the memory device 130 and/or the endpoint 150.

For example, the firmware 363 can be initially installed in the endpoint 150 (e.g., by a manufacturer of the endpoint 150) to provide a service via a client server 141. After a new version of the firmware 363 is available in the firmware store 170 for accessing the same service of the client server 141, the security server 140 can initiate the installation of the new version in response to the successful validation of identity data 113. Optionally, the update 377 can be implemented via installation of a firmware application (e.g., app 367) that runs on top of the existing firmware 363, or implemented via installation of new firmware (e.g., 365).

For example, after the user of the firmware 363 visits the firmware store 170 to order 371 an alternative version of firmware 365 to customize the endpoint 150, when the identity data 113 of the endpoint 150 is successfully validated in the security server 140, the firmware store 170 can update 377 the firmware of the endpoint 150 according to the order 371.

In some instances, the endpoint 150 visits the security server 140 first. After the security server 140 validates 373 of the identity of the endpoint 150, the security server 140 can communicate with the online firmware store 170 to identify 375 a firmware update from the endpoint 150.

In general, a firmware update can include the installation of a firmware application (e.g., app 367), the replacement of an existing firmware application with another firmware application, and/or the installation of new firmware 365.

After the desirable firmware update is identified, the firmware store 170 communicates with the endpoint 150 to update 377 the endpoint 150.

The access controller of the memory device 130 is configured to require the verification of a privilege to request the memory device 130 to execute a command 155 to make a change in firmware stored in the memory device 130.

For example, after the data required for the firmware update is stored into a section of the memory device 130, the command 155 can be sent to the host interface 147 to perform the operations of firmware update in the memory device 130. The privilege of having the command 155 executed in the memory device 130 can be represented by a cryptographic key 145. The cryptographic key 145 can be previously configured, or generated in response to validating the identity data 113 from the memory device 130 of the endpoint 150. For example, the cryptographic key 145 can be the session key 263 generated based on the validation of the authenticity of the endpoint 150, in a way similar to FIG. 9; and the security server 140 can generate a verification code 153 for the command using the cryptographic key 145 for the firmware store 170 to update the endpoint 150. Alternatively, the security server 140 can provide the session key 263 and/or the cryptographic key 145 to the firmware store 170 to update 377 firmware of the endpoint 150.

After the successful firmware update, the device information 121 for the generation of the secret key 137 is updated to reflect the installed firmware and/or firmware application. For example, a hash value 163 of the installed firmware and/or firmware application can be stored as part of the device information 121 for the validation of their integrity as in FIG. 4. Subsequently, the identity data 113 generated by the memory device 130 for the endpoint 150 is based on the updated device information 121 and reflects the configuration of the endpoint 150 having the updated firmware functionality or configuration.

In some embodiments, the firmware store 170 is part of a server system that implements the security server 140. In another embodiment, the firmware store 170 is hosted on a separate server computer.

In some implementations, the update 377 of firmware can be performed automatically based on the service subscribed for the endpoint 150, as further discussed below in connection with FIG. 15.

Figure 15:
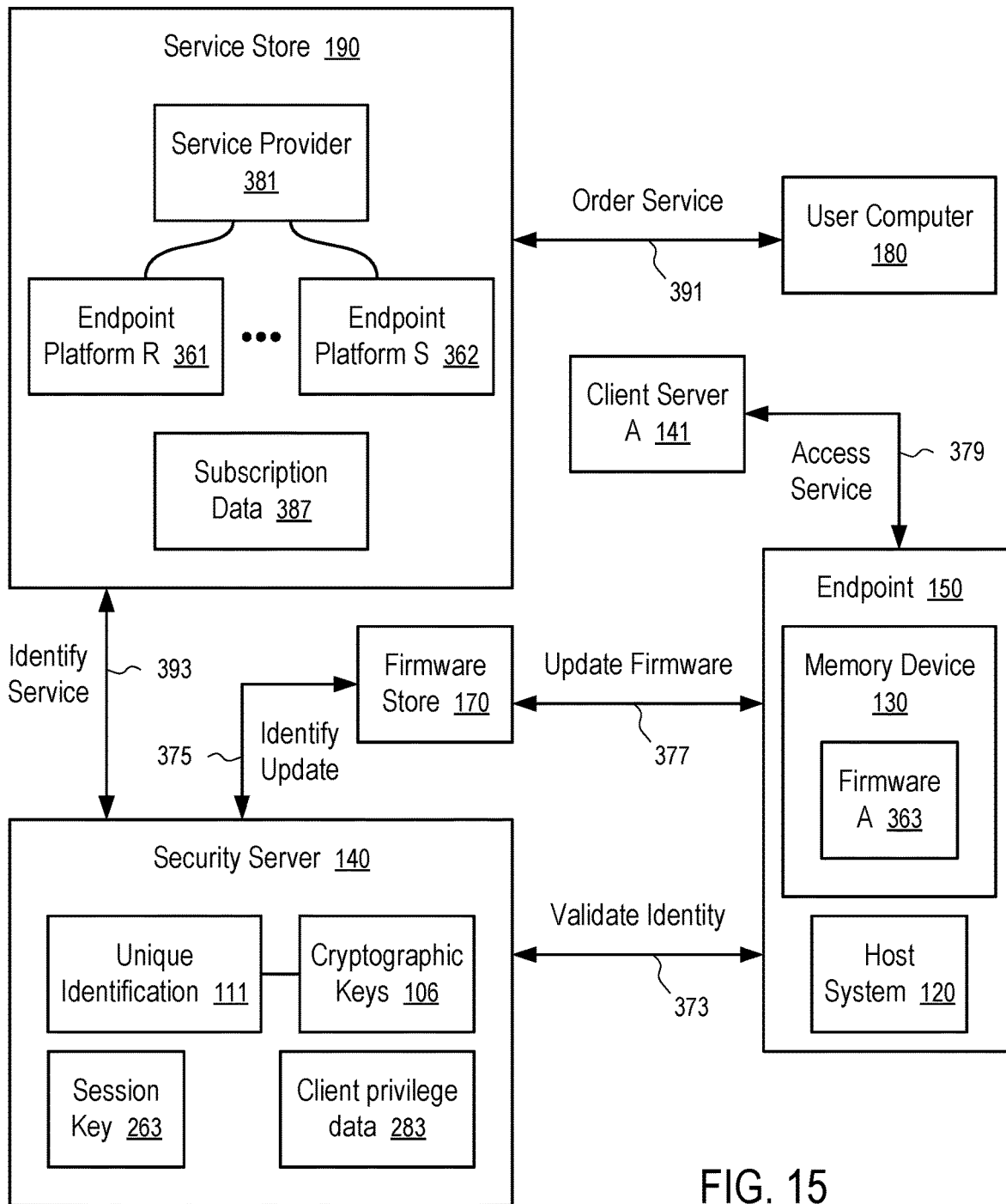
FIG. 15 shows a technique of directing services to an endpoint via an online service store according to one embodiment.

FIG. 15 shows a technique of directing services to an endpoint via an online service store according to one embodiment. For example, the technique of FIG. 15 can be used in combination with the technique of FIG. 14.

In FIG. 15, an online service store 190 is configured to facilitate the selection, for an endpoint 150, of a service from a plurality of services offered by one or more service providers (e.g., 381). The service of a service provider (e.g., 381) can be implemented via one or more endpoint platforms (e.g., 361, . . . , 362).

For example, a user of the endpoint 150 can use a computer 180 to visit the online service store 190 to order 391 a service from a service provider 381 using a computer 180. The service offered by the service provider 381 can be used with endpoints of multiple endpoint platforms (e.g., 361, . . . , 362). Endpoints (e.g., 150) in the endpoint platforms (e.g., 361, . . . , 362) run different firmware for the service of the service provider 381. The service store 190 has subscription data 387 identifying the services ordered by subscribers and/or for the endpoints (e.g., 150).

For example, the service offered by the service provider 381 can be implemented via a client server 141; and the subscription data 387 can identify the servers to which the endpoints are to connect to receive respectively services subscribed for the endpoints.

For example, a service can be ordered explicitly for the endpoint 150 with a reference to a public identification of the endpoint 150, a model and serial number of the endpoint 150, a mobile equipment identity number 253, an international mobile subscriber identity number 255, the unique identification 111, and/or another identifier included in the data 127 of the identity data 113.

Alternatively, or in combination, a service can be ordered with a reference to the identity of the user or subscriber, which can be identified via an account identifier and/or a piece of personally identifiable information, such as an email address, a phone number, a name and address, etc.

As in FIG. 14, the user computer 180 is typically different and separate from the endpoint 150. In some instances, the endpoint 150 can include a user interface that allows its use as the computer 180 to order 391 services for the endpoint 150.

When a service is ordered implicitly for the endpoint 150, the identity of the subscriber can be used to determine the services of the endpoints of the subscriber, based on matching the identity of the subscriber used to order the service and the identity of the owner of the endpoint 150.

For example, to order 391 a service from the service provider 381, the user of the endpoint 150 (or a representative of the user) can visit the service store 190 to establish an account for subscribing to the service of the service provider 381.

The security server 140 and the service store 190 can communicate with each other to identify 393 a service subscribed for the endpoint 150, in response to the service being ordered or changed or in response to the identity data 113 of the endpoint 150 being validated.

In response to a service request 171 for from the endpoint 150, the security server 140 validates 373 the identity data 113 of the endpoint 150 provided in the service request 171.

In general, the service request 171 can be received initially in a client server (e.g., 141 or 143), or in the service store 190 or the firmware store 170, or directly in the security server 140.

After the security server 140 validates 373 the identity and authenticity of the endpoint 150, the security server 140 can identify 393 the service subscribed for the endpoint 150, based on the client privilege data 283 stored in the security server 140 and/or based on the subscription data 387 in the service store 190.

Based on the identified service, the security server 140 can communicate with the firmware store 170 to identify 375 a firmware update for the endpoint 150. For example, the endpoint 150 can be updated via replacement of firmware or installation of a firmware application (e.g., app 367) to customize the endpoint 150 for the subscribed service. The firmware update can be performed and secured in a way as discussed above in connection with FIG. 14.

For example, the endpoint 150 can be manufactured with a generic version of firmware 363 that is not capable of receiving the service from the service provider 381, that has no knowledge about the client server 141 for the service offered by the service provider 381, and/or that has no communication protocol implemented for communication with the client server 141. A firmware application (e.g., app 367) can be installed to run on top of the generic firmware 363 to customize the endpoint 150 for the service ordered for the endpoint 150. Once customized via the firmware application (e.g., app 367), the endpoint 150 can function in receiving the service of the service provider 381 from the client server 141. For example, after the installation of the firmware application (e.g., app 367) to update 377 firmware, the endpoint 150 has the knowledge about the client server 141, the communication capability to communicate with the client server 141 according to a communication protocol used by the client server 141, and the processing routines to use the service offered by the client server 141.

For example, the service subscribed for the operations of the endpoint 150 can include computing performed by the client server 141 to process data for the endpoint 150, storing in the client server 141 data generated by the endpoint 150, sending notifications and/or alerts to one or more other devices associated with the endpoint 150, connecting via the client server 141 with one or more other devices associated with the endpoint 150, connecting the endpoint 150 to a computer network or the Internet using a cellular base station, a Wi-Fi access point, a communications satellite, and/or a communications connection or equipment controlled by the client server 141, etc.

Optionally, after the firmware update 377, the endpoint 150 is configured via its firmware 363 and/or a firmware application (e.g., app 367) to automatically visit the client server 141 for the subscribed service. Alternatively, the security server 140 can redirect the endpoint 150 to the client server 141 to access 379 the subscribed service after validating the identity data 113 of the endpoint 150 having the updated firmware.

In general, the service store 190 can be used by a user (or a representative for the user) to subscribe a service of a service provider 381 for the endpoint 150, to change a subscribed service, to move a subscription from one service provider 381 to another service provider. The firmware 363 of the endpoint 150 is updated automatically to support the currently subscribed service without the user of the endpoint 150 operating on the endpoint 150 to customize the endpoint 150 for the subscribed service.

Figure 16:
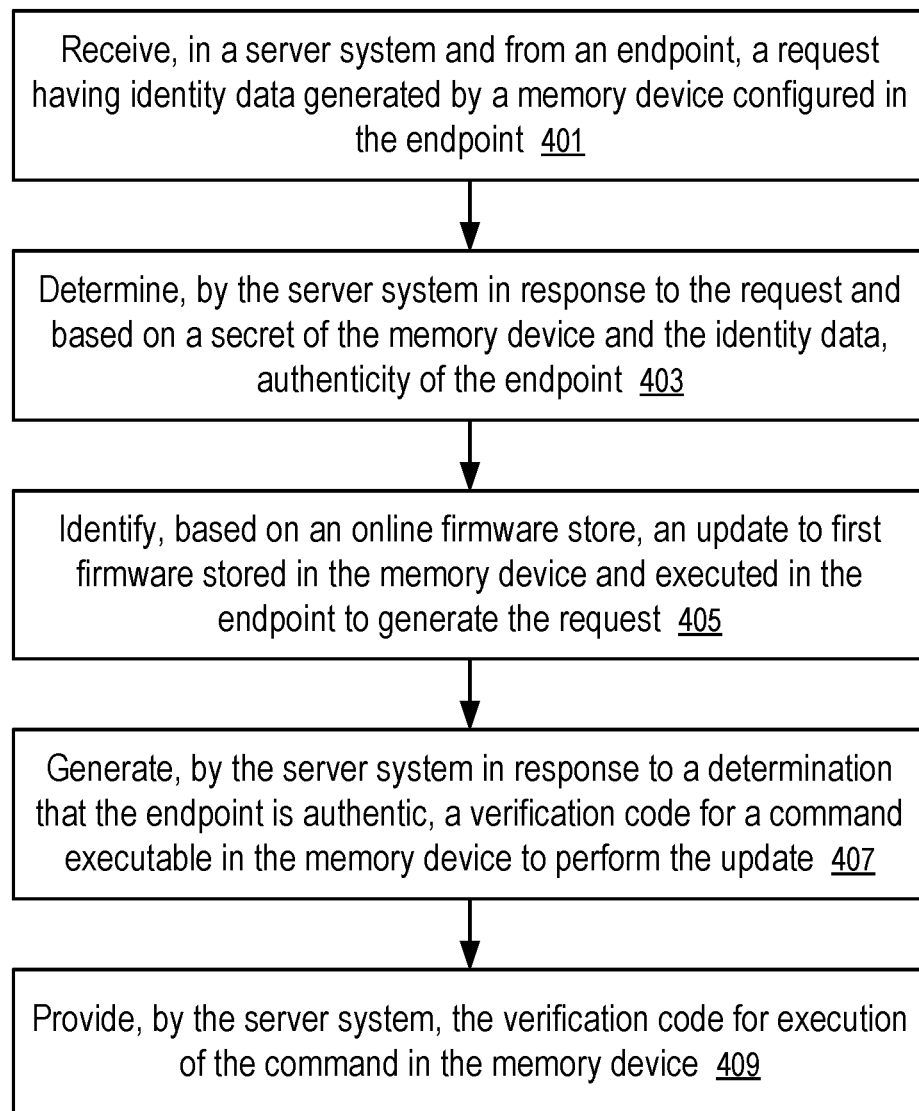
FIG. 16 shows a method of firmware update using a firmware store and a security server according to one embodiment.

FIG. 16 shows a method of firmware update using a firmware store and a security server according to one embodiment. For example, the method of FIG. 16 can be implemented using the technique of FIG. 14.

At block 401, a server system receives, from an endpoint 150, a request having identity data 113 generated by a memory device 130 configured in the endpoint 150.

For example, the server system can include the security server 140. Optionally, the server system can further include the online firmware store 170 and/or one or more client servers (e.g., 141, . . . , 143).

For example, the endpoint 150 can be in a state as shipped from the manufacture of endpoints (e.g., 150) without customization for particular servers and/or service providers.

At block 403, the server system determines, in response to the request received in block 401 and based on a secret of the memory device 130 and the identity data 113, authenticity of the endpoint 150. For example, the operations in block 403 can be performed in a way similar to the operations performed in block 323 and/or block 343.

For example, the identity data 113 includes a verification code 133 presented in the identity data 113. The security server 140 can be validate that the verification code 133 is generated using a secret key 137 of the memory device 130 and the message 131 without the endpoint presenting the secret key 137. The secret key 137 is generated using the unique device secret 101 of the memory device 130 and device information 121 that is representative of the software and hardware configuration of the endpoint 150.

At block 405, based on an online firmware store 170, an update to first firmware 363 is determined. The first firmware is stored in the memory device 130 and executed in the endpoint 150 to generate the request received in block 401.

For example, prior to the request being received in block 401, the firmware store 170 can receive an order 391 of firmware for the endpoint 150. The order 391 can be made to customize the functionality of the endpoint 150 using a user computer 180 without going through the endpoint 150. The order 391 received in the firmware store 170 can be used to identify 375 the update 377.

For example, the order 391 can be identified for the endpoint 150 using a public identification of the endpoint 150. The identity data 113 can include the public identification in the message 131 signed using the secret key 137 to generate the verification code 133 provided in the identity data 113. After verifying that the message 131 has not been alter, the security server 140 can instruct the online firmware store 170 and/or the endpoint 150 to update 377 the firmware 363 of the endpoint 150.

At block 407, in response to a determination that the endpoint 150 is authentic, the server system generates a verification code 153 for a command 155 executable in the memory device 130 to perform the update.

At block 409, the server system provides the verification code 153 for execution of the command 155 in the memory device 130 for firmware update.

For example, in response to the determination that the endpoint is authentic, the security server 140 can communicate with the online firmware store 170 to download data into the memory device 130. When the command 155 is executed in the memory device 130, the memory device 130 performs the firmware update using the data.

For example, the data downloaded to the memory device 130 can include second firmware that, after execution of the command 155 for firmware update, replaces the first firmware that is executed to generate the request received in block 401.

For example, the data downloaded to the memory device 130 can include a firmware application (e.g., app 367) that, after execution of the command 155 for firmware update, runs with the first firmware that is executed to generate the request. A combination of the firmware application (e.g., app 367) and the first firmware provides second firmware of the endpoint 150.

For example, after the execution of the command 155 for firmware update, the endpoint 150 is configured, via the second firmware, to provide a function not in the endpoint running the first firmware prior to the update.

After the execution of the command 155 for firmware update, the second firmware can become part of the identity of the memory device 130 and the endpoint 150. For example, based on the device information 121 the memory device 130 is configured to generate a secret key 137 representative of the identity of the memory device 130 and the endpoint 150. After the execution of the command 155 to update 377 firmware, the device information 121 is updated to include a hash value 163 of the second firmware that is stored in the memory cells 103 as the content 161. Subsequently, the memory device 130 is configured to generate identity data 113 of the endpoint 150 using a cryptographic key that is generated based at least in part on the secret (e.g., unique device secret 101) of the memory device and the second firmware stored in the memory device 130.

Figure 17:
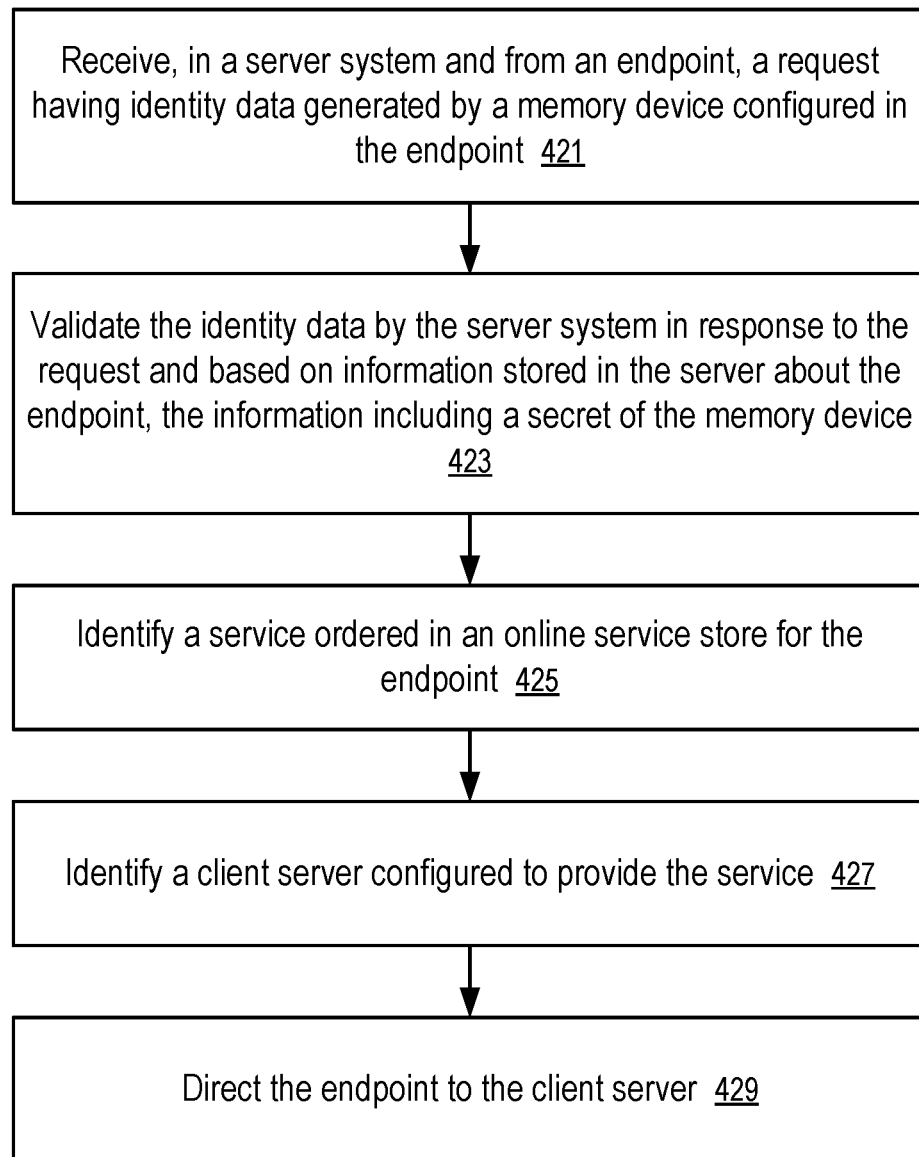
FIG. 17 shows a method of endpoint customization using a service store and a security server according to one embodiment.

FIG. 17 shows a method of endpoint customization using a service store and a security server according to one embodiment. For example, the method of FIG. 17 can be implemented using the technique of FIG. 14 and FIG. 15.

At block 421, a server system receives, from an endpoint 150, a request having identity data 113 generated by a memory device 130 configured in the endpoint 150, similar to block 401.

For example, the server system can include a security server 140 and/or a service store 190.

At block 423, the security server 140 validates the identity data 113 in response to the request received in block 421 and based on information stored in the security server 140 about the endpoint 150. Such information includes a secret of the memory device 130, such as unique device secret 101. Such information can further include device information 121 representative of software/hardware configurations of the endpoint 150. The validation can be performed in a way as discussed above in connection with FIG. 2.

In response to a determination that the identity data 113 in the request received in block 421 is valid, at block 425, the server system identifies a service ordered in the online service store 190 for the endpoint 150.

At block 427, a client server 141 configured to provide the service is identified.

For example, prior to the request being received in block 421, the online service store 190 can receive an order 391 of the service for the endpoint 150. The client server 141 can be identified based on the order 391.

For example, the order 391 can be received in the online service store 190 through a user computer 180 and thus without going through the endpoint 150. The order 391 can be identified/placed for the endpoint 150 using a public identification of the endpoint 150. The identity data 113 can include the public identification. Alternatively, the order 391 can be associated with an identity of a user as the owner of the endpoint 150 in the client privilege data 283 in the security server.

At block 429, the server system directs the endpoint 150 to the client server 141.

For example, in response to the determination that the identity data 113 in the request received in block 421 is valid, the server system can configure the endpoint 150 for the service ordered in the online service store 190.

For example, to configure the endpoint 150 for the service, the server system can update the firmware of the endpoint 150. For example, the firmware update can be performed in a way as discussed above in connection with FIGS. 14 to 16.

For example, prior to the firmware update 377, the endpoint 150 is incapable of receiving the service from the client server 141 and does not have knowledge about the client server 141. For example, the endpoint 150 as initially configured by a manufacture of endpoints (e.g., 150) is programmed to visit the service store 190, the firmware store 170, the security server 140, or another gatekeeper, such that the endpoint 150 can be properly configured and/or updated for usage without the end user having to operate on the endpoint 150 for its customization.

For example, after the firmware update 377, second firmware is stored in the memory device 130 to replace first firmware that was used to generate the request received in block 421. When the endpoint 150 runs the second firmware, the endpoint has a function not found in the endpoint running the first firmware prior to the firmware update 377. For example, the second firmware can include an identification of the client server 141 to direct the endpoint to visit the client server 141 for the service ordered in the online service store 190. In some implementation, the second firmware is a combination of the first firmware an addition of a firmware application. After the firmware update 377, the memory device 130 is configured to generate the updated identity data 113 of the endpoint 150 using a secret key 137 that is generated based at least in part on the secret (e.g., Unique Device Secret 101) and the second firmware stored in the memory device 130.

Optionally, to configure the endpoint 150 for the service ordered in the service store 190, the server system identifies an account used to subscribe the service for the endpoint 150. The memory device 130 is configured to store an identifier of the account and include the identifier as part of the message 131 in the updated identity data 113.

For example, to perform the firmware update 377, the server system can generate a verification code 153 for a command 155 using a cryptographic key 145 representative of a privilege to have the command 155 executed in the memory device 130. When executed in the memory device 130, the command 155 causes replacement of the first firmware with the second firmware. After the memory device 130 receives the command 155 and the verification code 153, the memory device 130 validates the verification code 153 for the privilege prior to execution of the command 155.

The security server 140 can be used to not only validate the identify of an endpoint 150 based on the security features of a memory device 130 configured in the endpoint 150, but also monitor the integrity of packages stored in the memory device 130 and/or in the endpoint 150. For example, a package stored in the endpoint 150 can be a boot loader, firmware, software, a module, at least a portion of an operating system or an application, a set of files specifying resources, configuration parameters and/or other data of a program or routine, etc. When a package is found to be corrupted, modified, tampered with, or out of date, the security server 140 can initiate an Over the Air (OTA) update to maintain the integrity the endpoint 150.

The memory device 130 can store content 161 in memory cells 103 and separately store a hash value 163 as part of the device information 121, as illustrated in FIG. 4. When the current hash value computed from the content 161 stored in the memory cell 103 does not match with the expected hash value 163 stored as part of the device information 121, the memory device 130 can detect the modification or corruption of the content 161 and initiate a repair of the content.

For example, the content 161 can include a core package of the endpoint 150. The integrity of the core package can impact the operations of the endpoint 150 in communicating with the security server 140 in validating 373 the identity of the endpoint 150. Examples of a core package can include a boot loader, firmware, and/or at least a portion of the operating system of the endpoint 150. When the core package is modified, corrupted, or tampered with, the security of the operations of the endpoint 150 performed for identity validation may not be trusted. When the integrity status 165 generated by the cryptographic engine 107 indicates a change in the core package, the access controller 109 can prevent the host system 120 from accessing the content 161 until the core package is repaired.

For example, the memory device 130 can store a reliable, backup copy of the core package in a separate section; and when the core package in the content 161 stored in the memory cells 103 has a hash value that is different from the corresponding hash value 163 stored for the device information 121, the memory device 130 can use the copy stored in the separate section to replace the core package stored in the memory cells 103. Optionally, the execution of the replacement copy in the endpoint 150 can be configured to start a recovery process to obtain an up to data version of the package from a reliable source, such as the firmware store 170. Alternatively, the security server 140 can initiate the update (e.g., using the firmware store 170) after validating the identity data 113 of the memory device 130 and/or the endpoint 150 submitted via the replacement copy.

Some packages stored in the memory cells 103 do not have impact on the security of initial operations to validate 373 the identity data 113 of the endpoint 150 and subsequent operations to update the endpoint 150. Thus, it is not necessary to store a recovery copy of such packages in the memory device 130. Repair and/or update of such packages can be performed via the security server 140. For example, when the integrity status 165 indicates that a non-core package has changed, the access controller 109 can block the host system 120 from accessing the corrupted or changed package until the endpoint 150 communicates with the security server 140 for the repair or recovery of the corrupted package.

Optionally, the data 127 provided in the identity data 113 can include the current hash value of a package in the content 161 stored in the memory cells 103. During the operations to validate 373 the identity data 113 of the endpoint 150, the security server 140 can examine the current hash value provided in the identity data 113 for the package. If the current hash value of the package indicates that the package has been changed, corrupted, or out of date, the security server 140 can initiate the repair or recovery of the package.

Further, some packages of the endpoint 150 can be stored in another device that does not have the security features of the memory device 130. The execution of the core package in the host system 120 can generate the current hash values of the packages as health indicators of the packages. The health indicators can be provided as part of the data 127 embedded in the identity data 113 of the endpoint 150 to allow the security server 140 to monitor the integrity of the packages.

In general, the identity data 113 can include data indicative of the health of the packages in the endpoint 150. As part of the operations to validate 373 the identity data 113 of the endpoint 150, the security server 140 can determine whether any of the packages is to be repaired and/or updated. The repair or update can be performed before the security server 140 confirming the authenticity of the endpoint 150.

Further, in response to validating 373 the identity data 113 of the endpoint 150 for accessing services of client servers (e.g., 141, . . . , 143), the security server 140 can be configured to track and/or monitor the activities of the endpoint 150 in accessing services to implement further security operations.

For example, an owner or user of the endpoint 150 can request the security server 140 to track the activities of the endpoint 150. Aspects of the activities of the endpoint 150 can be presented by the endpoint 150 and/or the client servers (e.g., 141, . . . , 143) in the identity data 113 and/or in the requests 173 for the validation of the identity data 113.

For example, information about the tracked activities can include location information of the endpoint 150 and/or types of services requested by the endpoint 150 via submitting the identity data 113.

For example, to generate the identity data 113 for a service from the client server 141, the endpoint 150 can include in the message 131 of the identity data 113 not only the unique identification 111 of the endpoint 150, but also the context and/or the aspects of the service, such as the identification of the client server 141, a location of the endpoint 150, a date and time of the request, a category/type of the service, a parameter of the service, etc.

For example, when the endpoint 150 sends a request 171 to a client server 141 for a service, the client server 141 can provide in the request to the security server 140 not only the identity data 113 of the endpoint 150 but also information about the request 171 for the service of the client server 141.

For example, in response to a request 171 from the endpoint 150, the client server 141 can estimate a location of the endpoint 150 based on a wireless communication connection to one or more access points connected to the client server 141 and provide the location to the security server 140 in connection with the request 173 for the authentication of the identity data 113.

Optionally, the owner or user of the endpoint 150 can visit a portal of the security server 140 to view the tracked activities. For example, based on the tracked activities, the owner or user may determine whether the endpoint 150 is stolen or lost in view of one or more recent locations of the endpoint 150.

Optionally, a parent can use the portal of the security server 140 to set parental control preferences to restrict activities of the endpoint 150; and the security server 140 can implement the restriction preferences in connection with authenticating the identity of the endpoint 150.

Figure 18:
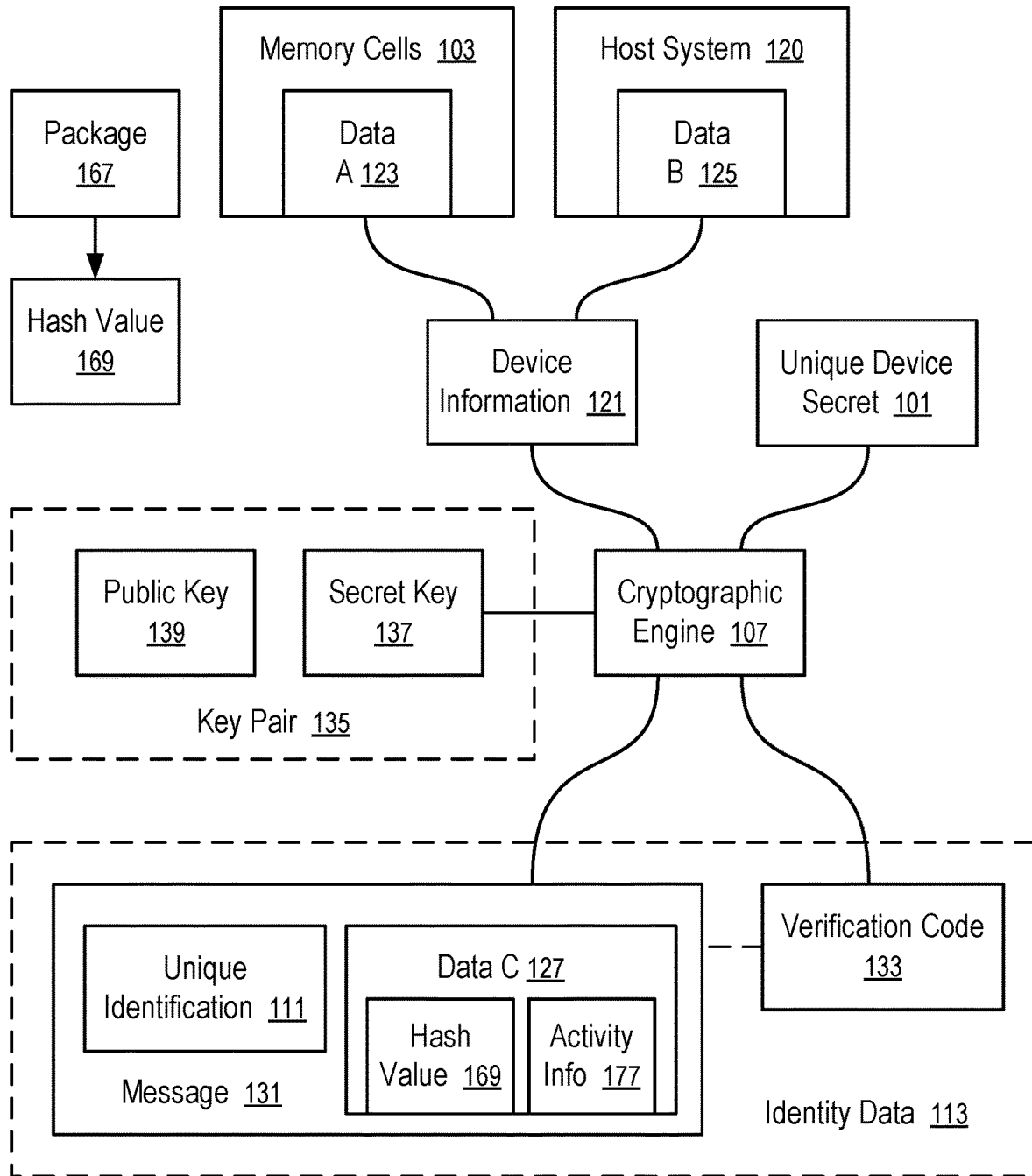
FIG. 18 shows illustrates the generation of identity data to facilitate the monitoring of the integrity and/or activities of an endpoint according to one embodiment.

FIG. 18 shows illustrates the generation of identity data to facilitate the monitoring of the integrity and/or activities of an endpoint according to one embodiment.

For example, the technique of FIG. 18 can be used in a computing system of FIG. 1 and/or FIG. 6 with security services and features discussed with FIGS. 1 to 5. The technique of FIG. 18 can be used in combination with the techniques of FIGS. 9 to 17.

In FIG. 18, the endpoint 150 stores a package 167 that has a hash value 169. The package 167 can be stored in the memory device 130 having security features discussed above, or stored in another memory device of the endpoint 150 that may or may not have security features of the memory device 130. When the package 167 is stored in the memory device 130, the cryptographic engine 107 of the memory device 130 can compute the hash value 169 of the package 167 without relying upon the processing device 118 of the host system 120 in the endpoint 150. When the package 167 is stored outside of the memory device 130, the hash value 169 can be obtained by the processing device 118 of the host system 120 executing a routine that is stored in the memory device 130 and that has been verified that it has not been changed (e.g., as in FIG. 4).

In general, the package 167 can include instructions and/or data, such as resources that are the same for a set of endpoints (e.g., 150), configuration parameters that can vary from one endpoint (e.g., 150) to another endpoint.

The hash value 169 of the package 167 is indicative of the health of the package 167.

In FIG. 18, the secret key 137 used to generate the verification code 133 of the identity data 113 is independent from the hash value 169 of the package 167. To facility the monitoring of the integrity of the package 167 by the security server 140, the hash value 169 is provided as part of the message 131 in the identity data 113.

After the security server 140 determines that the identity data 113 is valid, the security server 140 can extract the hash value 169 provided in the identity data 113 to determine whether the package 167 in the endpoint 150 has been changed and/or whether the package 167 is out of date.

For example, a healthy and up to date copy of the package 167 can be stored in a server (e.g., security server 140, firmware store 170, or another server) to facilitate the repair or recovery of the package 167 in the endpoint 150. If the hash value 169 extracted from the identity data 113 is different from the hash value of the healthy and up to date copy, the security server 140 can initiate an update in a way similar to the update 377 of firmware 363 of the endpoint 150 as discussed in connection with FIGS. 14 to 17.

The package 167 can be individualized for the endpoint 150. For example, when the package 167 includes configuration parameters specific to the endpoint 150 in a platform 361 but not applicable to other endpoints in the platform 361, a healthy copy of the package 167 can be uploaded to the server (e.g., security server 140, firmware store 170, or another server) upon successful configuring of the package 167 in the endpoint 150.

In some implementations, the memory device 130 and/or the endpoint 150 can be configured to store the hash value of the healthy, individualized copy of the package 167. For example, the healthy hash value can be stored as part of the device information 121 used to create the secret key 137. The message 131 in the identity data 113 can include an indication of whether the current package 167 is healthy, without the current hash value 169 of the package 167.

For improved security and/or privacy protection, the healthy copy of the individualized package 167 can be uploaded and stored in the server in an encrypted form using a cryptographic key of the memory device 130. To re-install the package 167 using the healthy copy the memory device 130 decrypts the encrypted version using a corresponding secret cryptographic key of the memory device 130.

For example, upon successful configuring the individualized package 167 in the endpoint 150, the endpoint 150 and/or the memory device 130 can compute the hash value of the healthy copy of the individualized package 167 and use the public key 139 to encrypt the individualized package 167. The endpoint 150 can submit the hash value and the encrypted package 167 for storing in the server to facilitate monitoring and/or recovery. During the recovery, the secret key 137 in the key pair 135 is to be used to decrypt the encrypted package. Optionally, the cryptographic engine 107 can generate a separate key pair to secure individualized package 167.

Alternatively, a secret key can be used with symmetric cryptography to protect the individualized package 167. For example, a session key 263 generated during the validation of the identity data 113 of the endpoint 150 at the time of the successful configuring of the individualized package 167 in the endpoint 150 can be used to encrypt the individualized package 167 for transmission to and/or storing in the server (e.g., security server 140, firmware store 170, or another server).

In FIG. 18, the identity data 113 includes not only the current hash value 169 of the package 167, but also activity information 177 that identifies some aspects of the context in which the identity data 113 is used. For example, the activity information 177 can be generated by the host system 120 executing or running a package (e.g., 167 or another package, such as firmware, application, routine).

For example, the activity information 177 can include the current location of the endpoint 150 where the identity data 113 is generated.

For example, the activity information 177 can include the date and time of the generation of the identity data 113.

For example, the activity information 177 can include an identification of the client server 141 to which the identity data 113 is submitted to request 171 for a service.

For example, the activity information 177 can include one or more attributes of the requested service, such as a category of a service, an identification of another party involved in the service, an amount or quantity involved in the service, etc.

For example, when the identity data 113 is submitted for communications connection, the attributes can include the identification of connection type, the designation of the connection, etc.

For example, when the identity data 113 is submitted to make a payment, the attributes can include the identification of a category of purchase, a payee, a payment amount, etc.

The activity information 177 can be used by the security server 140 to detect fraudulent activities, unauthorized uses of the endpoint, and enforce activity restrictions (e.g., as specified in parental control preferences), etc.

For improved security and/or privacy protection, the activity information 177 can be included in the message 131 in an encrypted form. For example, the session key 263 associated with the validation of the identity data 113 can be used to generate the cipher text of the activity information 177; and the security server 140 can recover the activity information 177 from the cipher text using the session key 263 after successful validation of the verification code 133 of the identity data 113.

Figure 19:
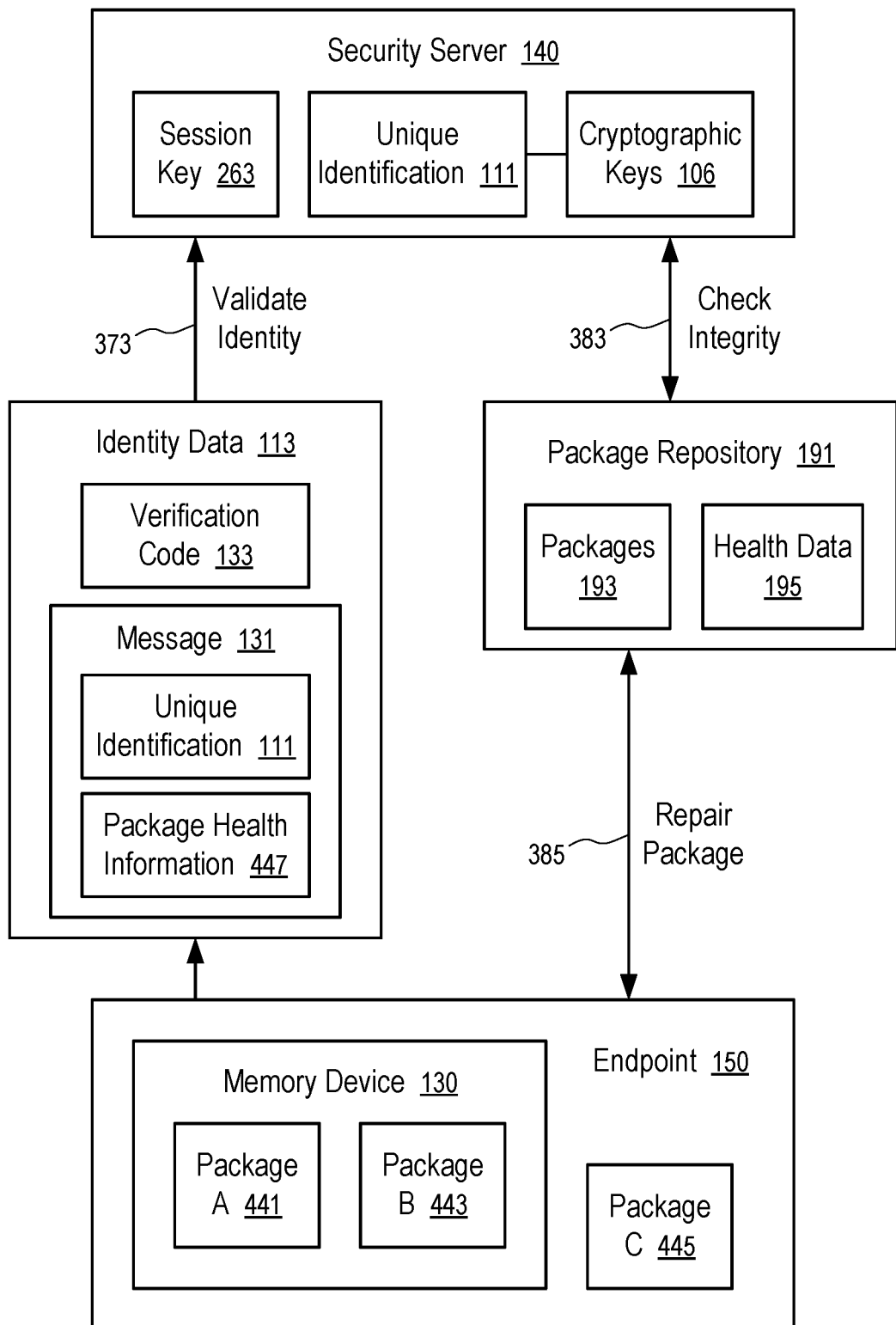
FIG. 19 illustrates a technique to maintain integrity of packages stored in an endpoint according to one embodiment.

FIG. 19 illustrates a technique to maintain integrity of packages stored in an endpoint according to one embodiment.

In FIG. 19, the endpoint 150 stores a plurality of packages 441, 443, . . . , 445. Some of the packages are stored in the memory device 130 having the security features. Some of the packages can be stored outside of the memory device 130.

A core package 441 stored in the memory device 130 can be executed in the processing device 118 of the host system 120 that is connected to the memory device 130 in the endpoint 150. The package 441 controls the operations of the endpoint 150 in submit the identity data 113 of the endpoint 150 to the security server 140 and for communicating with a package repository 191 to repair and/or update packages 441, 443, . . . , 445. For example, the package repository 191 can include the firmware store 170 FIGS. 14 and 15.

The security features of the memory device 130 ensure that the endpoint 150 runs a valid version of the package 441 to avoid tampering and/or corruption in operations to validate 373 the identity of the endpoint 150 and to repair 385 a package.

For example, the memory device 130 can store a backup version of the core package 441 in a secure section of the memory device 130. If the package 441 is found to have changed, the memory device 130 can replace the changed version of the package 441 with the backup version to at least secure the operations to validate 373 the identity of the endpoint 150 and to repair 385 and/or update 377 the packages.

After the endpoint 150 generates the identity data 113, the endpoint 150 executing the package 441 communicates the identity data 113 to the security server 140 for validation 373. For example, the identity data 113 can be generated using the technique of FIG. 18.

The identity data 113 can include package health information 447, such as current hash values of packages 441, 443, . . . , 445, and/or indication of whether any of the packages 443, . . . , 445 is corrupted based on comparing the current hash values and stored hash values of health versions of the respective packages.

Optionally, part of the message 131 can be provided in cipher text generated using the session key 263. For example, the encrypted part of the message can include package health information 447 and/or activity information 177. The session key 263 can be generated for sharing between the memory device 130 and the security server in connection with the validation 373 of the identity of the endpoint 150, in a way as discussed with FIG. 9.

In general, the identity data 113 can be transmitted from the endpoint 150 to the security server 140 directly via a communication connection, or indirectly via an intermediate server, such as a client server 141 as in FIG. 5, 9, or 10, a firmware store 170 in FIG. 14 or 15, a service store 190 in FIG. 15, or the package repository 191 of FIG. 19.

After the validation 373 of the identity data 113, the security server 140 can communicate with the package repository 191 to check 383 the integrity of the packages 441, 443, . . . , 445 based on the package health information 447 provided in the identity data 113.

For example, the package 441 may be valid in the endpoint 150. However, since a new version of the package 441 is released in the package repository 191, the package 441 may be out of date. Thus, updating the package 441 can improve the security of the operations of the endpoint 150 and the integrity of the system.

For example, the package 443 or 445 may have changed in the endpoint 150 and thus become corrupted. The health data 195 of the corresponding packages 193 in the repository 191 can be compared with the package health information 447 provided in the identity data 113 to detect the change.

If a package (e.g., 441, 443, . . . , 445) is found to be out of date or corrupted, the security server 140 can instruct the endpoint 150 and/or the package repository 191 to repair 385 or update 377 of the package.

The operation to repair 385 or update 377 of a package can include the security server 140 generating a verification code 153 for a command 155 to write data into the memory device 130. When a package includes sensitive information, such as configuration parameters customized for the endpoint 150, the replacement package can be provided to the memory device 130 in cipher text generated using the session key 263, or another secret key.

After the repair 385 or update 377, the endpoint 150 can submit the update identity data 113. When the security server 140 determines that the identity data 113 is valid and the package health information 447 in the identity data 113 indicates that the packages 441, 443, . . . , 445 in the endpoint 150 are healthy and up to date, the security server 140 can certify the authenticity of the endpoint 150.

Figure 20:
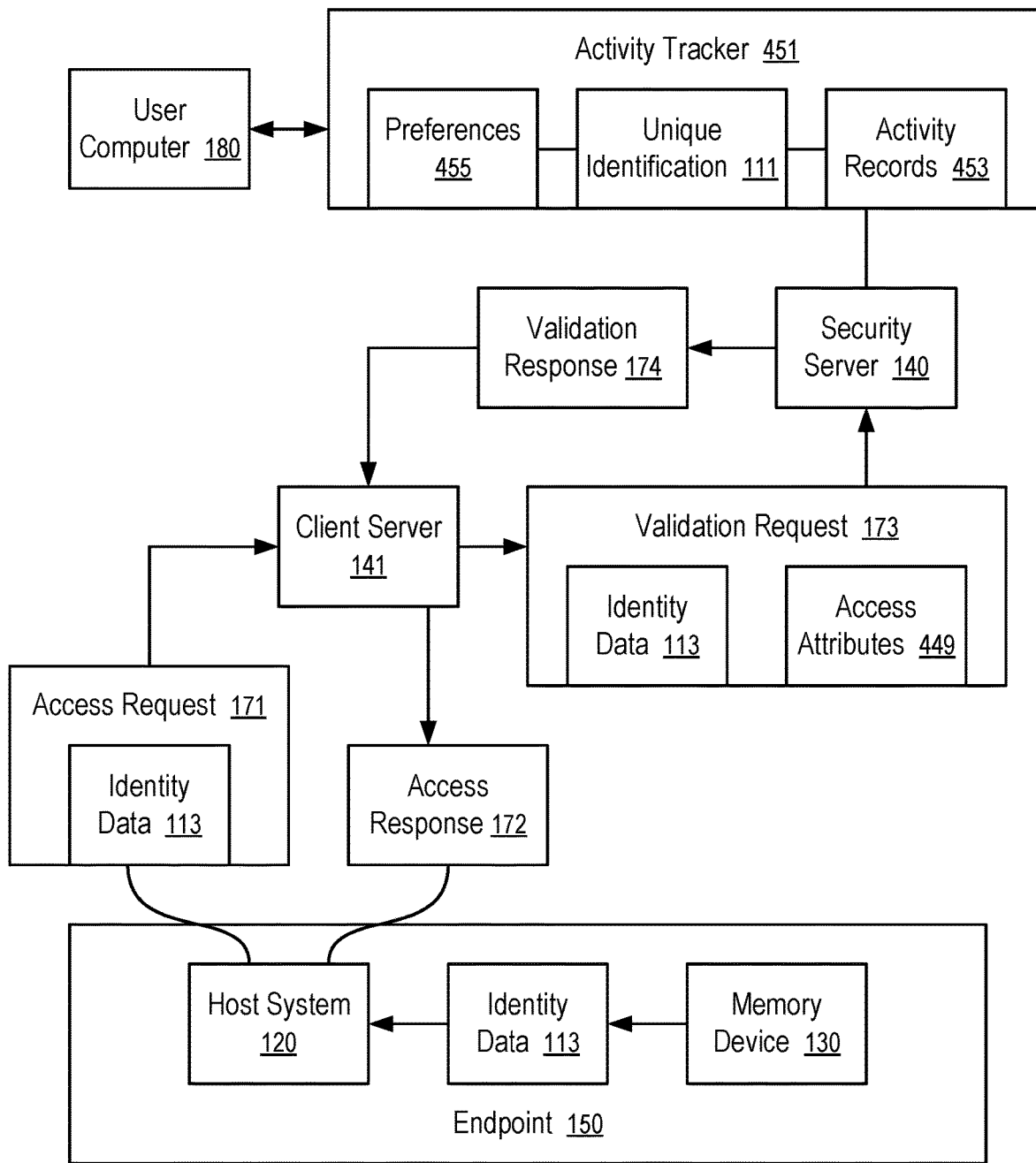
FIG. 20 shows a system implementing security operations based on tracking activities of an endpoint according to one embodiment.

FIG. 20 shows a system implementing security operations based on tracking activities of an endpoint according to one embodiment.

For example, the security operations of FIG. 20 can be implemented in combination with the techniques of FIGS. 9, 10, 14, 15, and/or 19, using security features of memory devices discussed in connection with FIGS. 1 to 5, and in combination with the systems of FIGS. 1 and/or 6.

In FIG. 20, a user computer 180 can be used to visit an activity tracker 451 to set up preferences 455 and/or review tracked activity records 453 of the endpoint 150 having the unique identification 111.

As in FIGS. 14 and 15, the user computer 180 is typically different and separate from the endpoint 150. In some instances, the endpoint 150 can include a user interface that allows its use as the computer 180 to set up preferences 455 and/or review activity records 453.

The activity tracker 451 is coupled with a security server 140 to store activity records 453 about the activities of the endpoint 150 in which the identity data 113 of the endpoint 150 is validated by the security server 140.

The preferences 455 can include security settings for the activities of the endpoint 150. For example, the security settings can be used to implement parental control, to detect fraudulent uses of the endpoint 150, to track the location of the endpoint 150, etc.

For example, the references 455 can identify a geographical region for the endpoint 150. When the endpoint 150 sends identity data 113 from a location that is outside of the geographical region, the activity tracker 451 can generate a security alert to a registered owner or user of the endpoint 150.

For example, the security alert can be transmitted to a mobile device of the owner or user, an email address or a phone number identified in the preferences, and/or an application running in the user computer 180, a personal media player, a mobile phone, a smart phone, etc.

For example, the preferences 455 can include a user selected option associated with a predetermined condition specified in the preferences 455. When an activity associated with the submission of the identity data 113 meets the condition, the selected option causes the security server 140 and/or the client server 141 to generate a rejection in an access response 172 for the corresponding access request 171. Alternatively, or in combination, the option can trigger a security alert to a contact registered in the preferences 455.

The endpoint 150 can transmit the access request 171 to the client server 141 to request a service. For example, the service can provide the endpoint 150 with a cellular communications connection, an Internet connection, a connection to the user computer 180, an online storage facility, an online computing resource, etc. For example, the service can include the processing of a payment, a transaction, a message, etc.

The identity data 113 provided in the access request 171 can include activity information 177, as illustrated in FIG. 18. Alternatively, or in combination, the client server 141 can provide similar or separate activity information in the validation request 173 transmitted to the security server 140. For example, the client server 141 can specify access attributes 449 in the validation request 173. The access attributes 449 identify certain aspects of the current activity of the endpoint 150 for which the identity of the endpoint 150 is to be authenticated by the security server 140. The client server 141 transmits the validation request 173 to the security server 140, which validates the identity data 113 to determine authenticity of the identity of the endpoint 150.

After validating 373 the identity data 113 provided in the validation request 173, the security server 140 can generate an activity record 453 for the activity tracker 451. The activity record 453 can include the activity information 177 extracted from the identity data 113 and/or the access attributes 449 of the current activity of the endpoint 150 extracted from the validation request 173.

Based on the activity record 453, the activity tracker 451 determines whether the current activity satisfies any of the conditions specified in the preferences 455. If a condition in the preferences 455 is satisfied, the activity tracker 451 can perform a security operation to implement an option selected for the condition.

For example, the security operation can include a notification to a register owner or user of the endpoint 150.

For example, the security operation can include instructing the security server 140 to provide a validation response 174 that indicates a security restriction, a security concern, an unauthorized use of the endpoint 150, etc.

Optionally, the activity tracker 451 can identify a pattern of activities of the endpoint 150 from records 453 of past activities.

For example, the pattern can include a geographic area or region of the endpoint 150 in which the endpoint 150 has operated in the past. For example, the pattern can include a time period in a day or a week in which the endpoint 150 has no activities in the past. For example, the pattern can include a range of an access attribute 449 of past activities of the endpoint 150.

When the current activity deviates from the pattern, the activity tracker 451 can generate a notification and optionally cause the security server 140 and/or the client server 141 to reject the access request 171.

Optionally, the security server 140 can check the activity information 177 provided in the identity data 113 to detect security risks.

For example, the date and time and/or the location specified in the activity information 177 can be compared to the corresponding information in the access attributes 449 to detect mismatches. A mismatch can be an indication of the use of stolen identity data 113, or the tampering of the endpoint 150, or insecure operations.

Figure 21:
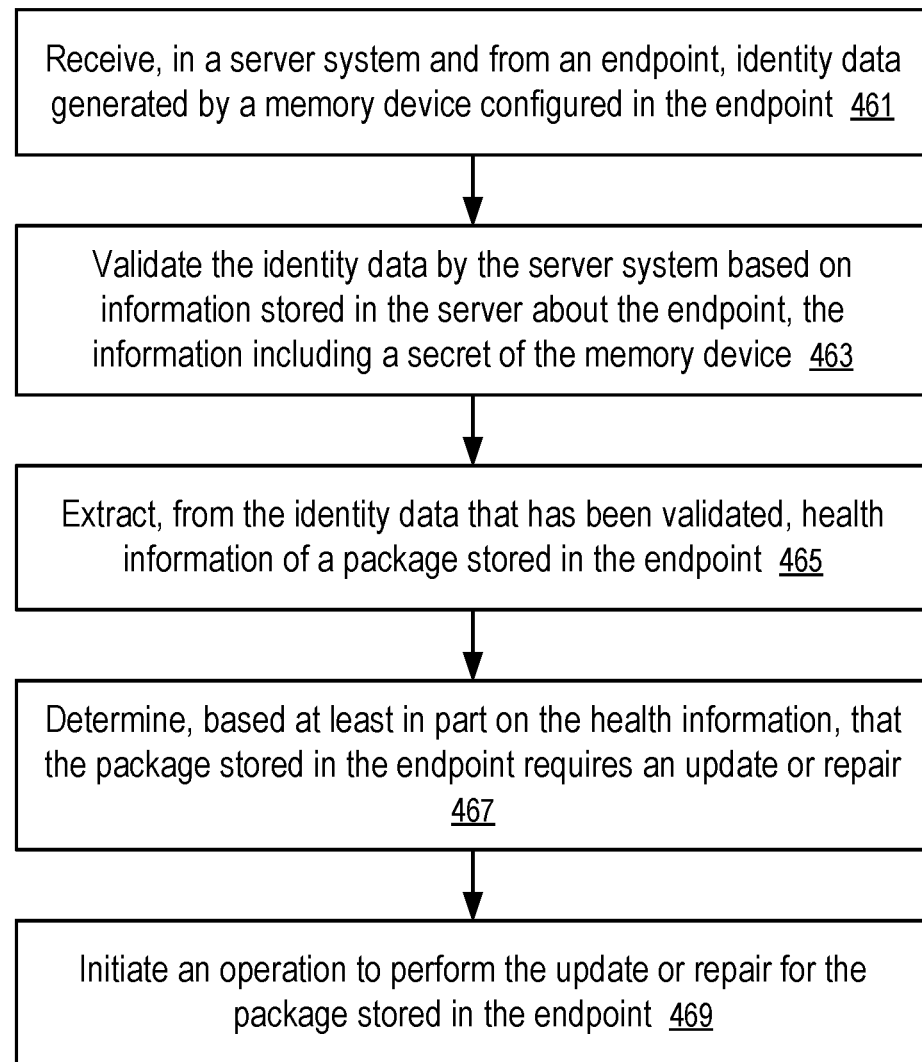
FIG. 21 shows a method to update or repair a package stored in an endpoint according to one embodiment.

FIG. 21 shows a method to update or repair a package stored in an endpoint according to one embodiment. For example, the method of FIG. 21 can be implemented using the techniques of FIGS. 18 and 19.

At block 461, a server system receives, from an endpoint 150, identity data 113 generated by a memory device 130 configured in the endpoint 150.

For example, the server system can include a security server 140 that stores secrets of memory devices (e.g., 130) and/or other servers, such as a package repository 191, a firmware store 170, and/or another server.

At block 463, the security server 140 validates the identity data based on information stored in the security server 140 about the endpoint 150, including a secret of the memory device 130.

For example, the operations in block 463 can be performed in a way similar to the operations performed in block 323, block 343, block 403 and/or block 423.

At block 465, the security server 140 extracts, from the identity data 113 that has been validated, health information 447 of a package (e.g., 167, 441, 443, . . . , 445) stored in the endpoint 150.

For example, the health information 447 can include a current hash value 169 of the package 167 as stored in the endpoint 150. The security server 140 can compare the current hash value 169, extracted from the identity data 113, with a hash value of a healthy, up to date version of the package 167 stored in the server system (e.g., the repository 191, the firmware store 170).

For example, the receiving of the identity data in block 461 can be the result of the endpoint 150 executing the package 167 as stored in the endpoint 150. The package 167 can include at least a portion of firmware 363 or an operating system of the endpoint 150. The health information 447 can be used to determine whether the package 167 is out of date.

In another example, the receiving of the identity data in block 461 can be the result of the endpoint 150 executing a first package 441 as stored in the endpoint 150. The first package 441 can include at least a portion of firmware 363 or an operating system of the endpoint 150. The health information 447 can be used to determine whether a second package (e.g., 443 or 445) is out of date, corrupted, or changed.

When the second package (e.g., 443 or 445) includes data customized for the endpoint 150. The server system can obtain a copy of the second package (e.g., 443 or 445) at the time of successful configuring the second package (e.g., 443 or 445) in the endpoint 150. For example, the second package (e.g., 443 or 445) can include one or more configuration parameters of the endpoint 150. In response to successful configuring the second package (e.g., 443 or 445), the server system can receive a healthy version of the second package (e.g., 443 or 445) from the endpoint 150. Subsequently, if the health information 447 extracted at block 465 indicates a need for a repair of the second package (e.g., 443 or 445), the healthy version stored in the repository 191 can be used.

In some implementations, the extracting of the health information 447 from the identity data 113 includes decrypting a portion of a message 131 provided in the identity data 113 (e.g., using a session key 263).

The identity data 113 includes a first verification code 133. The security server 140 validates the identity data 113 by determining whether the first verification code 133 is generated from the message 131 and the secret of the memory device 130. For example, the secret can be the Unique Device Secret 101 of the memory device 130 and/or the secret key 137. The secret of the memory device 130 is not transmitted outside of the memory device 130 after the memory device 130 is assembled into the endpoint 150.

At block 467, based at least in part on the health information 447, the security server 140 determines that the package stored in the endpoint 150 requires an update or repair.

At block 469, the security server 140 initiates an operation to perform the update or repair for the package stored in the endpoint 150.

For example, to replace or repair a package stored in the memory device 130, the security server 140 generates a second verification code 153 for a command 155 using a cryptographic key representative of a privilege to have the command 155 executed in the memory device 130. For example, when executed in the memory device 130, the command 155 causes replacement of the package (e.g., 441 or 443) in the memory device 130.

In some implementations, to repair a package 445 stored outside of the memory device 130, a replacement of the package 445 is stored into the memory device 130 initially. After the memory device verifies the integrity of the replacement, the package 445 can be replaced via the execution of instructions in a package 441 loaded from the memory device 130. Optionally, a second verification code 153 can be generated for writing the replacement into the memory device 130 and/or to allow the performance of repair or replacement of the package 445.

Figure 22:
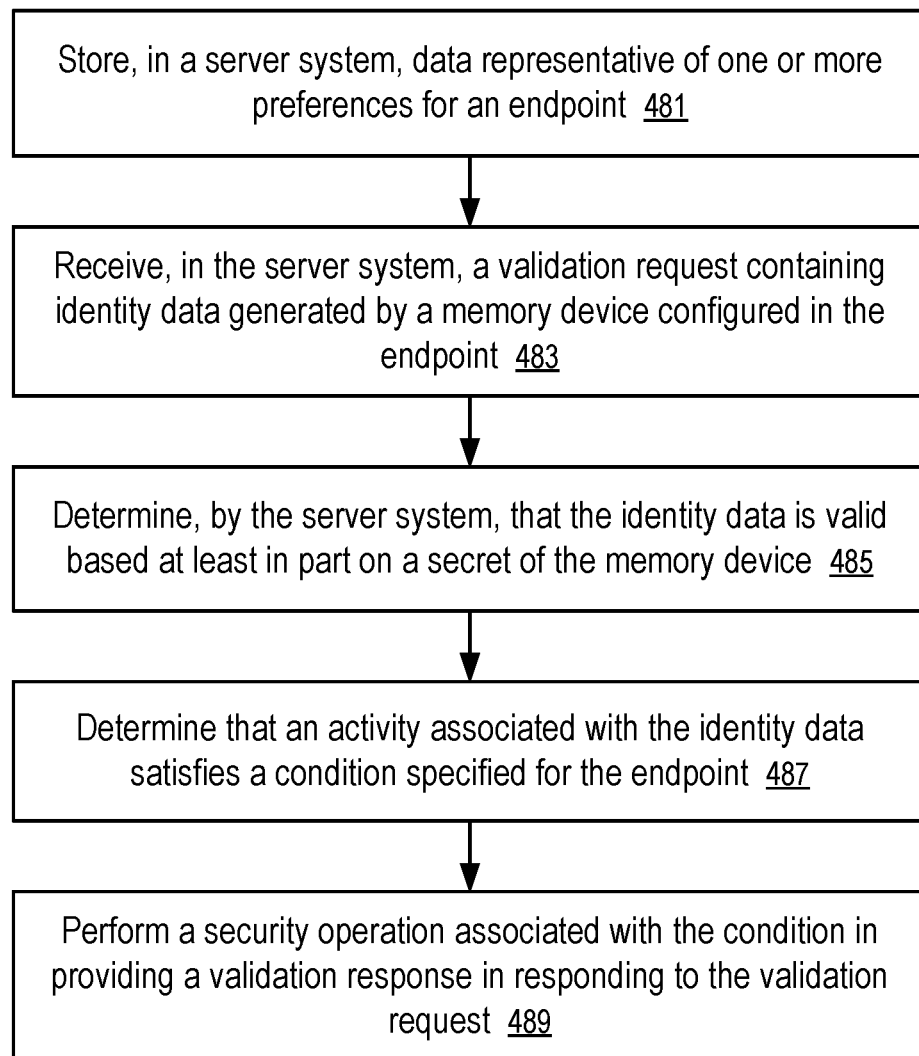
FIG. 22 shows a method to perform a security operation based on one or more activities of an endpoint according to one embodiment.

FIG. 22 shows a method to perform a security operation based on one or more activities of an endpoint according to one embodiment. For example, the method of FIG. 22 can be implemented using the techniques of FIGS. 18 and 20.

At block 481, a server system stores data representative of one or more preferences 455 for an endpoint 150.

For example, the server system can include a security server 140 that stores secrets of memory devices (e.g., 130) and/or other servers, such as an activity tracker 451, a package repository 191, a firmware store 170, and/or another server.

At block 483, the server system receives a validation request 173 containing identity data 113 generated by a memory device 130 configured in the endpoint 150.

At block 485, the server system determines that the identity data 113 is valid based at least in part on a secret of the memory device.

For example, the operations in block 485 can be performed in a way similar to the operations performed in block 323, block 343, block 403, block 423, and/or block 463.

At block 487, the server system determines that an activity associated with the identity data 113 satisfies a condition specified for the endpoint 150.

For example, the condition can be specified in the preferences 455 for the endpoint 150.

At block 489, the server system performs a security operation associated with the condition in providing a validation response 174 in responding to the validation request 173.

For example, the security operation can include transmitting an alert or notification to a contact registered in the one or more references 455.

For example, the security operation can include identifying a security risk or restriction in the validation response 174. Optionally, the security server 140 can provide the validation response 174 that does not confirm the authenticity of the endpoint 150 even when the identity data 113 has a valid verification code 133, in view of the secret key 137 of the memory device 130 and the message 131 provided in the identity data 113. When the activity associated with the identity data 113 satisfies the condition, the validation response 174 can be configured to cause a client server to decline a request 171 for a service for the endpoint 150 as identified by the identity data 113.

The condition can be evaluated for the activity based on activity information 177 embedded by the memory device 130 in the identity data 113 and/or access attributes 449 provided by a client server 141 in the validation request 173.

For example, after the security server 140 determines that the verification code 133 in the identity data 113 is valid, the security server 140 can trust that the activity information 177 embedded in the identity data 113 has not been changed after the memory device 130 generates the verification code 133. Thus, the activity information 177 can be extracted from the identity data 113 for the evaluation of the condition. Optionally, the activity information 177 can be provided in the message in cipher text that is to be decrypted using a session key 263 generated in a way as discussed in FIG. 9, or another secret cryptographic key of the memory device 130.

Alternatively, or in combination, the security server 140 can extract access attributes 449 from the validation request 173. For example, after the client server 141 receives the access request 171 for a service provided by the client server 141, the client server 141 can generate the validation request 173 to the security server 140. The validation request 173 is generated to include the identity data 113 from the access request 171. Further, the client server 141 can add the access attributes 449 to provide information about the activity of the endpoint 150 in the context of requesting the service of the client server 141.

For example, the condition can include a mismatch in the activity information 177 and the access attributes 449; and the mismatch can trigger a rejection of the access request 171 and/or a rejection of the identity data 113 in the validation response 174, even when the identity data 113 has a valid verification code 133.

In some implementations, the server system communicates with a user computer 180 to receive the data representative of the one or more preferences 455 for the endpoint 150.

Alternatively, or in combination, the server system can infer the preferences 455 from the records 453 of past activities.

For example, an activity tracker 451 of the server system can store a plurality of records 453 of activities of the endpoint 150. Based on the plurality of records 453, the activity tracker 451 can determine a pattern of the activities of the endpoint 150. The pattern can include a geographical area, a time period in a day or week, or a range of an activity attribute, or any combination thereof. A condition to trigger the security operation of block 489 can be satisfied by an activity that deviates from the pattern.

Optionally, the activity tracker 451 can present, based on the records 453, the activities of the endpoint 150 to an owner or authorized user of the endpoint 150. For example, based on a review of the past activities, the owner or authorized user can specify conditions for implementing parental control, access restriction, etc.

The identity of an endpoint 150 authenticated by the security server 140 can be dynamically associated with a subscription account represented by an account identifier to receive services provided by a client server 141 to the account. When the endpoint 150 is not using the services, the association between the identity of the endpoint 150 and the subscription account can be removed to allow another endpoint to use the subscription account. Thus, a group of endpoints (e.g., 150) can be configured to share the subscription account and used the subscription account one at a time.

For example, a group of endpoints can be configured to use the service of a client server 141 for cellular connections. Traditionally, a subscriber identification module (SIM) card is to be used to represent a subscriber/subscription account. The group of endpoints may use the subscription account represented by the SIM card by physically installing the SIM card in one endpoint in the group at a time. To allow another endpoint in the group to use the subscription account, the SIM card is to be physically moved from one endpoint to another endpoint.

A system as discussed above in connection with FIG. 6 allows the use of a virtual subscriber identification module (vSIM) to be attached to an endpoint (e.g., 150) through virtual card registration 237 based on the identity validation or endpoint authentication 239 performed using the security server 140. The system of FIG. 6 can be further configured to disassociate the endpoint (e.g., 150) from the card profile 219 representative of the subscription account so that the virtual card registration 237 can be performed for another endpoint to use the subscription account.

For example, a subscribed service (e.g., cellular connection) provided to a subscription account can be shared among a population of endpoints owned by an enterprise (or another entity). The endpoints (e.g., 150) in the population may not need the service of the account at the same time. Thus, it can be advantageous to configure the endpoints in the population to share one or more subscription accounts. When more than one subscription account is configured for sharing by the population of endpoints (e.g., IoT (Internet of Things) devices), a small portion of population can use the services subscribed to the accounts concurrently.

For example, a server system can be configured to track the current usage statuses of the endpoints in the population. When an endpoint communicates with a client server to request for the service, the endpoint can be dynamically bound to a subscription account. When the endpoint is no longer in active use of the service, the subscription account can be freed from the endpoint. When the number of endpoints that are active in using the services provided to the subscription accounts is no larger than the number of subscription accounts available sharing, the active endpoints can use the services of the accounts concurrently. When the subscription accounts are current bound to and actively used by a portion of the population, a request for service from a further endpoint may be rejected until one of the subscription accounts is freed from active use and thus becomes available for sharing.

For example, a virtual subscriber identification module (vSIM) can be bound to an IoT (Internet of Things) device of an enterprise in response to the IoT device is requesting for a cellular connection. When the cellular connection has been idling for a period of time that is longer than a threshold, the cellular connection can be disconnected; and the virtual subscriber identification module (vSIM) can be released from the IoT device and made available for binding with another IoT device of the enterprise. Thus, the enterprise may subscribe to a reduced number of vSIMs; and when the number of vSIMs are all in use, the request for a cellular connection from a further device can be placed on hold until one of the connections is disconnected and a vSIM is freed up for assigning to the device on hold.

Optionally, the security server 140 can be configured to throttle and/or schedule the forwarding of the connection requests to manage the use of the limited number of subscribed cellular connections.

Figure 23:
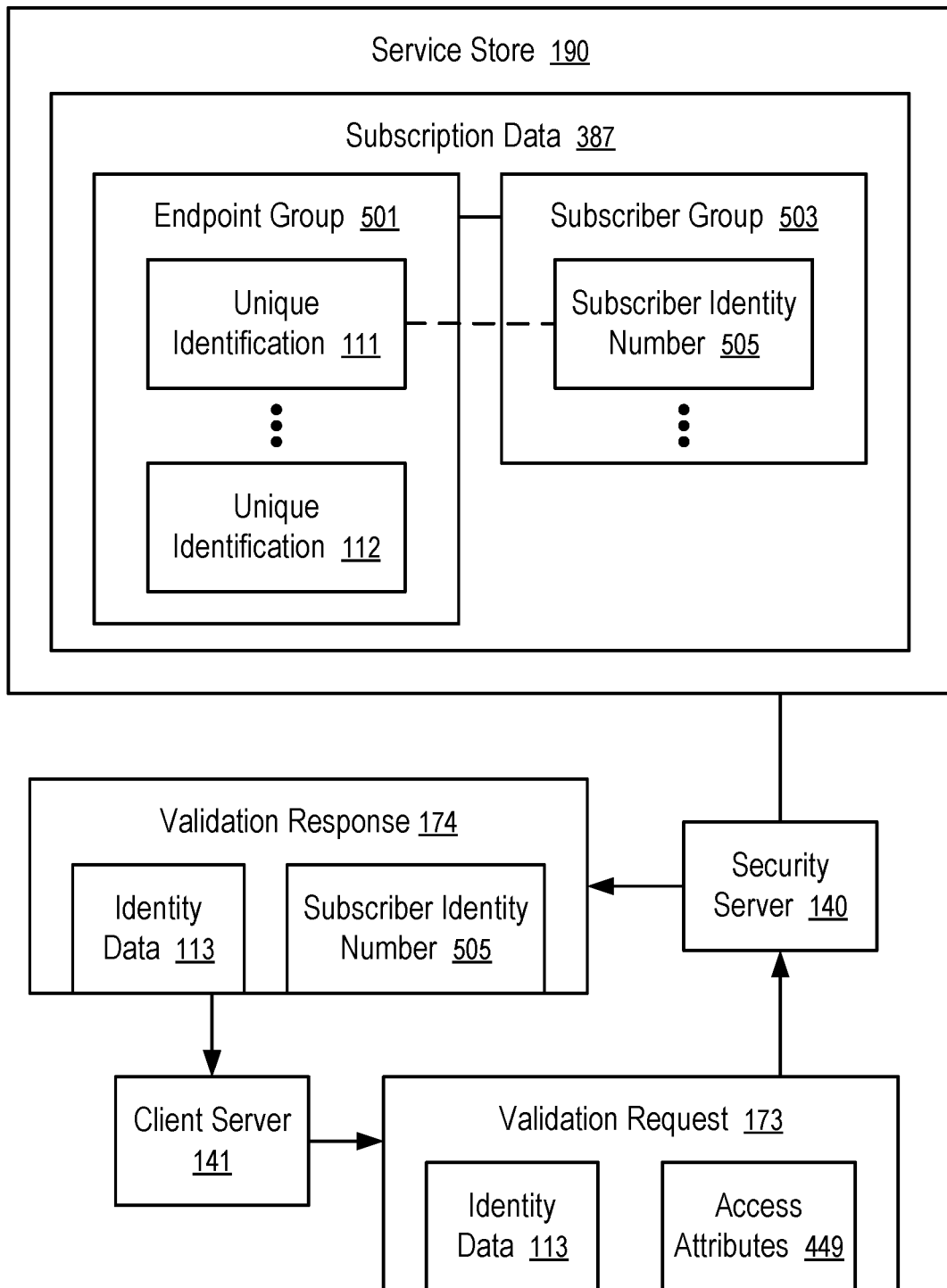
FIGS. 23 and 24 illustrated systems configured to implement subscription sharing among a group of endpoints according to one embodiment.
Figure 24:
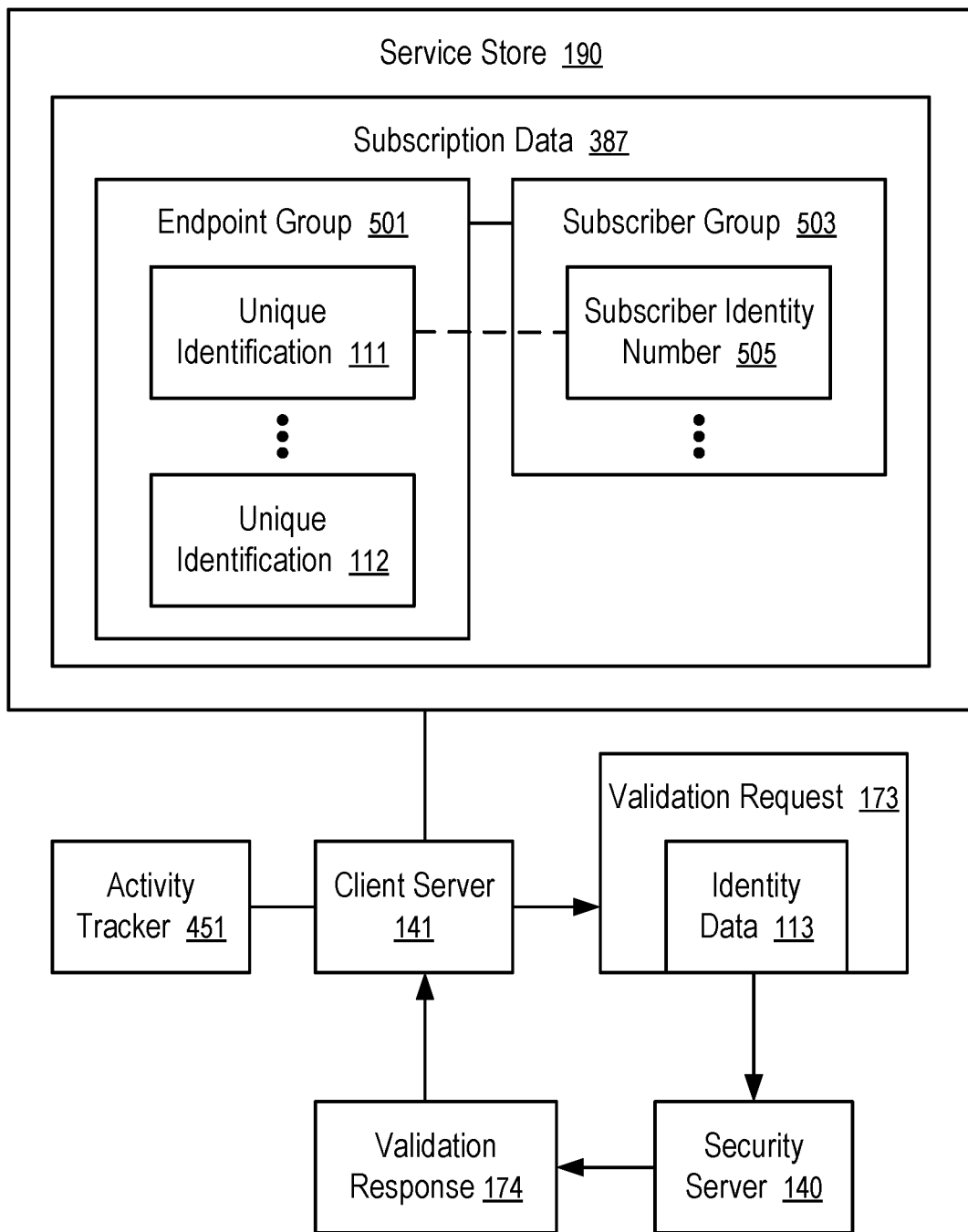

FIGS. 23 and 24 illustrated systems configured to implement subscription sharing among a group of endpoints according to one embodiment.

In FIGS. 23 and 24, a service store 190 has subscription data 387 that associates an endpoint group 501 with a subscriber group 503.

The endpoint group 501 has a plurality of unique identifications 111, . . . , 112. Each of the unique identifications (e.g., 111) represents a memory device (e.g., 130) installed in a respective endpoint (e.g., 150) in a group of endpoints.

The subscriber group 503 has one or more subscriber identity numbers (e.g., 505). Each subscriber identity number (e.g., 505) in the subscriber group 503 represents a subscriber of the service of a client server 141. For example, each subscriber identity number (e.g., 505) can be used to identify a unique subscription account that is to be used by one subscriber at a time.

For example, the subscriber identity number 505 can be used to represent a unique subscriber in a way a subscriber identification module (SIM) represents a subscriber in a cellular communications network.

When the SIM card is inserted in a cellular phone, communications to the subscriber are connected to the cellular phone; and the cellular phone is provided with the services in the account of the subscriber. When the SIM card is inserted in an alternative cellular phone, communications to the subscriber are connected to the alternative cellular phone that currently has the SIM card.

Similarly, when the subscriber identity numbers 505 is associated with the unique identification 111, the services offered to the account of the subscriber represented by the subscriber identity numbers 505 are provided to the endpoint 150 having the unique identification 111. When the subscriber identity numbers 505 is associated with an alternative unique identification 112, the services offered to the account of the subscriber represented by the subscriber identity numbers 505 are provided to an alternative endpoint having the unique identification 112.

In FIG. 23, the security server 140 is configured to dynamically link a subscriber identity number 505 in the subscriber group 503 and a unique identification 111 in the endpoint group 501.

For example, in response to a validation request 173 from the client server 141 having the identity data 113, the security server 140 can determine whether the identity data 113 has a valid verification code 133 for a memory device 130 having the unique identification 111. If the identity data 113 is valid, the security server 140 can determine whether the subscriber group 503 currently has a subscriber identity number 505 that is free to be used by the memory device 130 and/or endpoint 150 having the unique identification 111. If so, the security server 140 can provide a validation response 174 confirming the authenticity of the identity data 113 and its association with the subscriber identity number 505. In response, the client server 141 can provide the endpoint 150 with the services offered to the account identified by the subscriber identity number 505.

If no subscriber identity number 505 in the subscriber group 503 is currently available for use by the endpoint 150, the validation response 174 identifies no subscriber identity number for the identity data 113, which can cause the client server 141 to reject a request from service from the endpoint 150 in some implementations.

The validation request 173 in FIG. 23 can include access attributes 449 that indicate a requested time period for associating the unique identification 111 identified in the identity data 113 with an available subscriber identity number (e.g., 505) for use by the endpoint 150 having the unique identification 111.

In some implementations, the system is configured to associate the unique identification 111 and the subscriber identity number 505 for a predetermined period of time following the validation response 174 that identifies subscriber identity number 505 for the unique identification 111 and/or the identity data 113. After the predetermined period of time, the service store 190 removes the assignment of the subscriber identity number 505 to the unique identification 111, making the subscriber identity number 505 available for use by another endpoint having a different unique identification (e.g., 112) in the endpoint group 501. After the predetermined period of time, the client server 141 does not provide the services offered to the account represented by the subscriber identity number 505 to any of the endpoints (e.g., 150) having the unique identifications 111, . . . , 112 in the endpoint group 501 until receiving another validation response 174 from the security server 140 that associates the subscriber identity number 505 to one of the unique identifications 111, . . . , 112 in the endpoint group 501.

When the endpoints having the unique identifications 111, . . . , 112 compete for the use of the subscriber identity numbers (e.g., 505) in the subscriber group 503, the service store 190 can control the allocation the use of the subscriber identity numbers (e.g., 505) in the subscriber group 503.

For example, the service store 190 can track the endpoints in the group 501 that have rejected access requests for the lack of available subscriber identity numbers 505 and prioritize the subsequent allocations of available subscriber identity number 505 based on tracked priorities.

For example, when the subscriber identity number 505 is available for use, the service store 190 can open a time window in which requests for access from different endpoints can be received; when multiple access requests are received for the group 501, an endpoint having the earliest request that was rejection prior to the time window can be provided with the highest priority to receive the opportunity to use the subscriber identity number 505.

In some implementations, the endpoints having the unique identifications 111, . . . , 112 in the endpoint group 501 can compete for opportunities to use the subscriber identity numbers (e.g., 505) in the subscriber group 503 based on one or more predefined rules. For example, after receiving a rejection to a service request, an endpoint (e.g., 150) can wait for a random time period to make a subsequent request. Through the randomness of the waiting periods following rejections, the opportunities to use the subscriber group 503 for service access can be distributed to endpoints that are in need for services.

In some implementations, an endpoint 150 that is temporarily assigned a subscriber identity number 505 can inform the client server 141 and/or the security server 140 to free the subscriber identity number 505 from the assignment to the endpoint 150. For example, after the endpoint 150 completes communications using a service provided to the subscriber identity number 505, the endpoint 150 can return the subscriber identity number 505 to a pool of subscriber identity numbers in the group 503 that can be assigned to and/or used by another endpoint having a unique identification 112 in the group 501.

In some implementations, the system can track the active activities of the endpoint 150 that uses the subscriber identity number 505. After a period of inactivity, the service store 190 can remove the assignment of the subscriber identity number 505 from the unique identification 111.

FIG. 23 illustrates a configuration where the assignment of a subscriber identity number 505 to a unique identification 111 is controlled by a security server 140 in connection with a validation request 173 and/or a validation response 174. Alternatively, and/or in combination, the client server 141 can be connected to the service store 190 to implement the assignment and/or use the assignment to provide service, as illustrated in FIG. 24.

In FIG. 24, the client server 141 is coupled to a service store 190 and an activity tracker 451. Based on the validation response 174 that indicates the authenticity of the endpoint 150 having the unique identification 111 and the availability of the subscriber identity number 505 for used in the endpoint group 501, the client server 141 can cause the service store 190 to store data indicating the temporary assignment of the subscriber identity number 505 to the unique identification 111.

Subsequently, the client server 141 can use the activity tracker 451 to determine whether to remove the assignment of the subscriber identity number 505 from the unique identification 111.

For example, after an inactive time period of a predetermined length in which the endpoint 150 does not use the services offered to the account represented by the subscriber identity number 505, the client server 141 can cause the service store 190 to update the subscription data 387 and terminate the assignment of the subscriber identity number 505 to the unique identification 111.

For example, after receiving an indication or notification from the endpoint 150, the client server 141 can cause the service store 190 to terminate the assignment of the subscriber identity number 505 to the unique identification 111.

In some implementations, the client server 141 can cause the service store 190 to terminate the assignment of the subscriber identity number 505 to the unique identification 111 after a period of time following the assignment of the subscriber identity number 505 to the unique identification 111. The period of time can be predetermined, or determined from an access request 171 received from the endpoint 150.

Figure 25:
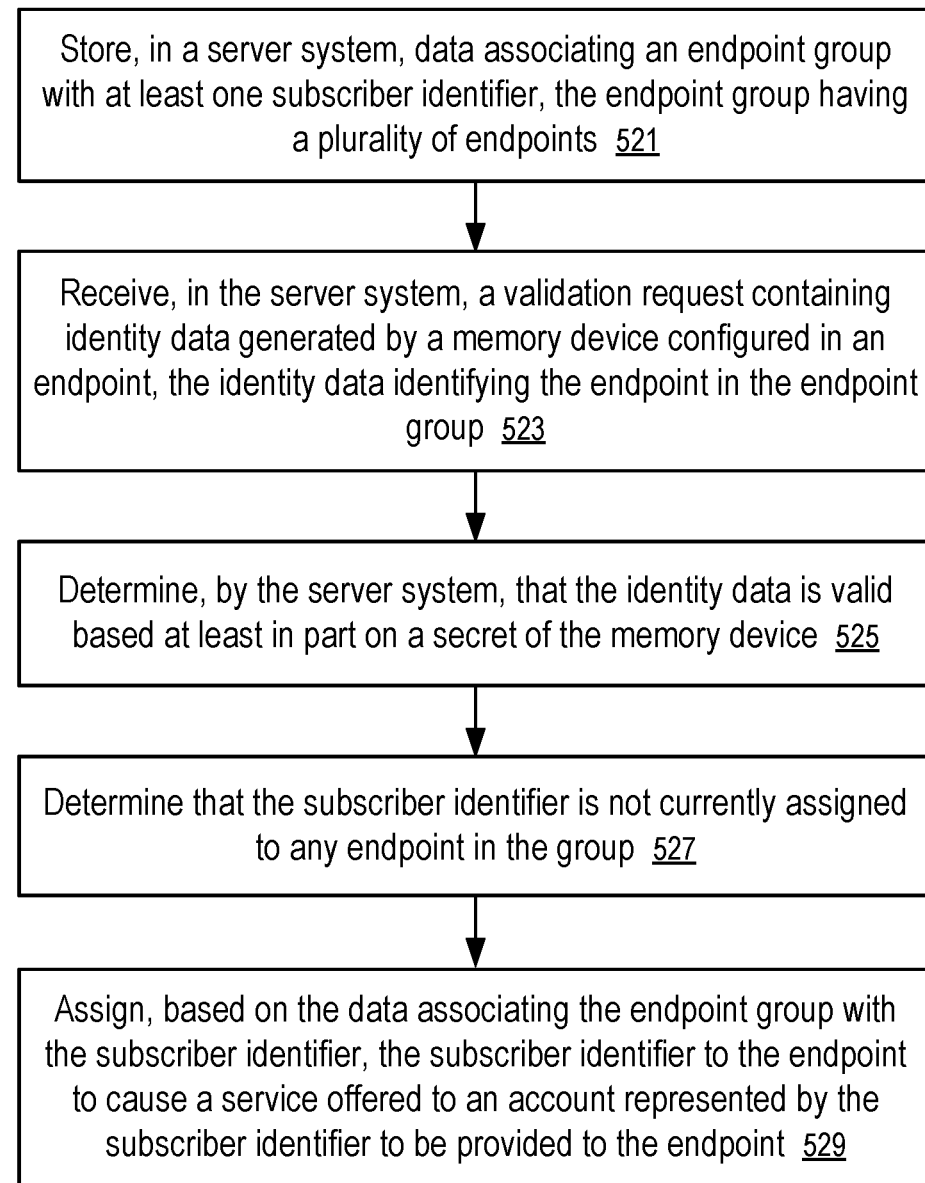
FIG. 25 shows a method to facilitate subscription sharing in a group of endpoints according to one embodiment.

FIG. 25 shows a method to facilitate subscription sharing in a group of endpoints according to one embodiment. For example, the method of FIG. 25 can be implemented using the techniques discussed above in connection with FIGS. 23 and 24 in a system with security features discussed in connection with FIGS. 1 to 19.

At block 521, a server system stores data associating an endpoint group 501 with at least one subscriber identifier (e.g., identity number 505). The endpoint group 501 can have a plurality of endpoints (e.g., 150) identified by unique identifications 111, . . . , 112.

For example, the server system can include a security server 140 that stores secrets of memory devices (e.g., 130) and/or other servers, such as a service store 190, an activity tracker 451, a package repository 191, a firmware store 170, and/or another server. The server system can further include a client server 141 and/or a card server 223 illustrated in FIG. 6.

At block 523, the server system receives a validation request 173 containing identity data 113 generated by a memory device 130 configured in an endpoint 150. The identity data 113 identifies the endpoint 150 using its unique identification 111 that is in the endpoint group 501.

At block 525, in response to the validation request 173, the server system determines, based at least in part on a secret of the memory device 130, that the identity data 113 is valid.

For example, the operations in block 525 can be performed in a way similar to the operations performed in block 323, block 343, block 403, block 423, block 463, and/or block 485.

At block 527, the server system determines that the subscriber identifier (e.g., identity number 505) is not currently assigned to any endpoint in the endpoint group 501.

At block 529, the server system assigns, based on the data associating the endpoint group 501 with the subscriber identifier (e.g., identity number 505), the subscriber identifier to the endpoint 150. The assignment causes a service offered to an account represented by and/or associated with the subscriber identifier (e.g., identity number 505) to be provided to the endpoint.

For example, the subscriber identifier (e.g., identity number 505) represents a unique subscriber of the service provided in a network (e.g., 225) having multiple endpoints (e.g., 150), including the plurality of endpoints in the endpoint group 501 and further endpoints not in the endpoint group 501.

For example, the service network (e.g., 225) can be configured to provide to endpoint the services, such as a cellular communications connection, an Internet connection, a connection to a user computer, an online storage facility, an online computing resource, a payment, a transaction, or a message, or any combination thereof.

For example, assigning the subscriber identifier (e.g., identity number 505) to the endpoint 150 includes configuring the endpoint 150 to have a unique identity that is represented by the subscriber identifier (e.g., identity number 505) in a service network (e.g., 225).

For example, the service network (e.g., 225) can require different endpoints in the network (e.g., 225) to have different identities represented by different subscriber identifiers (e.g., identity number 505). The identity data 113 generated by the memory device 130 includes no subscriber identifier. The identity data 113 and/or unique identification 111 of the memory device 130 and/or the endpoint 150 can be dynamically assigned to or associated with a subscriber identifier (e.g., identity number 505) to configure the endpoint 150 for the service network (e.g., 225).

For example, assigning the subscriber identifier (e.g., identity number 505) to the endpoint 150 includes storing data representing assignment of the subscriber identifier to the endpoint for a period of time.

For example, the server system can remove the data representing the assignment of the subscriber identifier to the endpoint after the period of time to discontinue the endpoint 150 receiving the service in the network as the subscriber. After the data is removed, the endpoint 150 no longer has the identity of the subscriber represented by the subscriber identifier (e.g., identity number 505) in the service network (e.g., 225).

For example, the service system can monitor activities of the endpoint 150 in receiving the service as the subscriber in the service network (e.g., 225); and in response to detecting a period of inactivity of the endpoint 150 in receiving the service as the subscriber in the network (e.g., 225), the server system can remove the data to reconfigure the endpoint 150 to not have the identity of the subscriber represented by the subscriber identifier (e.g., identity number 505) in the service network (e.g., 225).

Alternatively, the freeing of the endpoint 150 from being configured as the subscriber identifier (e.g., identity number 505) in the service network (e.g., 225) can be performed in response to a message or request from the endpoint 150.

Alternatively, the length of the period of time after which the subscriber identifier (e.g., identity number 505) is released from being bound to the endpoint 150 can be a predetermined length starting from a time of the assigning of the subscriber identifier (e.g., identity number 505) to the endpoint 150.

Alternatively, the length of the period of time can be specified in the validation request 173.

For example, the validation request 173 is received from a client server 141 in the service network (e.g., 225). To configure the endpoint 150 to have the identity of a subscriber represented by the subscriber identifier (e.g., identity number 505), the security server 140 can transmit, to the client server 141 and in response to the validation request 173, a validation response 174. The validation response 174 is configured to indicate the validity of the identity data 113 and the association of the identity data 113 with the subscriber identifier (e.g., identity number 505).

In general, an endpoint 150 can be identified using different identifications for different services, in different networks, and/or different contexts. Each identification of the endpoint 150 can be used to represent the endpoint 150 as a member, a subscriber, an account, an authorized device, and/or an entity among many in a group specific to a type of services, connections, communications, etc.

For example, the endpoint 150 can be configured to communicate with different client servers 141, . . . , 143 respectively for their services. The endpoint 150 can be identified using different subscriber identifications with different client servers 141, . . . , 143. Each of the subscriber identifications of the endpoint 150 represents a unique subscriber and/or account that is recognized by a respective client server (e.g., 141, . . . , 143) for their services to their subscriber population.

For example, the endpoint 150 can be configured to communicate with a client server 141 for different types of services. Different identifications of the endpoint 150 can be used to represent the endpoint 150 as a subscriber of a different service type.

For example, the endpoint 150 can be assigned an integrated circuit card identifier 251 to function as a smartcard, a mobile equipment identity number 253 to function as a cellular communication device, a mobile subscriber identity number 255 to function as a subscriber of cellular connectivity services, etc.

The security server 140 can be configured to manage the identities of the endpoint 150 using the security features of the memory device 130 configured in the endpoint 150.

For example, a third party can request the security server 140 to tie a subscribed service in an account to a public identification of the endpoint 150. Since the identification can be known to the public, there is a potential risk of fraudulent use of the public identification. The identity data 113 of the endpoint 150 can be configured to include the public identification. Based on a Unique Device Secret (UDS) 101 of the memory device 130 configured in the endpoint 150, the security server 140 can validate that the identity data 113 received from the endpoint 150 is authentic; and thus, the endpoint 150 has the identity represented by the public identification included in the identity data 113. Through the validation performed by the security server 140, the fraudulent use of the public identification as identity can be detected.

The security server 140 can be configured to manage the secure, dynamic binding of the public identification with the endpoint 150. For example, in response to a request from an authorized party in an application domain, the security server 140 can bind a unique public identification to the endpoint 150 for the application domain. For example, the authorized party can be validated based on tracking the ownership privileges of memory devices configured in endpoints (e.g., 150). Each application domain can have a plurality of public identifications representing separate identities in the application domain. The security server 140 binds a unique public identification to one endpoint at a time.

For example, in response to the request to bind a public identification to an endpoint 150, the security server 140 can verify that the public identification is not currently bound to another endpoint and can generate a command, using a cryptographic key representing an owner privilege to operate the memory device 130, to store the public identification in the memory device 130 as part of the device information 121 for the generation of the identity data 113 of the memory device 130 and/or the endpoint 150.

Alternatively, the security server 140 can store data associating the endpoint 150 with the public identification of the endpoint 150 in an application domain. In response to a validation request 173 in the application domain, the security server 140 validates the identity data 113 provided in the endpoint 150 and looks up the public identification of the endpoint 150 in the application domain. The public identification can be provided in the validation response 174.

The secure, dynamic binding of the public identification with the endpoint 150 can be used to facilitate security operations. For example, when the endpoint 150 is lost/stolen, the owner of the endpoint 150 can request the security server 140 to bind the public identification of the lost/stolen endpoint 150 to a replacement endpoint. Once the security server 140 binds the public identification of the lost/stolen endpoint 150 to the replacement endpoint, the service subscribed to the lost/stolen endpoint 150 is transferred to the replacement endpoint. Optionally, the owner of the lost/stolen endpoint 150 can request the transfer of data from the lost/stolen endpoint 150 to the replacement device; and after the transfer, the owner may request the disabling of the lost/stolen endpoint 150 to minimize the lost/impact of the endpoint 150.

Figure 26:
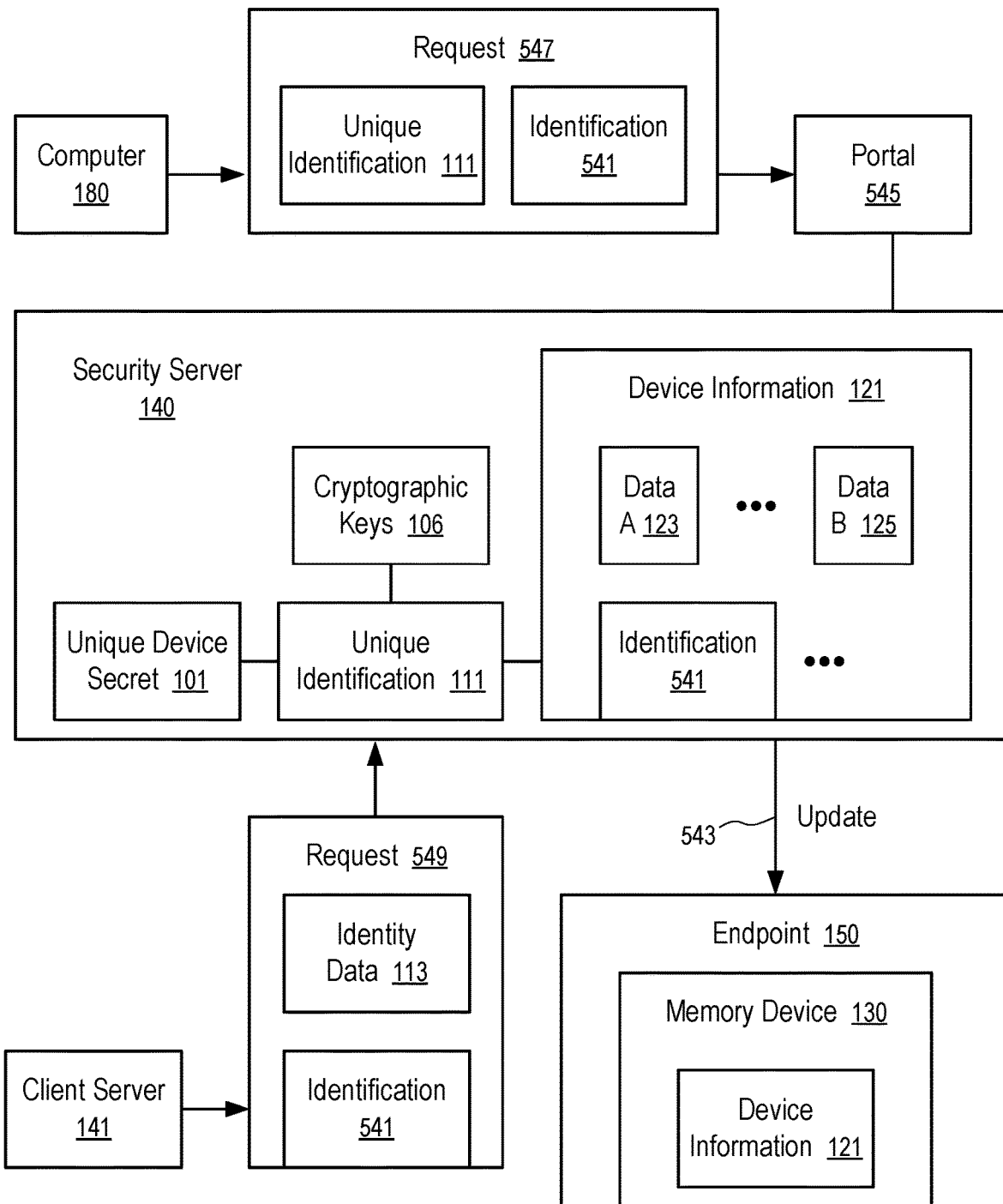
FIG. 26 shows techniques to manage an identification of an endpoint according to one embodiment.

FIG. 26 shows techniques to manage an identification of an endpoint according to one embodiment.

For example, the techniques of FIG. 26 can be used in the system of FIGS. 1 and/or 6, using security features of memory devices discussed in connection with FIGS. 1 to 5 and 9 to 10. For example, the techniques of FIG. 26 can be used with the services of the firmware store of FIGS. 14 and 15, the service store 190 of FIGS. 15, 23 and 24, and/or the activity tracker 451 of FIG. 20.

In FIG. 26, the security server 140 stores a unique identification 111 of a memory device 130 and its unique device secret 101. Further, the security server 140 stores device information 121 that characterizes the hardware, software and/or data configuration of the endpoint 150 in which the memory device 130 is installed. As in FIG. 2, a secret key 137 is based on the unique device secret 101 and the device information 121. The secret key 137 is used by the memory device 130 to generate the verification code 133 of identity data 113; and the security server 140 verifies that the verification code 133 is generated using the secret key 137, which indicates that identity data 113 is generated by the memory device 130 having the unique device secret 101.

In FIG. 26, the security server 140 can tie the unique identification 111 to a public identification 541 of the endpoint 150. For example, after the public identification 541 is assigned to the endpoint 150 in an application domain, the security server 140 can store the public identification 541 as part of the device information 121 associated with the unique identification of the memory device 130 and/or the endpoint 150.

For example, the application domain can be configured for cellular connectivity, for smart card process, for a service of a client server 141, etc. The identification 541 can be used to represent the endpoint 150 in a population of endpoints in the application domain. The identification 541 can be used to represent the endpoint 150 as a device, a member, a service subscriber, an account, a contact, etc.

For example, the client server 141 operating in the application domain can request the security server 140 to bind the public identification 541 to the endpoint 150 having the unique identification 111. In a request 549, the client server 141 can provide the identity data 113 received from the endpoint 150 and the public identification 541 to be bind to the endpoint 150. In response to the request 549, the security server 140 validates the identity data 113 by determining whether the verification code 133 in the identity data 113 is generated using a secret key 137 of the memory device 130 having the unique identification 111.

After the validation of the identity data 113, the security server 140 can add the public identification 541 to the device information 121 and cause the memory device 130 in the endpoint 150 to update 543 the device information 121. After the update 543, the memory device 130 has a new secret key for its generation of new identity data 113 that includes the public identification 541. For example, the message 131 in the new identity data 113 can include the public identification 541, in addition to the unique identification 111. The security features of the memory device 130 configured to prevent fraudulent uses of the unique identification 111 can also prevent the fraudulent uses of the public identification 541. For example, when the client server 141 receives the new identity data 113 that contains the public identification 541, the client server 141 can request the security server 140 to validate the new identity data 113. If the new identity data 113 has a valid verification code 133, it is generated by an endpoint 150 that is assigned the public identification 541.

The security server 140 can update 543 the device information 121 in a way similar to the update 377 of firmware of the endpoint 150 and/or the repair 385 of a package installed in the endpoint 150. For example, the security server 140 can generate a verification code 153 for a command 155 to store the public identification 541 in the memory cells 103 of the memory device 130. The verification code 153 is generated using a cryptographic key 145 representing an owner privilege to operate the memory device 130, including the privilege controlled by the access controller 109 in the memory device 130 for the execution of the command 155 in the memory device 130.

Optionally, the association of the public identification 541 with the endpoint 150 does not require the generation of a new secret key to represent the memory device 130 and/or endpoint 150. The public identification 541 can be included in the message 131 that is used to generate the verification code 133 signed using the secret key 137. The validation of the verification code 133 indicates that the public identification 541 provided in the message 131 has not been altered; and the verification code 133 is signed by the memory device 130 installed in the endpoint 150.

Optionally, the update 543 is skipped; and the memory device 130 and/or the endpoint 150 does not store the public identification 541. The security server 140 stores data associating the unique identification 111 with the public identification 541. After the security server 140 validates identity data 113 provided in a validation request, the security server 140 can look up the public identification 541 relevant for an application domain for the unique identification 111 identified in the message 131 of the identity data 113 and provides the public identification 541 in a validation response, in a way similar to the presentation of the subscriber identity number 505 in a validation response 174 illustrated in FIG. 23.

Optionally, the security server 140 has a portal 545 that allows a computer 180 to submit a request 547 to associate the public identification 541 with an endpoint 150 having the unique identification 111. After the portal 545 verifies that the computer 180 is operated by an authorized owner or user of the endpoint 150, the portal 545 can communicate with the security server 140 to update the device information 121 of the unique identification 111.

In one embodiment, the endpoint 150 has a package stored in the memory device 130. When the package is loaded from the memory device 130 and executed in the host system 120, the endpoint 150 can communicate with the server 140 for the update 543. The communication between the endpoint 150 and the server 140 can go through a client server (e.g., 141), a firmware store 170, a service store 190, an activity tracker 451, or another server (e.g., the portal 545), or without going through any intermediate servers.

For example, a manufacturer of endpoints (e.g., 150) can use a computer 180 to configure the endpoints (e.g., 150) and request the binding of identifications (e.g., 541) assigned by the manufacturer to the endpoints (e.g., 150). For example, such public identifications can be mobile equipment identity numbers (e.g., 253) that represent individual devices in a communications network.

For example, a service provider can assign subscriber identity numbers (e.g., 255) to subscribers of a service offered by the provider. When an owner or user of an endpoint 150 signs up for the services of the provider, the service provider can use a computer 180 to request the binding of a subscriber identity number 255 with the endpoint 150.

Figure 27:
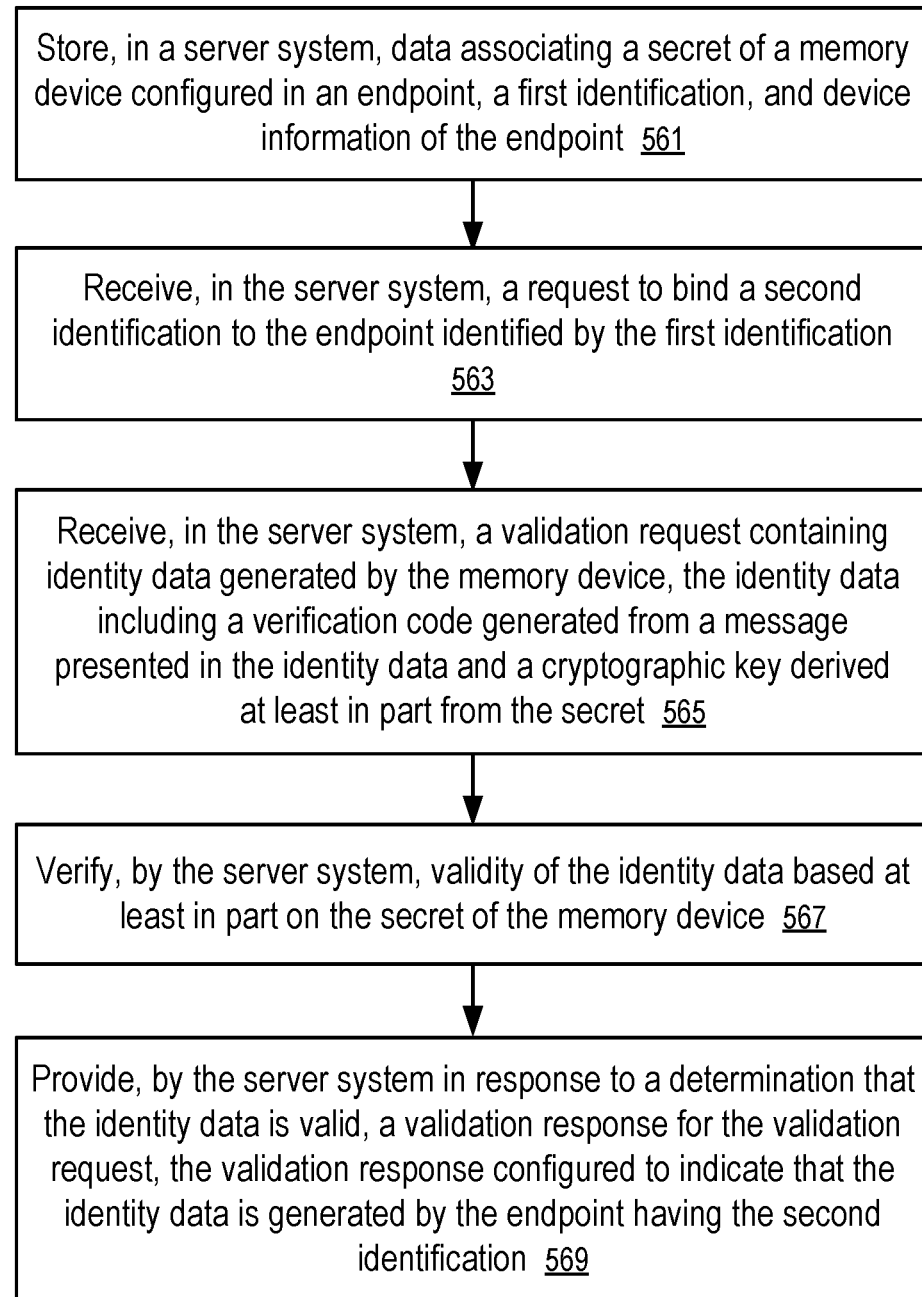
FIG. 27 shows a method to manage an identification of an endpoint according to one embodiment.

FIG. 27 shows a method to manage an identification of an endpoint according to one embodiment. For example, the method of FIG. 27 can be implemented using the techniques discussed above in connection with FIG. 26 in a system with security features discussed in connection with FIGS. 1 to 19.

At block 561, a server system stores data associating a secret (e.g., 101) of a memory device 130 configured in an endpoint 150, a first identification 111, and device information 121 of the endpoint 150.

For example, the server system can include a security server 140. Optionally, the server system can further include a portal 545, a firmware store 170, a service store 190, an activity tracker 451, a package repository 191, and/or another server. In some implementations, the server system can further include a client server 141 and/or a card server 223 illustrated in FIG. 6.

At block 563, the server system receives a request (e.g., 547 or 549) to bind a second identification 541 to the endpoint 150 identified by the first identification 111.

For example, the request (e.g., 547 or 549) to bind the second identification 541 to the endpoint 150 can be received in the server system from and/or initiated in a computer (e.g., 180 or a server 141) that is separate from the endpoint 150. The server system is configured to determine whether the computer has the privilege to attach such a second identification 541 to the endpoint 150. If so, the server system 140 can store data associating the first identification 111 and the second identification 541.

In one embodiment, the privilege to attach such a second identification 541 to the endpoint 150 is associated with an entity that operates the computer and has the ownership of the memory device 130 (e.g., as a manufacturer, a retailer, a service provider, an end user of the endpoint 150).

For example, the entity can use the computer to communicate with the endpoint 150 and/or the memory device 130 to retrieve current identity data 113 generated by the memory device 130. The current identity data 113 includes the first identification 111 and can be validated by the server system as to whether the current identity data 113 is authentic from the memory device 130.

For example, in response to the request, the server system can store data associating the first identification 111 with the second identification 541.

For example, the server system can update the device information 121 of the first identification 111 to include the second identification 541.

For example, the server system can communicate with the endpoint 150 to update the data stored in the memory device 130 and/or store the second identification 541 in the memory device 130.

Optionally, the second identification 541 can be used as part of the device information 121 used in the memory device 130 to generate a secret key 137, where the secret key 137 is used to generate the verification code 133 of identity data 113 of the memory device 130 and/or the endpoint 150.

Optionally, the second identification 541 does not change the generation of the secret key 137. However, the second identification 541 is stored into an access controlled area of the memory device 130 and included in the message 131 presented in the identity data 113 (e.g., as part of data C 127).

For example, in response to the request to bind the second identification 541 to the endpoint 150, the server system can generate a verification code 153 for a command 155 and causing the memory device 130 to execute the command 155 in view of the verification code 153. After receiving the command 155 and the verification code 153 for the command 155, the access controller 109 of the memory device 130 is configured to validate the verification code 153 for the command 155 using a cryptographic key (e.g., access control key 149) representing a privilege to have the command 155 executed in the memory device 130. The memory device 130 is configured to execute the command 155 in response to a determination that the verification code 153 for the command 155 is valid; the execution of the command 155 in the memory device 130 stores the second identification 541 in the memory device 130 for the subsequent generation of the identity data 113. For example, the second identification 541 can be stored as part of the device information 121 and/or for presentation in the message 131 of the identity data 113.

For example, the memory device stores a set of instructions executable in the endpoint 150. The set of instructions can be part of content 161, or a package 441 of firmware or operating system of the endpoint. The memory device 130 is configured to verify the integrity of the set of instructions prior to allow the endpoint 150 to load the set of instructions for execution. Since the set of instructions is secured via the memory device 130, the server system can communicate reliably with the endpoint 150 executing the set of instructions to cause the memory device 130 to execute the command 155. The communication path between the endpoint 150 and the server system can optionally go through a client server 141 and/or optionally secured via a session key 263 and symmetric cryptography.

At block 565, the server system receives a validation request 173 containing identity data 113 generated by the memory device 130. The identity data 113 includes a verification code 133 generated from a message 131 presented in the identity data 113 and a cryptographic key (e.g., secret key 137) derived at least in part from the secret (e.g., 101).

For example, in some implementations, the message 131 presented in the identity data contains the second identification 541. Optionally, the cryptographic key (e.g., secret key 137) used to sign the message 131 in the form of the verification code 133 can be derived further based on the second identification 541, when the second identification 541 is configured as part of the device information 121; alternatively, the cryptographic key is independent of the second identification 541.

In some implementations, the message 131 presented in the identity data 113 does not include the second identification 541.

At block 567, the server system verifies validity of the identity data 113 based at least in part on the secret (e.g., 101) of the memory device 130.

For example, the operations in block 567 can be performed in a way similar to the operations performed in block 323, block 343, block 403, block 423, block 463, block 485, and/or block 525.

At block 569, the server system provides, in response to a determination that the identity data 113 is valid, a validation response 174 for the validation request 173. The validation response 174 is configured to indicate that the identity data 113 is generated by the endpoint 150 having the second identification 541.

For example, the server system can identify the second identification 541 in the validation response 174 by looking up the second identification 541 that is associated with the first identification in data stored in the security server 140, or extracting the second identification 541 from the identity data 113. Alternatively, the server system can indicate that the identity data 113 is valid, including the second identification 541 presented in the message 131 included in the identity data 113.

Figure 28:
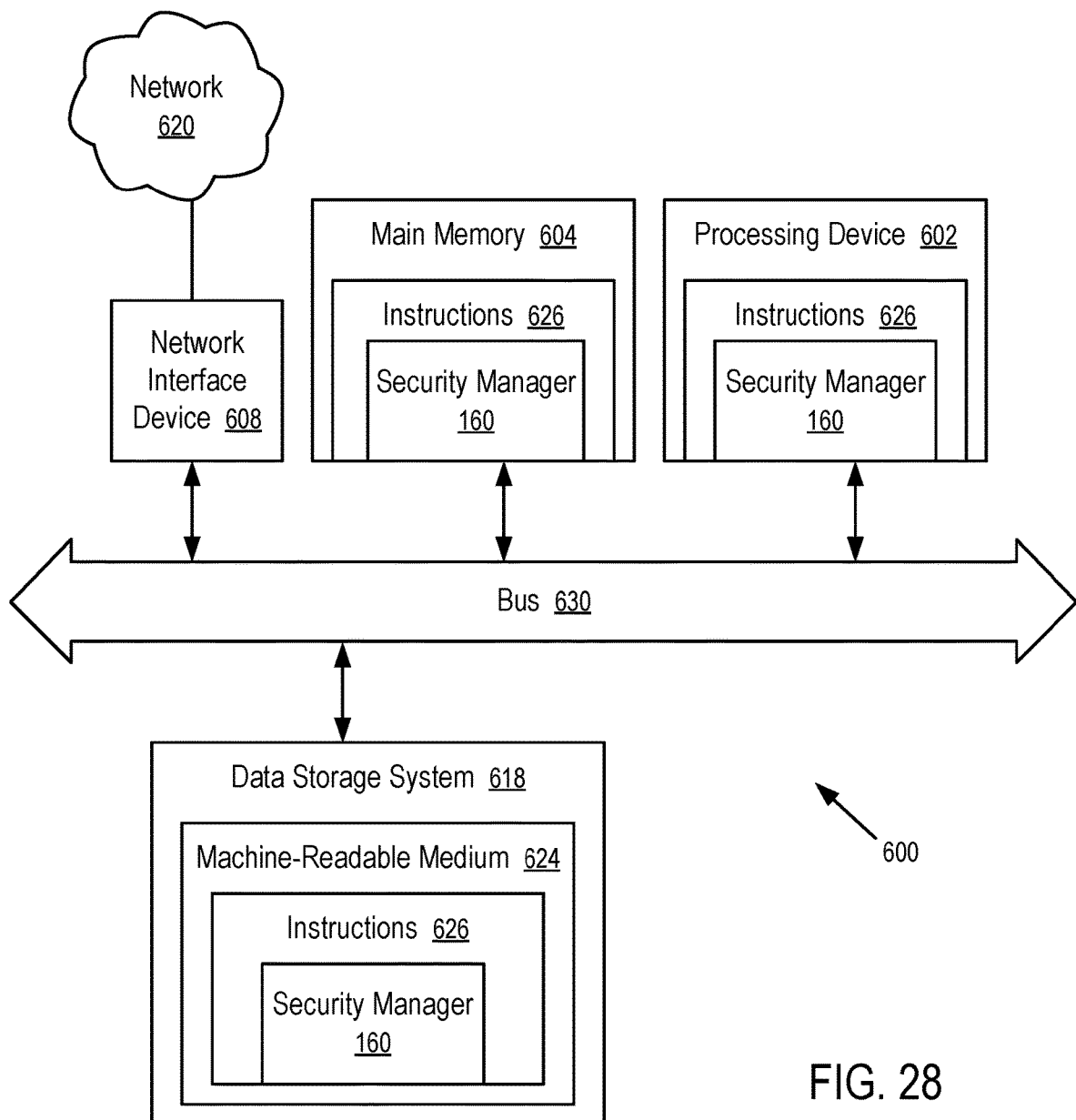
FIG. 28 is a block diagram of an example computer system in which embodiments of the present disclosure can operate.

FIG. 28 illustrates an example machine of a computer system 600 within which a set of instructions, for causing the machine to perform any one or more of the methodologies discussed herein, can be executed. In some embodiments, the computer system 600 can correspond to a host system that includes, is coupled to, or utilizes a memory sub-system or can be used to perform the operations of a security manager 160 (e.g., to execute instructions to perform operations corresponding to the security server 140 and/or the security features of the memory device 130 described with reference to FIGS. 1-27). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 618, which communicate with each other via a bus 630 (which can include multiple buses).

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable medium 624, data storage system 618, and/or main memory 604 can correspond to a memory sub-system.

In one embodiment, the instructions 626 include instructions to implement functionality corresponding to a security manager 160 (e.g., operations of the security server 140 and/or the security features of the memory device 130 described with reference to FIGS. 1-27). While the machine-readable medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In general, an endpoint 150, a server (e.g., the security server 140, a client server 141 or 143, or a card server 223) can be a computing system having a host system 120 and a memory sub-system. The memory sub-system can include media, such as one or more volatile memory devices, one or more non-volatile memory devices (e.g., memory device 130), or a combination of such.

A memory sub-system can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

For example, the computing system can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The host system 120 of the computing system is coupled to one or more memory sub-systems. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system, for example, to write data to the memory sub-system and read data from the memory sub-system.

The host system 120 can be coupled to the memory sub-system via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 120 and the memory sub-system. The host system 120 can further utilize an NVM Express (NVMe) interface to access components (e.g., memory devices 130) when the memory sub-system is coupled with the host system 120 by the PCIe interface. The physical host interface can provide an interface for passing control, address, data, and other signals between the memory sub-system and the host system 120. In general, the host system 120 can access one or more memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system. In general, the controller 116 can send commands or requests to the memory sub-system for desired access to memory devices 130. The controller 116 can further include interface circuitry to communicate with the memory sub-system. The interface circuitry can convert responses received from memory sub-system into information for the host system 120.

The controller 116 of the host system 120 can communicate with controller of the memory sub-system to perform operations such as reading data, writing data, or erasing data at the memory devices 130 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130 can include any combination of the different types of non-volatile memory components and/or volatile memory components. The volatile memory devices can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller can communicate with the memory devices 130 to perform operations such as reading data, writing data, or erasing data at the memory devices 130 and other such operations (e.g., in response to commands scheduled on a command bus by controller 116). The memory sub-system controller can include hardware such as one or more integrated circuits (ICs) and/or discrete components, a buffer memory, or a combination thereof. The hardware can include digital circuitry with dedicated (e.g., hard-coded) logic to perform the operations described herein. The memory sub-system controller can be a microcontroller, special purpose logic circuitry (e.g., a field programmable gate array (FPGA), an application specific integrated circuit (ASIC), etc.), or another suitable processor.

The memory sub-system controller can include a processing device (e.g., processor) configured to execute instructions stored in a local memory. In the illustrated example, the local memory of the memory sub-system controller includes an embedded memory configured to store instructions for performing various processes, operations, logic flows, and routines that control operation of the memory sub-system, including handling communications between the memory sub-system and the host system 120.

In some embodiments, the local memory can include memory registers storing memory pointers, fetched data, etc. The local memory can also include read-only memory (ROM) for storing micro-code. While some memory sub-systems have memory sub-system controllers, other memory sub-systems do not include a memory sub-system controller, and can instead rely upon external control (e.g., provided by an external host, or by a processor or controller separate from the memory sub-system).

In general, the memory sub-system controller can receive commands or operations from the host system 120 and can convert the commands or operations into instructions or appropriate commands to achieve the desired access to the memory devices 130. The memory sub-system controller can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system can also include additional circuitry or components that are not illustrated. In some embodiments, the memory sub-system can include a cache or buffer (e.g., DRAM) and address circuitry (e.g., a row decoder and a column decoder) that can receive an address from the memory sub-system controller and decode the address to access the memory devices 130.

In some embodiments, the memory devices 130 include local media controllers that operate in conjunction with memory sub-system memory sub-system controller to execute operations on one or more memory cells 103 of the memory devices 130. A local media controller can be used to implement the cryptographic engine 107 and/or the access controller 109. An external controller (e.g., memory sub-system controller or controller 116 of the host system 120) can externally manage the memory device 130 (e.g., perform media management operations on the memory device 130). In some embodiments, a memory device 130 is a managed memory device, which is a raw memory device combined with a local media controller for media management within the same memory device package. An example of a managed memory device is a managed NAND (MNAND) device.

The memory sub-system controller and/or a memory device 130 can include a security manager 160 configured to provide security features discussed above. In some embodiments, the memory sub-system controller and/or the local media controller in the memory sub-system can include at least a portion of the security manager 160. In other embodiments, or in combination, the controller 116 in the host system 120 can include at least a portion of the security manager 160. For example, the memory sub-system controller, the controller 116, and/or the security server 140 can include logic circuitry and/or execute instructions in implementing the security manager 160. For example, the memory sub-system controller, or the processing device 118 (e.g., processor) of the host system 120, can be configured to execute instructions stored in the memory device 130 for performing the operations of the security manager 160 described herein. In some embodiments, the security manager 160 is implemented in an integrated circuit chip disposed in the memory sub-system. In other embodiments, the security manager 160 can be part of firmware of the memory sub-system, an operating system of the host system 120, a device driver, or an application, or any combination therein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
 receiving, in a security server, a request from a client server, the request including a nonce provided by the security server and identity data of a memory device having an access controller;

determining, by the security server and based on a secret of the memory device and the identity data, authenticity of the memory device;

generating, by the security server, a verification code for a command; and communicating, from the security server to the client server, a response containing the verification code, wherein the client server is configured to transmit to the memory device the command and the verification code, and the access controller is configured to validate the verification code in determining whether to block execution of the command in the memory device.

2. The method of claim 1, further comprising:

determining, based on data stored in the security server, that the client server has privileges to have the command executed in the memory device;

wherein the verification code is provided in the response based on the privileges.

3. The method of claim 2, wherein the response is further based on a determination that the memory device has the secret.

4. The method of claim 3, wherein when executed in the memory device, the command causes a change in an access control key used by the access controller to validate verification codes generated using a cryptographic key representative of a privilege to have one or more commands executed in the memory device.

5. The method of claim 4, wherein when executed in the memory device, the command causes a change in a setting of security features of the memory device or a change in content stored in the memory device.

6. The method of claim 4, wherein when executed in the memory device, the command causes the memory device to disable access to a platform a boot loader stored in the memory device.

7. The method of claim 4, wherein when executed in the memory device, the command causes the access controller to block access to one or more sections of memory cells in the memory device.

8. The method of claim 4, wherein when executed in the memory device, the command causes the memory device to purge a decryption key for data stored in the memory device.

9. The method of claim 4, wherein when executed in the memory device, the command causes the memory device to irreversibly destroy at least one aspect of the memory device.

10. The method of claim 4, wherein when executed in the memory device, the command causes the memory device to deactivate a security feature of the memory device.

11. The method of claim 4, wherein the memory device does not communicate the secret outside of the memory device after completion of manufacture of the memory device in a secure facility.

12. The method of claim 11, further comprising:

establishing a session key shared between the security server and the memory device based on validation of the identity data.

13. The method of claim 12, wherein the access control key is based on the session key.

14. The method of claim 12, further comprising:

registering the secret during manufacture of the memory device in the secure facility; and generating, based at least in part on the secret, a cryptographic key to validate in the identity data.

15. The method of claim 14, wherein the cryptographic key used to validate the identity data is generated based further on data received from a host system of the memory device at a boot time of the host system; and when executed in the memory device, the command causes the memory device to generate a cryptographic measurement of data stored in the memory device, or a digital signature signed by the memory device for the data stored in the memory device.

16. A computing system, comprising:

memory storing cryptographic keys of memory devices; and at least one processor configured via a set of instructions to:

receive a request from a client server, the request including identity data of a memory device having an access controller;

determine, based on a secret of the memory device and the identity data, authenticity of the memory device; and generate, a verification code for a command to be transmitted to a host interface of the memory device, wherein prior to execution of the command in the memory device, the access controller is configured to validate that the verification code is generated using a cryptographic key representative of a privilege to have the command executed in the memory device.

17. The computing system of claim 16, wherein the at least one processor is configured via the set of instructions to provide services to the client server in implementing security operations for the memory device based on security features of the memory device; and wherein the security features include:

generation of a cryptographic key representative of an identity of the memory device based at least in part on the secret of the memory device; and control of commands executed in the memory device based on privileges represented by cryptographic keys.

18. The computing system of claim 17, wherein when executed in the memory device, the command causes replacement of an access control key used by the access controller to validate verification codes generated using a cryptographic key representative of a privilege to have one or more commands executed in the memory device; and wherein the security features further include a cryptographic engine.

19. A non-transitory computer storage medium storing instructions which, when executed by a security server, cause the security server to perform a method, the method comprising:

receiving, in the security server, a request from a client server, the request including identity data of a memory device having an access controller;

determining, by the security server and based on a secret of the memory device and the identity data, authenticity of the memory device;

generating, by the security server, a verification code for a command; and causing, by the security server, transmission of the command and the verification code to a host interface of the memory device, wherein the access controller is configured to validate the verification code in determining whether to block execution of the command in the memory device.

20. The non-transitory computer storage medium of claim 19, wherein the method further comprises:

determining, based on data stored in the security server, that the client server has privileges to have the command executed in the memory device;

wherein the verification code is provided in the response based on the privileges;

wherein the response is further based on a determination that the memory device has the secret; and wherein the memory device does not communicate the secret outside of the memory device after completion of manufacture of the memory device.

* * * * *